(12) United States Patent
Seo et al.

(10) Patent No.: US 8,169,713 B2
(45) Date of Patent: May 1, 2012

(54) ZOOM LENS, CAMERA MODULE AND ELECTRONIC APPARATUS

(75) Inventors: Katsuhiro Seo, Kanagawa (JP); Yoshiki Okamoto, Kanagawa (JP); Mamoru Suzuki, Tokyo (JP); Akira Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 58 days.

(21) Appl. No.: 12/795,134

(22) Filed: Jun. 7, 2010

(65) Prior Publication Data

US 2011/0002043 A1 Jan. 6, 2011

(30) Foreign Application Priority Data

Jul. 3, 2009 (JP) ................ P2009-159348

(51) Int. Cl.
*G02B 15/14* (2006.01)
*G02B 1/06* (2006.01)
(52) U.S. Cl. ....................... 359/689; 359/666
(58) Field of Classification Search ........... 359/665, 359/666, 686, 689
See application file for complete search history.

(56) References Cited

U.S. PATENT DOCUMENTS

2009/0091844 A1* 4/2009 Jannard et al. ............... 359/689

FOREIGN PATENT DOCUMENTS

| JP | 2008-089752 | 4/2008 |
| JP | 2008-185627 | 8/2008 |

* cited by examiner

*Primary Examiner* — William Choi
(74) *Attorney, Agent, or Firm* — K&L Gates LLP

(57) ABSTRACT

Disclosed herein is a zoom lens, including: an object side lens group disposed on the object side and including a first variable lens having a deformation surface, the object side lens group having a focal length varied by deformation of the first variable lens; an image side lens group disposed on the image side with respect to the object side lens group with an aperture stop sandwiched therebetween and including a second variable lens having a deformation surface, the image side lens group having a focal length varied by deformation of the second variable lens; and a lens group disposed between the object side lens group and the image side lens group and including the aperture stop. The deformation of the first and second variable lenses is controlled to carry out power variation and carry out image surface movement compensation and focusing by the power variation.

20 Claims, 48 Drawing Sheets

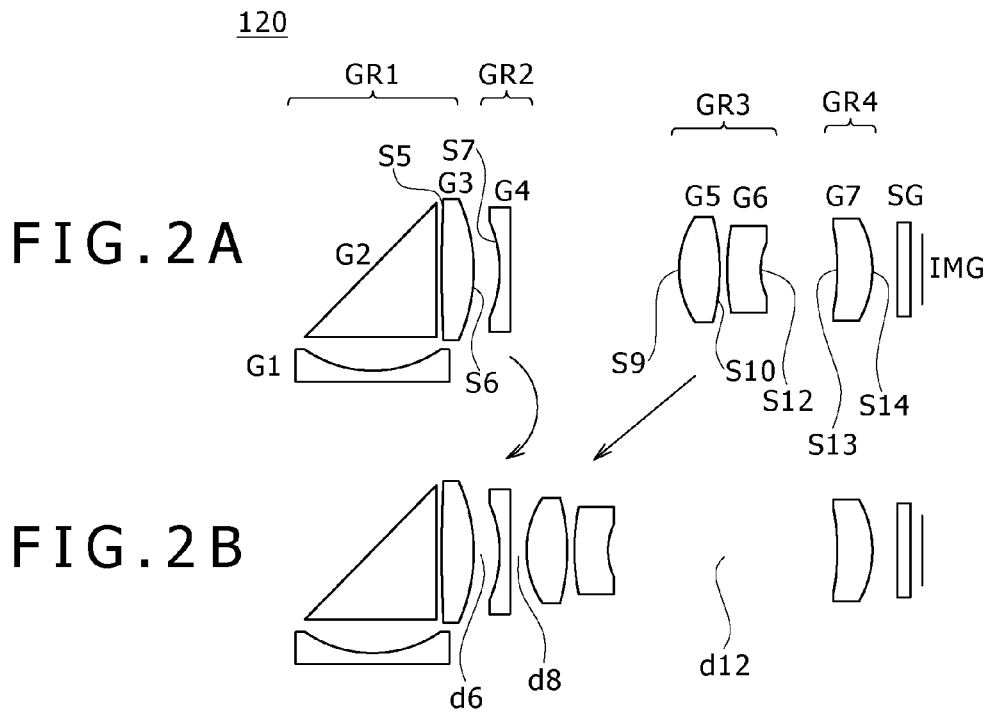
FIG.2A
FIG.2B
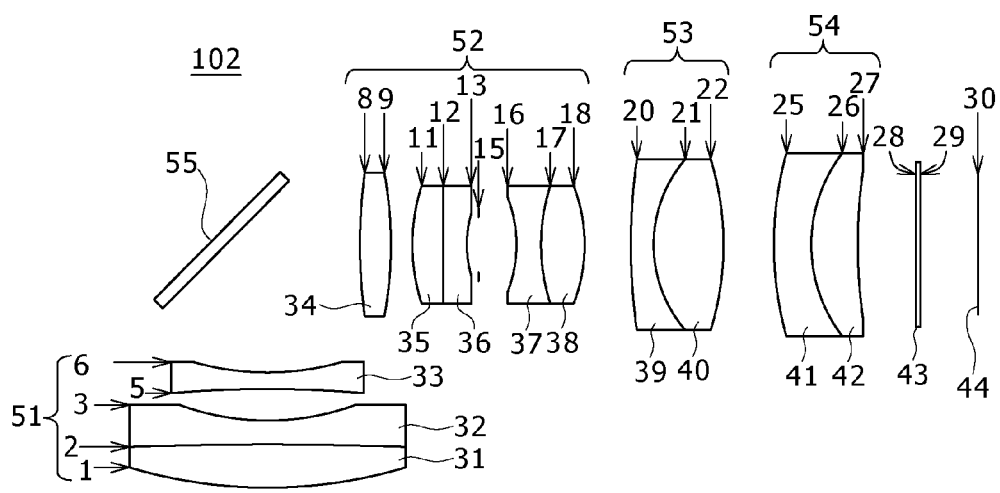
FIG.3

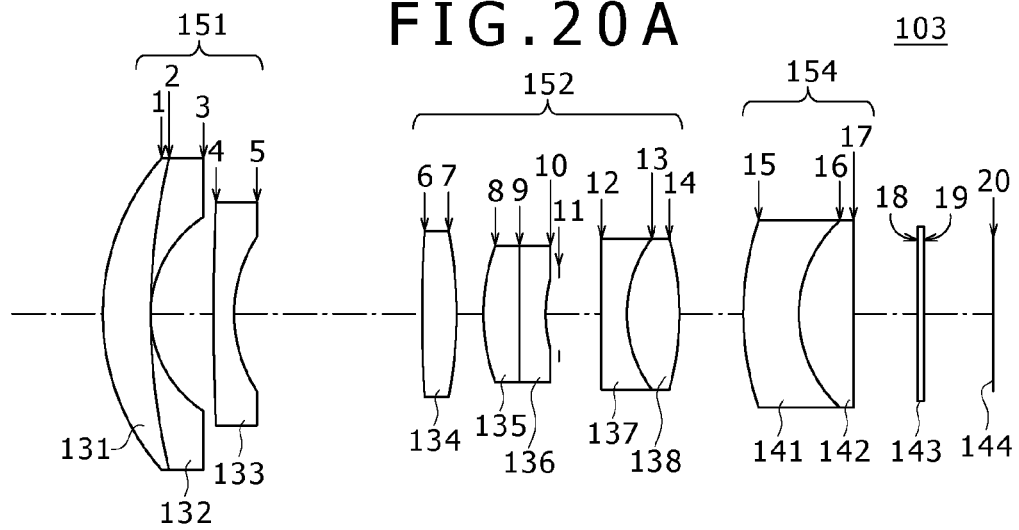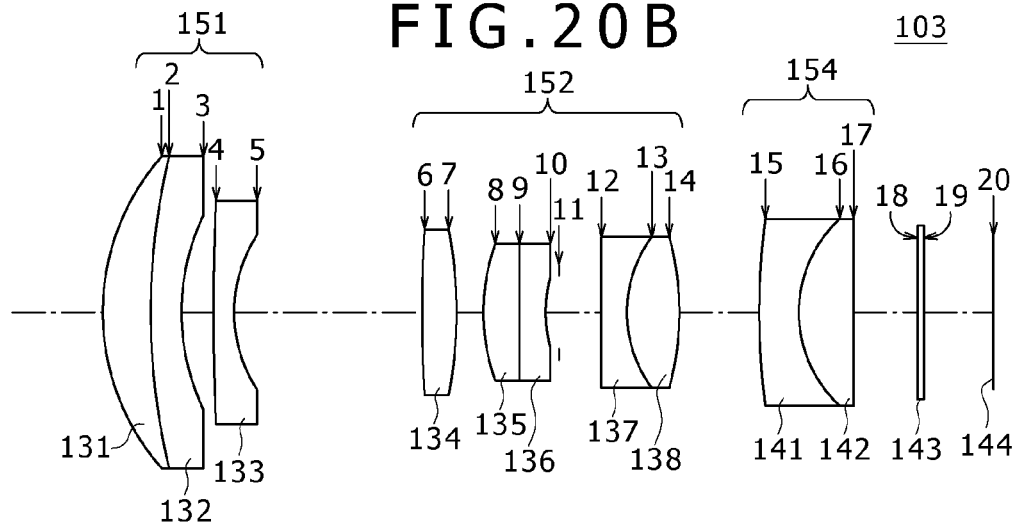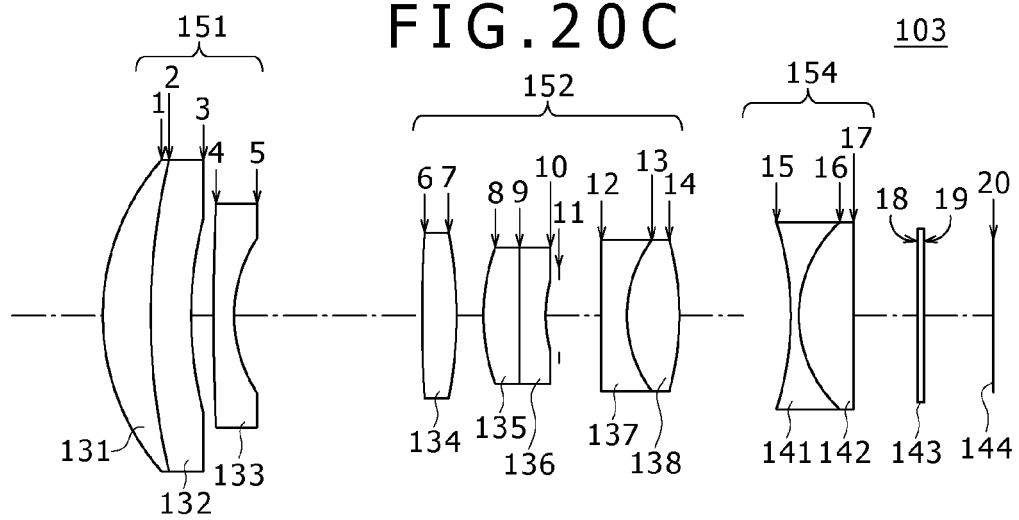

ZOOM LENS, CAMERA MODULE AND ELECTRONIC APPARATUS

CROSS REFERENCES TO RELATED APPLICATIONS

The present application claims priority to Japanese Priority Patent Application JP 2009-159348 filed in the Japan Patent Office on Jul. 3, 2009, the entire content of which is hereby incorporated by reference.

BACKGROUND

The present application relates to a zoom lens which includes a lens having a focal length which is varied by deformation of the lens material without movement of the lens and effects zooming by the variation of the focal length and a camera module and an electronic apparatus which use the zoom lens.

Reduction in size and weight is demanded for camera modules which use a solid-state image pickup element such as a CCD (Charge Coupled Device) element or a CMOS (Complementary Metal-Oxide Semiconductor) element and also for various electronic apparatus such as image pickup apparatus which use such a camera module. To this end, various methods have been proposed wherein a variable focal length lens having no moving mechanism is used as a zoom lens for use with a camera module. For example, Japanese Patent Laid-Open No. 2008-185627 (hereinafter referred to as Patent Document 1) discloses a technique which uses a variable focal length lens having a deformable lens refracting surface as a converter lens.

The lens of the refracting surface deformation type disclosed in Patent Document 1 is configured such that an elastic film made of a resin material or the like and having optical transparency is adhered to an optically transparent substrate formed as a flat plate or having a predetermined curved surface by a sealing material, and optically transparent liquid or the like is filled in the inside. By varying the pressure applied to the material filled between the transparent substrate and the elastic film to deform the resilient film, the curved surface shape can be varied to vary the focal length of the lens. As a lens whose curved surface shape is varied in this manner, a liquid lens having liquid filled therein, a gel lens having gel filled therein and so forth have been proposed.

A schematic sectional configuration of an example of a variable lens of such a refracting surface deformation type as described above is shown in FIG. 69. Referring to FIG. 69, the variable lens 82 shown includes an optically transparent substrate 81 provided on one surface thereof and made of a material such as glass or resin, and a deformation film 87 provided on the other surface thereof and formed from an optically transparent elastic film or the like. A joining member 84 of a joining material or the like is interposed between a pair of, for example, ring-shaped framework members 83 and 85 such that the outer circumference of the optically transparent substrate 81 and the deformation film 87 is held liquid-tight by the joining member 84. An optically transparent medium 90 having fluidity such as liquid or gel is sealed in a region defined by the members mentioned to form the variable lens 82 of the refracting surface deformation type. A liquid moving member 86 in the form of a pipe or the like is provided on the variable lens 82, in the example shown, at a portion of the joining member 84, such that the medium 90 can be introduced into and extracted from the inside of the variable lens 82 therethrough. An external pump mechanism or the like not shown is driven to vary the volume of the medium 90 in the variable lens 82. By the variation of the volume of the medium 90, the deformation film 87 can be deformed to change the focal length of the variable lens 82 within a range from a convex lens to a concave lens. It is to be noted that the deformation mechanism may not only be such a mechanism for feeding and taking the medium 90 into and out from the inside of the variable lens 82 but be a mechanism which varies the pressure to the deformation film 87 by deformation of the framework member 83 or 85 or the like. Thus, the mechanism for varying the pressure to the deformation film 87 is not limited particularly.

As the medium in the variable lens 82, it is preferable to use a material having optical transparency and having a suitable refractive index such as silicone type oil. Meanwhile, as a material of the deformation film 87, it is preferable to use a deformable material having suitable elasticity and having required optical transparency such as silicone type rubber, and the deformation film 87 preferably has a shape of a deformable thin film or the like.

By adopting such a configuration as described above, the lens power can be made variable simply by a comparatively simple and easy mechanism such as a mechanism for varying the pressure to the deformation film 87 of the medium 90, for example, a mechanism for sucking or injecting the medium 90 or the like. By utilizing such a variable lens 82 as just described, variation of the focal magnification can be implemented, and, for example, by combining a plurality of such variable lenses 82 as shown in FIG. 2, such a wide converter as disclosed in Patent Document 1 can be implemented by a simpler configuration.

Also it is investigated to utilize a variable focal length lens of the electro-wetting type which utilizes an electro-wetting phenomenon and wherein two different kinds of liquid including polar liquid and non-polar liquid are accommodated in a vessel and a voltage is applied to deform the shape of the interface between the two kinds of liquids thereby to vary the focal length. A zoom lens which uses the variable focal length lens of the electro-wetting type just described is proposed, for example, in Japanese Patent Laid-Open No. 2008-089752 (hereinafter referred to as Patent Document 2).

SUMMARY

In a camera module which includes such an image pickup element as described above, also enhancement of the resolution and increase of the number of pixels are demanded, and good optical characteristics by which aberrations are suppressed low are demanded for a zoom lens for use with the camera module. However, in regard to lens systems which use a liquid lens, a gel lens or an electro-wetting lens, a configuration which is utilized for a zoom lens while implementing good optical characteristics taking aberrations into consideration has not been proposed as yet.

Therefore, it is desirable to provide a zoom lens which suppresses aberrations to suppress deterioration of optical characteristics while it is configured using a lens whose focal length is varied by variation of the shape of a refracting surface of the lens.

According to an embodiment, there is provided a zoom lens including an object side lens group disposed on the object side and including a first variable lens having a deformation surface formed from a deformable transparent material, the object side lens group having a focal length varied by deformation of the first variable lens, an image side lens group disposed on the image side with respect to the object side lens group with an aperture stop sandwiched therebetween and including a second variable lens having a deformation surface formed from a deformable transparent material, the image side lens group having a focal length varied by deformation of the second variable lens, and a lens group disposed between the object side lens group and the image side lens group and including the aperture stop, the deformation of the first and second variable lenses provided in the object side lens group and the image side lens group being controlled to carry out power variation and carry out image surface movement compensation and focusing by the power variation.

According to another embodiment, there is provided a camera module including the zoom lens described above, and an image pickup element adapted to pick up an image formed by the zoom lens.

According to a further embodiment, there is provided an electronic apparatus including the zoom lens described above, an image pickup element adapted to pick up an image formed by the zoom lens, and a control section adapted to control the first and second variable lenses of the zoom lens.

In the zoom lens, camera module and electronic apparatus, at least the first and second variable lenses whose focal length can be varied by deformation of a lens refracting surface without involving a driving mechanism are used as variable focus lenses for use with a zoom lens. Particularly, the first and second variable lenses are included in the lens groups disposed on the object side and the image side with the aperture stop interposed therebetween. The lens groups carry out power variation by control of the deformation of the first and second variable lenses, and image surface movement compensation and focusing are carried out by the power variation.

Since the arrangement configuration of the variable lenses whose lens refracting surface shape varies within the zoom lens is disposed on the object side and the image side in this manner, even where the focal length is varied to carry out zooming, aberrations can be suppressed and deterioration of optical characteristics is suppressed.

Consequently, according to the present invention, a zoom lens is provided wherein aberration is suppressed to suppress degradation of optical characteristics while it uses a lens whose focal length is varied by variation of a lens refractive surface shape.

The above and other objects, features and advantages of the present invention will become apparent from the following description and the appended claims, taken in conjunction with the accompanying drawings in which like parts or elements denoted by like reference symbols.

Additional features and advantages are described herein, and will be apparent from the following Detailed Description and the figures.

BRIEF DESCRIPTION OF THE FIGURES

FIGS. 2A and 2B are schematic views showing a lens configuration of a zoom lens of a comparative example 1 in a wide angle end state and a telephoto end state, respectively;

FIG. 3 is a schematic view showing another lens configuration of the zoom lens according to the first embodiment;

FIGS. 20A, 20B and 20C are schematic views showing sectional configurations of a further example of the zoom lens according to the first embodiment of the present invention in a wide angle end state, an intermediate focal length state and a telephoto end state, respectively;

DETAILED DESCRIPTION

Figure 1A:
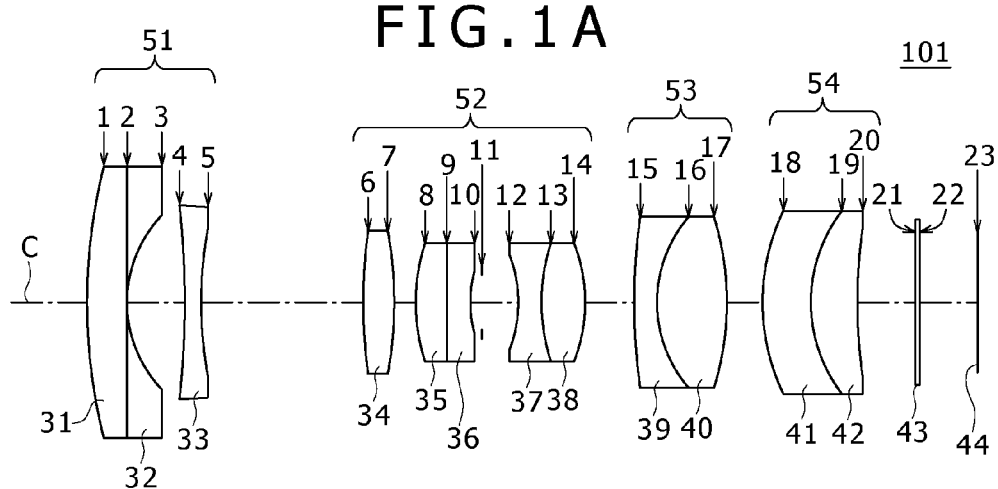
FIGS. 1A, 1B and 1C are schematic views showing a lens configuration of an example of a zoom lens according to a first embodiment in a wide angle end state, an intermediate focal length state and a telephoto end state, respectively.

The present application will be described below in greater detail with reference to the drawings according to an embodiment.

1. First Embodiment (zoom lens)
1-1. General Configuration of the Zoom Lens
1-2. Design Example 1 (example of basic design)
1-3. Comparative Example 1 (example of a zoom lens which uses a movable lens in the related art)
1-4. Comparison between the Design Example 1 and the Comparative Example
1-5. Design Example 2 (example of lens number reduction)
2. Second Embodiment (zoom lens which uses an aspheric surface)
2-1. Reference Example 1 (explanation of deviation amount of the deformation surface from the spherical surface)
2-2. Reference Example 2 (example wherein the reference example 1 is optimized without using an aspheric surface)
2-3. Design Example 3 (example wherein one aspheric surface is added)
2-4. Design Example 4 (example wherein two aspheric surfaces are added)
3. Third Embodiment (example wherein the number of lenses is reduced using an aspheric surface)
3-1. Design Example 5 (example wherein three aspheric surfaces are used to decrease the number of lenses)
4. Study of the Distance between a Variable Lens and the Aperture Stop
4-1. Design Example 6 (example wherein three aspheric surfaces are used)
4-2. Comparative Example 2 (example wherein the object side variable lens is positioned nearer to the aperture stop on the basis of the design example 6)
4-3. Comparative Example 3 (example wherein the image side variable lens is positioned nearer to the aperture stop is on the basis of the design example 6)
5. Study Regarding the Effective Diameter
6. Fourth Embodiment (camera module)
7. Fifth Embodiment (electronic apparatus)

1. First Embodiment

Zoom Lens 1-1. General Configuration of the Zoom Lens

First, a zoom lens according to a first embodiment is described. The zoom lens of the present embodiment includes at least a lens group including a first variable lens, another lens group including an aperture stop sandwiched therein, and a further lens group on the image side including a second variable lens. The first and second variable lenses are configured with a deformation surface made of a deformable transparent material, and a refracting surface deformation type lens such as a liquid lens or a gel lens or else an electro-wetting lens can be applied to the first and second variable lenses. The transparent material which is a medium of the variable lenses here may be any material having desired optical transparency with respect to a used wavelength and may be any of various materials which are transparent in a visible light range, a wide wavelength band including the visible light range, or a wavelength band partly displaced from the visible light range. The lens group on the object side varies the focal length thereof by deformation of a first deformation surface of the first variable lens and consequently functions as a variator to determine the size of an image pickup object formed on an image surface. Meanwhile, the lens group on the image side including the second variable lens has a function as a compensator and cooperates with the lens group on the object side having the function of the variator to carry out image surface movement compensation and focusing.

Meanwhile, the lens group disposed between the object side lens group and the image side lens group and including the aperture stop sandwiched therein can be formed from fixed lenses which do not include a variable lens. For this lens group, a lens group of the Gauss type wherein substantially achromatic convex and concave lenses are disposed in a symmetrical relationship to effectively correct odd-order aberration, spherical aberration and chromatic aberration or of a type similar to the Gauss type. By providing a lens group of the Gauss type or of a type similar to the Gauss type, spherical aberration, odd-order aberration and chromatic aberration can be corrected favorably.

Further, some other lens or lens group may be disposed in addition to the object side lens group, image side lens group and lens group disposed with the aperture stop sandwiched therein. Such a lens or lens group as just described can be disposed, for example, between the lens group disposed with the aperture stop sandwiched therein and the lens group including the second variable lens on the image side such that it acts as a lens group for carrying out on-axis chromatic aberration correction as hereinafter described.

In this manner, some other lens group may be disposed in addition to the object side lens group and the image side lens group including the variable lenses and the lens group disposed with the aperture stop sandwiched therein. It should be noted, however, that the lens group including the first variable lens is disposed as a lens group on the most object side and the lens group including the second variable lens is disposed as a lens group on the most image side.

Further, the number of variable lenses is not limited, and it is possible, for example, to dispose a variable lens in the lens group described above which includes the aperture stop. However, it is confirmed that a good aberration characteristic is obtained with a configuration wherein one variable lens is disposed in the lens group on the most object side and one variable lens is disposed in the lens group on the most image side as hereinafter described. Accordingly, preferably the number of variable lenses, which may require a driving mechanism therefor, is minimized, and it is considered that one variable lens should be disposed in each of the object side and image side lens groups. It is to be noted that, although preferably the distances between the variable lenses and the aperture stop with respect to the lens length remains within a fixed range, this is hereinafter described.

The zoom lens according to the present embodiment is preferably configured such that, when the refracting power of the object side lens group is increased in the negative direction, the refracting power of the image side lens group is controlled so as to increase in the positive direction to zoom from the telephoto side to the wide angle side. In particular, where the refracting powers of the object side lens group including the variable lens on the telephoto side and the wide angle side are represented by $\phi At$ and $\phi Aw$ and the refracting powers of the image side lens group including the variable lens on the telephoto side and the wide angle side are represented by $\phi Bt$ and $\phi Bw$, respectively, the zoom lens is configured such that the following expressions are satisfied:

$$\phi At > \phi Aw \qquad (1)$$

$$\phi Bt < \phi Bw \qquad (2)$$

By the configuration just described, the aberrations can be suppressed with certainty as hereinafter described in detail in the description of design examples 1 and 2 and various design examples of a second embodiment hereinafter described.

Further, preferably the curvature of the deformation surface of the second variable lens of the image side lens group varies in the positive direction upon zooming from the telephoto end side toward the wide angle end side. In particular, where the curvatures of the second deformation surface of the second variable lens on the telephoto end side and the wide angle end side are represented by Ct and Cw, respectively, they are configured so as to satisfy the following expression (3):

$$Ct < Cw \qquad (3)$$

It is to be noted that the sign of the curvature here is defined such that the curvature is positive where the deformation surface is convex to the object side but is negative where the deformation surface is convex to the image side.

For example, where the second deformation surface of the second variable lens is defined by the air and the medium, which is a transparent material of liquid, gel or the like disposed in order from the object side, the refracting power $\phi$ is represented by the following expression:

$$\phi = (n-1)C$$

where n is the liquid refractive index, and C is the curvature. Where R is a radius of curvature, the curvature C is represented by C=1/R.

Accordingly, where $$\phi Bt < \phi Bw$$

is defined, a relationship of $$Ct < Cw$$

is satisfied. By the configuration just described, appearance of the aberrations can be suppressed as described hereinabove.

In short, by providing a lens group of the Gauss type or of a type similar to the Gauss type such that the aperture stop is sandwiched therein as described above, spherical aberration, odd-order aberration and chromatic aberration can be corrected favorably. In addition, by configuring the zoom lens such that the expressions (1), (2) and (3) given hereinabove are satisfied, the aberrations of the object side lens group and the image side lens group formed as the variable lens groups can be suppressed small and also the variation by zooming can be suppressed small as hereinafter described in detail in the description of the design example 1 hereinafter described.

As described hereinabove, various lenses whose lens surface is deformed such as a refracting surface deformation type lens such as a liquid lens or a gel lens or an electro-wetting lens can be applied to the first and second variable lenses. Where a refracting surface deformation type lens such as a liquid lens or a gel lens is used, preferably it is structured such that optically transparent liquid or gel is filled between an optically transparent solid material and an optically transparent elastic film and such that the focal length is varied by deformation of the liquid or gel and the elastic film.

As the solid material for the refracting surface deformation type lens, transparent materials which can be applied to various optical elements such as glass or resin substrates and so forth can be used. Meanwhile, as the liquid or gel, silicone-based oil, silicone gel and the like can be utilized, and as a film material, a silicone resin and so forth can be utilized.

In the refracting surface deformation type lens applied to the present invention, the deformation configuration for the deformation surface is not limited particularly. For example, a configuration is applicable wherein a conduit for introducing and deriving liquid or gel therethrough is disposed in a sealing portion between a substrate and a deformation surface and an external pump mechanism is utilized to vary the volume of the liquid or gel between the substrate and the deformation surface thereby to vary the curvature of the deformation film as disclosed in Patent Document 1 mentioned hereinabove. Another configuration may be used wherein partitioned regions are provided in the inside of a lens such that movement of liquid or gel between the regions is permitted and an actuator such as a piezoelectric element is used to exert movement of the liquid or gel between the regions to vary the pressure from the medium to the deformation surface thereby to vary the curvature of the deformation surface. The configuration of the variable lens and the deformation configuration for the deformation surface are preferably configured such that, when the deformation surfaces 3 and 18 are deformed from the telephoto end side to the wide angle end side, the deviation rate of them from respective spherical surfaces is suppressed. In other words, preferably the lens surface deformation form, deformation surface material, lens medium material and so forth are selected suitably in response the lens diameter, the range of the curvature variation and so forth.

1-2. Design Example 1

Example of Basic Design

Figure 1B:
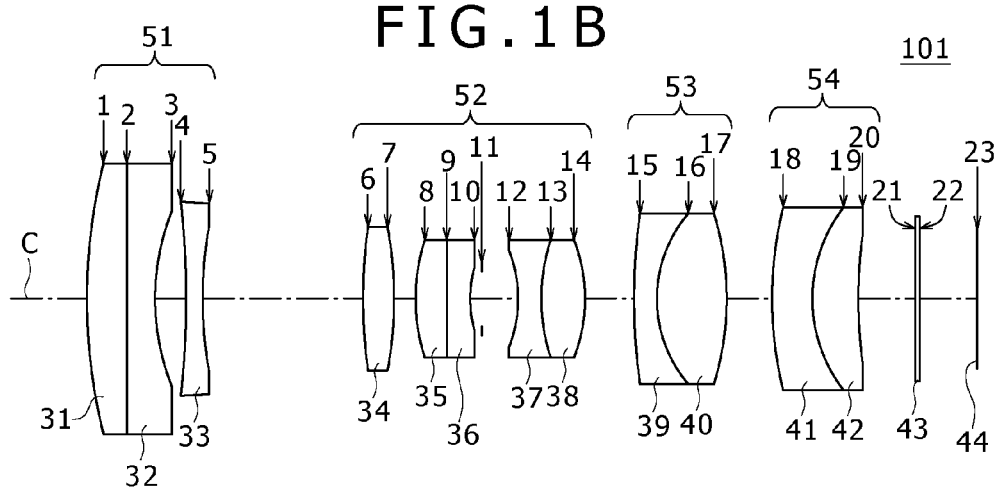
Figure 1C:
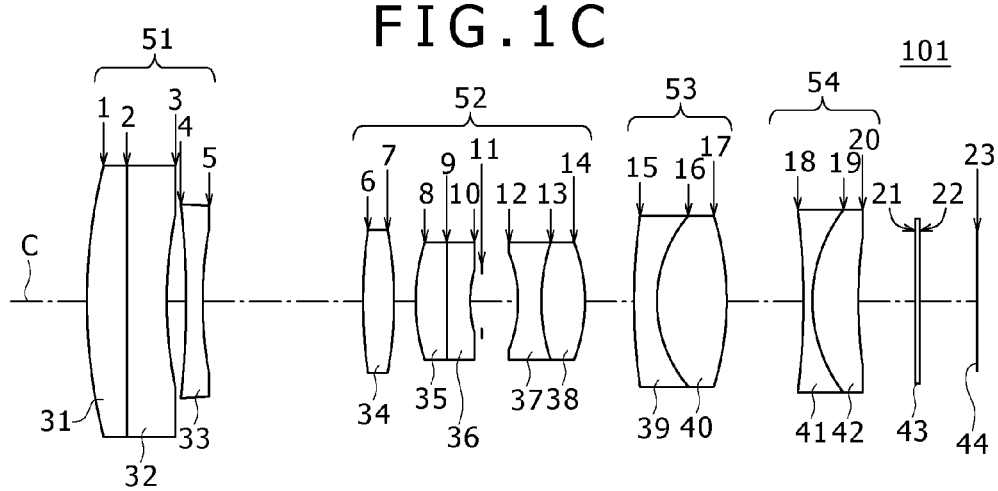

Now, a lens configuration, lens dimensions and so forth of a first design example of the zoom lens according to the first embodiment described above are described with reference to FIGS. 1A to 1C. In FIGS. 1A, 1B and 1C, the zoom lens is shown in a wide angle end state, an intermediate focal length state and a telephoto end state, respectively. The zoom lens 101 shown is configured such that it includes first to fourth lens groups 51 to 54. The first lens group 51 includes a first variable lens 32 while the fourth lens group 54 includes a second variable lens 41. An aperture stop 11 is sandwiched in the second lens group 52 of the Gauss type on the object side and the image side. Further, the third lens group 53 principally for on-axis chromatic aberration correction is disposed between the second lens group 52 and the fourth lens group 54. Surface numbers 1 to 20 are applied in order from the object side.

The first lens group 51 generally has a positive refracting power and includes a convex lens 31 having a positive refracting power, a first variable lens 32 and a concave lens 33 having a negative refractive index, disposed in order from the object side. In the example shown, the convex lens 31 and the first variable lens 32 are integrated. The deformation surface 3 is a surface on the outer side, that is, on the most image side, of the lens of the integrated doublet configuration, and preferably a refracting surface deformation type lens such as a liquid lens or a gel lens is used as the first variable lens 32 and a deformation film made of an elastic material is used for the surface on the image side, that is, for the surface of the surface number 3. The convex lens 31 can be replaced with a curvature provided on an optically transparent substrate itself for securing the deformation film of the refracting surface deformation type lens.

The second lens group 52 includes a convex lens 34 having a positive refracting power, a convex lens 35 having a positive refracting power, and a meniscus lens 36 having a concave surface on the image side thereof and having a negative refracting power, disposed in order from the object side. Further, a concave lens 37 having a negative refracting power and a convex lens 38 having a positive refracting power are disposed across the aperture stop 11. In the present example, the lenses 35 and 36 and the lenses 37 and 38 are formed in a doublet configuration. The lens group of the lenses 34, 35 and 36 disposed forwardly of the aperture stop 11 generally has a positive refracting power, and the lens group of the lenses 37 and 38 disposed rearwardly of the aperture stop 11 generally has a positive refracting power. Thus, the second lens group 52 has a Gauss type configuration.

For the third lens group 53, a doublet including a concave lens 39 and a convex lens 40 and having a positive refracting power is used. The third lens group 53 has a function of correcting principally on-axis aberration as described hereinabove so that the aberration of the entire zoom lens can be suppressed.

Further, the fourth lens group 54 has a doublet configuration including the second variable lens 41 and a meniscus lens 42 having a positive refracting power and having a convex surface on the object side. The deformation surface 18 is an outer side surface, that is, a surface on the most object side, of the fourth lens group 54, and also the second variable lens 41 is preferably formed as a refracting surface deformation type lens such as a liquid lens or a gel lens. Also the meniscus lens 42 can be replaced with a curvature provided on an optically transparent substrate itself of a refracting surface deformation type lens similarly to the convex lens 31.

It is to be noted that the cover glass plate 43 is disposed between the fourth lens group 54 and an image surface 23 assuming that an image pickup element 44 is disposed, for example, on the image surface 23. An example of numerical value data in the present design example 1 is given as Table 1 below. Further, various data of various dimensions and the curvature, surface distance and so forth of the deformation surfaces are indicated in Table 2 below. In this example, all of the lens surfaces of the fixed lenses are formed as spherical surfaces. It is to be noted that, in the tables given below, any numerical value having no particular designation of a unit such as the radius of curvature, surface distance and effective diameter in the data is mm. For the elastic film which forms the deformation surface of the variable lenses, elastomer made of silicone is used.

TABLE 1 surface data

| Surface number | Radius of curvature | Surface distance | Refractive index (nd) | Abbe number (vd) | Effective diameter |
|---|---|---|---|---|---|
| 1 | 16.175 | 1.41 | 1.744 | 44.79 | 4.0607 |
| 2 | −109.609 | d12 | 1.506 | 34.90 | 3.6864 |
| 3 | r13 | d13 | | | 3.0238 |
| 4 | −29.155 | 0.6 | 1.755 | 27.51 | 2.76 |
| 5 | 11.913 | 5.5 | | | 2.5976 |
| 6 | 15.091 | 1.02 | 1.744 | 44.78 | 1.9999 |
| 7 | −20.457 | 0.8 | | | 1.9031 |
| 8 | 5.704 | 1.06 | 1.755 | 27.53 | 1.576 |
| 9 | −89.490 | 0.8 | 1.523 | 59.84 | 1.3346 |
| 10 | 3.981 | 0.4 | | | 1.0366 |
| 11 | Aperture stop | 1.2 | | | 0.9502 |
| 12 | −4.818 | 0.8 | 1.755 | 27.53 | 1.1125 |
| 13 | 5.737 | 1.54 | 1.564 | 60.83 | 1.3166 |
| 14 | −5.404 | 1.61 | | | 1.5993 |
| 15 | 20.749 | 0.8 | 1.741 | 27.79 | 2.1095 |
| 16 | 4.4 | 2.35 | 1.743 | 44.79 | 2.2475 |
| 17 | −10.563 | d117 | | | 2.4 |
| 18 | r118 | d118 | 1.506 | 34.90 | 2.5785 |
| 19 | 4.853 | 1.62 | 1.564 | 60.83 | 2.4557 |
| 20 | 24.274 | 1.94 | | | 2.3646 |
| 21 | INFINITY | 0.11 | 1.516 | 64.14 | |
| 22 | INFINITY | 1.98 | | | |
| 23 (image surface) | INFINITY | | | | |

TABLE 2 various data

Zoom ratio 3

| | Wide angle end | Intermediate focal length | Telephoto end |
|---|---|---|---|
| Focal length | 3.73 | 6.46 | 11.19 |
| F number | 3.2 | 3.85 | 5.3 |
| Angle of view [degrees] | 63.4 | 39.3 | 23.3 |
| Total length | | 30.3 (fixed) | |
| BF | | 3.9 (except cover glass thickness) | |
| d12 | 0.03042 | 0.84686 | 1.22928 |
| r13 | 4.66935 | 9.17308 | 21.44583 |

TABLE 2-continued various data

Zoom ratio 3

| | Wide angle end | Intermediate focal length | Telephoto end |
|---|---|---|---|
| d13 | 1.86958 | 1.05314 | 0.67072 |
| d117 | 1.26741 | 1.69039 | 2.59977 |
| r118 | 7.39776 | 12.94671 | −16.42832 |
| d118 | 1.63259 | 1.20961 | 0.30023 |

1-3. Comparative Example 1

Example of a Zoom Lens which Uses a Movable Lens in the Related Art

Now, a zoom lens of a configuration in the related art which uses a movable lens without using a variable focal length lens as a comparative example with the zoom lens of the design example 1 and optical characteristics of the zoom lens are described. FIGS. 2A and 2B show a lens configuration of the zoom lens according to the comparative example 1. In particular, FIG. 2A shows the lens configuration in a wide angle end state and FIG. 2B shows the lens configuration in a telephoto end state. Naturally, in the present zoom lens, some lens group moves along an optical axis, and each of arrow marks between FIGS. 2A and 2B indicates a locus of such movement on the optical axis.

The zoom lens 120 includes a first lens group GR1 having a low positive refracting power, a second lens group GR2 having a negative refracting power, a third lens group GR3 having a positive refracting power and a fourth lens group GR4 having a positive refracting power, disposed in order from the object side. Upon power variation, from a wide angle end state toward a telephoto end state, the second lens group GR2 moves drawing a locus convex to the image side while the third lens group GR3 moves monotonously to the object side to carry out zooming.

The first lens group GR1 includes a meniscus lens G1 having a concave surface directed to the object side and having a negative refracting power, a prism G2 for bending an optical path, and a positive lens G3 having a biconvex shape whose opposite surfaces are formed as aspheric surfaces, disposed in order from the object side. The meniscus lens G1 having a negative refracting power and the prism G2 are composed of a glass material, and the positive lens G3 is formed of a resin material. The second lens group GR2 includes a single lens G4 in the form of a negative meniscus lens having a convex surface directed to the image side and an object side surface formed from an aspheric surface. The negative meniscus lens G4 is formed from a resin material. The third lens group GR3 includes a positive lens G5 of a biconvex shape whose opposite surfaces are formed as aspheric surfaces, and a negative meniscus lens G6 having a convex surface directed to the object side and having an image side surface formed as an aspheric surface, disposed in order from the object side. The positive lens G5 and the negative meniscus lens G6 are formed from a glass material. The fourth lens group GR4 is formed from a single lens G7 whose opposite surfaces are formed as aspheric surfaces in the form of a positive meniscus lens having a concave surface directed to the object side. The positive meniscus lens G7 is formed from a resin material. It is to be noted that a cover glass plate SG is interposed between the fourth lens group GR4 and an image surface IMG.

Lens data of a numerical value comparative example wherein particular numerical values are applied to the zoom lens 120 are indicated in Table 3 given below. It is to be noted that each aspheric surface is indicated by *. Further, various data such as various dimensions and surface distances and so forth are indicated in Table 4 and aspheric surface coefficients are indicated in Table 5.

TABLE 3 surface data

| Surface number | Radius of curvature | Surface distance | Refractive index (nd) | Abbe number (vd) |
|---|---|---|---|---|
| 1 | 93.027 | 0.60 | 1.834 | 37.3 |
| 2 | 6.516 | 1.29 | | |
| 3 | INFINITY | 5.50 | 1.834 | 37.3 |
| 4 | INFINITY | 0.20 | | |
| 5* | 76.069 | 1.33 | 1.583 | 30.0 |
| 6* | −8.017 | d6 | | |
| 7* | −5.286 | 0.50 | 1.530 | 55.8 |
| 8 | −68.485 | d8 | | |
| 9* | 3.166 | 1.71 | 1.583 | 59.5 |
| 10* | −5.144 | 0.40 | | |
| 11 | 10.688 | 1.40 | 1.821 | 24.1 |
| 12* | 2.232 | d12 | | |
| 13* | −6.751 | 1.49 | 1.530 | 55.8 |
| 14* | −3.004 | 1.10 | | |
| 15 | INFINITY | 0.50 | 1.517 | 64.2 |
| 16 | INFINITY | 0.50 | | |
| 17 (image surface) | INFINITY | | | |

TABLE 4 various data

| | Wide angle end | Intermediate focal length | Telephoto end |
|---|---|---|---|
| Focal length | 3.71 | 6.25 | 10.58 |
| F number | 2.87 | 3.82 | 5.51 |
| Angle of view [degrees] | 64.9 | 38.5 | 23.7 |
| Total length | 28 | | |
| BF | 2.1(1.1 + 0.5 + 0.5) | | |
| d6 | 1.10 | 2.78 | 1.10 |
| d8 | 7.18 | 3.12 | 0.60 |
| d12 | 3.20 | 5.58 | 9.78 |

TABLE 5 aspheric surface coefficient

| | |
|---|---|
| Fifth surface | $k = 0, A^4 = -4.494 \times 10^{-4}, A^6 = -6.218 \times 10^{-5}, A^8 = 9.711 \times 10^{-6}, A^{10} = 0$ |
| Sixth surface | $k = 0, A^4 = -4.511 \times 10^{-4}, A^6 = -7.505 \times 10^{-5}, A^8 = 1.610 \times 10^{-5}, A^{10} = -5.048 \times 10^{-7}$ |
| Seventh surface | $k = 0, A^4 = 7.153 \times 10^{-4}, A^6 = 1.131 \times 10^{-5}, A^8 = 6.331 \times 10^{-6}, A^{10} = -1.483 \times 10^{-6}$ |
| Eighth surface | $k = 0, A^4 = -3.685 \times 10^{-3}, A^6 = -1.198 \times 10^{-4}, A^8 = -3.954 \times 10^{-5}, A^{10} = -5.471 \times 10^{-6}$ |
| Tenth surface | $k = 0, A^4 = 8.412 \times 10^{-3}, A^6 = -8.761 \times 10^{-4}, A^8 = 1.886 \times 10^{-5}, A^{10} = 0$ |
| Twelfth surface | $k = 0, A^4 = -4.032 \times 10^{-3}, A^6 = 3.707 \times 10^{-4}, A^8 = 1.720 \times 10^{-3}, A^{10} = -5.972 \times 10^{-4}$ |
| Thirteenth surface | $k = 0, A^4 = 2.564 \times 10^{-3}, A^6 = 0, A^8 = 0, A^{10} = 0$ |
| Fourteenth surface | $k = 0, A^4 = 1.201 \times 10^{-2}, A^6 = -3.288 \times 10^{-4}, A^8 = 3.939 \times 10^{-6}, A^{10} = 7.719 \times 10^{-6}$ |

1-4. Comparison Between the Design Example 1 and the Comparative Example 1

Now, a result of comparison of the configuration and the optical characteristics of the zoom lenses according to the design example 1 and the comparative example 1 described above is described.

(a) Ratio of the Lens Thickness Sum Total to the Lens Total Length

First, where the ratio of the lens thickness sum total to the lens total length of the zoom lenses was determined, a result given below was obtained. It is to be noted that, in the expressions given below, the lens total length does not include the back focus BF and the parallel flat plates in the lenses is an air-conversion value.

Design example 1:lens thickness sum total/lens total length=13.5/26.3(mm)=51%

Comparative example 1:lens thickness sum total/lens total length=7/23.4(mm)=30%

Accordingly, in the zoom lens 101 which uses the variable lenses, although the number of lenses becomes comparatively great, a design of a small lens total length is achieved and miniaturization can be achieved. While this arises from the fact that such movement of a lens as in the comparative example is not required, it is considered that this arises from the fact that, particularly since the variable lenses are disposed on the object side and the image side, that is, in the first lens group and the fourth lens group, while the aberrations are suppressed with certainty, also the surface distances can be made comparatively small. Accordingly, if conditions of the magnification, aperture stop and so forth are same, an effect that the total zoom lens length can be reduced can be achieved.

On the contrary, also where an optical element for bending the optical path is disposed because there is no necessity to provide a space for lens movement, although a space for the optical element is assured, significant increase of the overall lens length can be avoided. In other words, it is possible to bend the optical path to suppress the overall thickness of the lens to make a housing slim and achieve miniaturization also in the lengthwise direction.

It is to be noted that it is more preferable to make the ratio of the thickness to the overall lens length equal to or higher than 40%. Where a variable lens is used, since it may be necessary to provide some lens driving mechanism, if the size of the lens driving mechanism is taken into account, then where the ratio is lower than 40%, it is difficult to achieve sufficient miniaturization. Accordingly, it is preferable to use a configuration wherein the ratio of the sum total of the lens thicknesses to the overall lens length is set equal to or higher than 40%.

(b) Optical Path Deflection Element

FIG. 3 shows a configuration of an example of a zoom lens where an optical path deflecting element for bending an optical path is added. Referring to FIG. 3, the zoom lens 102 shown includes a light path deflecting element 50 such as a mirror interposed between a first lens group 51 on the object side and a second lens group 52 on the image side. The arrangement position of the light path deflecting element 50 may be between any ones of the first to fourth lens groups 51 to 54 only if a sufficient surface distance is assured.

By bending the optical path in this manner, the size of the housing of the entire zoom lens 101 including the thickness and the width can be determined depending upon the aperture stop of the lens groups succeeding the second lens group 52 without depending upon the lens aperture stop of the first lens group 51 which preferably has the greatest aperture stop. Therefore, the width of the housing can be reduced in comparison with that in an alternative case wherein the light path deflecting element 50 is not provided. This is advantageous where the zoom lens 102 is incorporated in an electronic apparatus such as an image pickup apparatus and a mobile phone. On the other hand, with the zoom lens of the comparative example, in order to incorporate an optical path deflecting element, a space may be required separately, and in order to assure necessary surface distances, the zoom lens must be re-designed. According to the design example 1, there is an advantage that such design change is not required and it is easy to add an optical path deflecting element.

(c) Aberration Characteristics

Figure 4A:
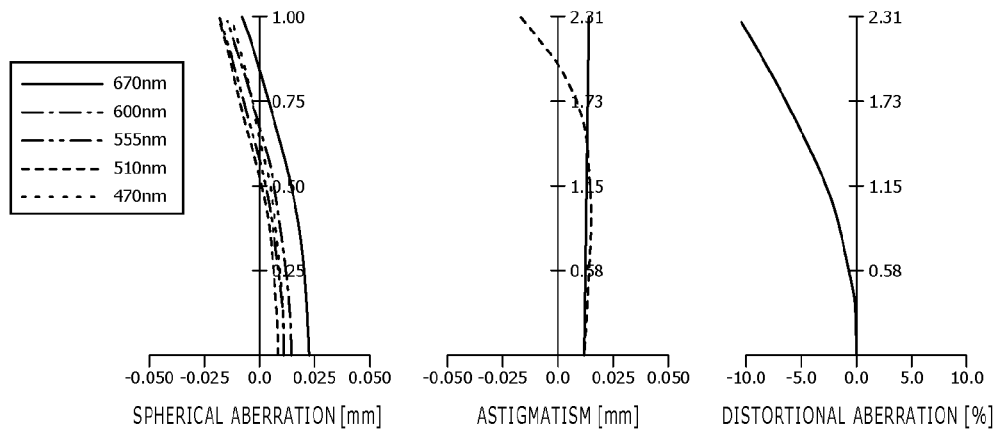
FIGS. 4A, 4B and 4C are diagrammatic views illustrating several aberration characteristics of the zoom lens shown in FIGS. 1A to 1C in a wide angle end state, an intermediate focal length state and a telephoto end state, respectively.
Figure 4B:
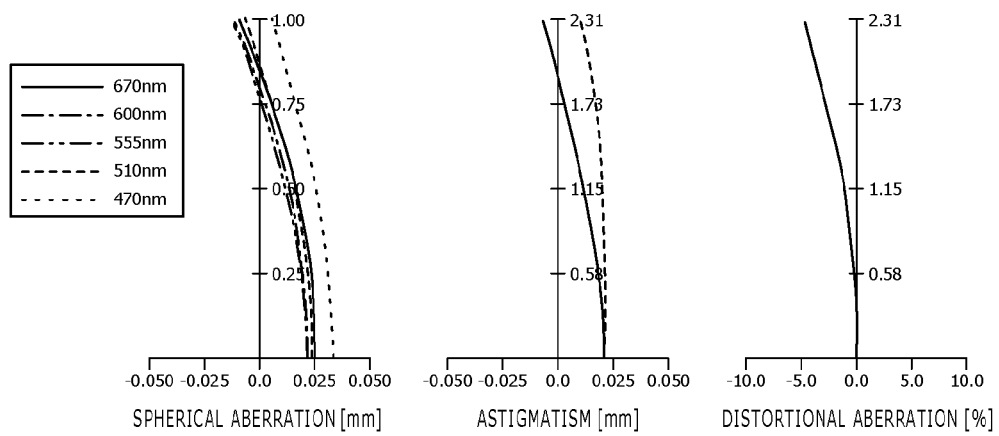
Figure 4C:
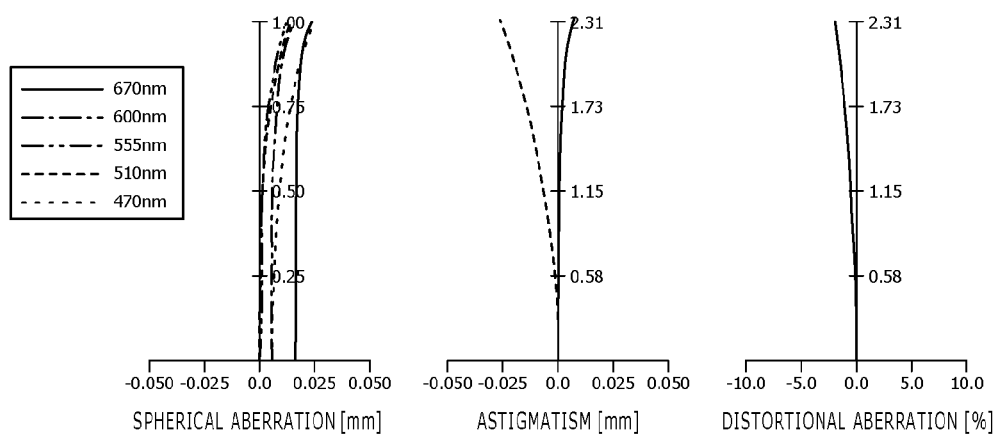

FIGS. 4A, 4B and 4C illustrate spherical aberration, astigmatism and distortional aberration in an infinitely remotely focused state of the design example 1 described above in a wide angle end state, an intermediate focal length state and a telephoto end state, respectively. It is to be noted that, in the figures of the spherical aberration, a solid line indicates the spherical aberration at the wavelength of 670 nm; an alternate long and short dash line indicates that at the wavelength of 600 nm; an alternate long and two short dashes line indicates that at the wavelength of 555 nm; a thick broken line indicates that at the wavelength of 510 nm; and a thin broken line indicates that at the wavelength of 470 nm. Further, in the figures of the astigmatism, a solid line indicates a sagittal image plane, and a broken line indicates a meridional image plane.

Figure 5A:
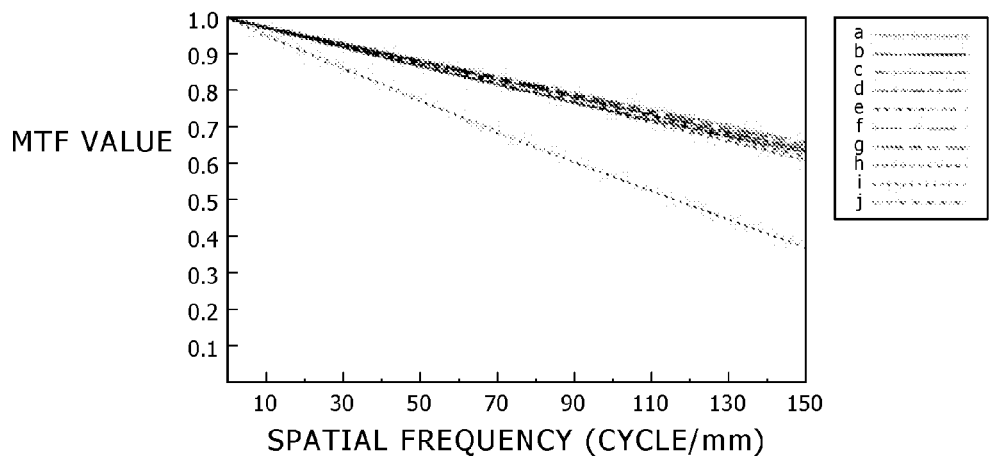
FIGS. 5A, 5B and 5C are diagrammatic views illustrating a spatial frequency characteristic of the zoom lens shown in FIGS. 1A to 1C in a wide angle end state, an intermediate focal length state and a telephoto end state, respectively.
Figure 5B:
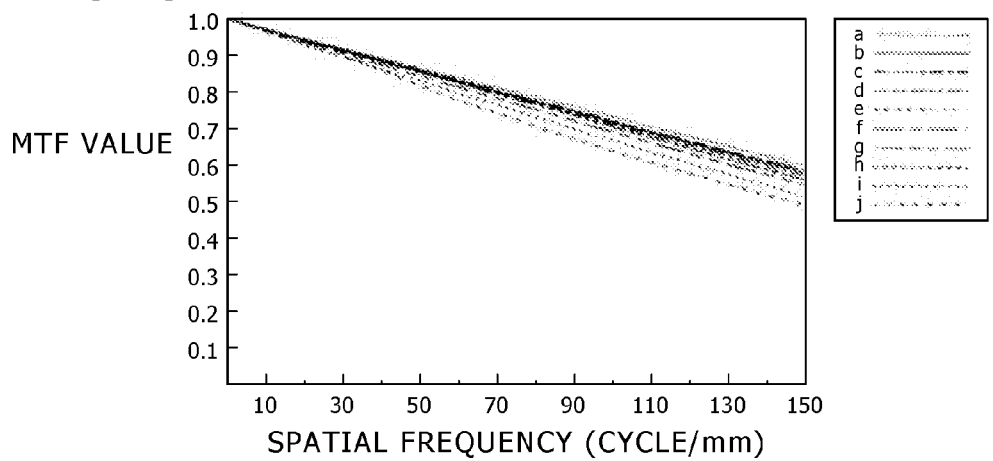
Figure 5C:
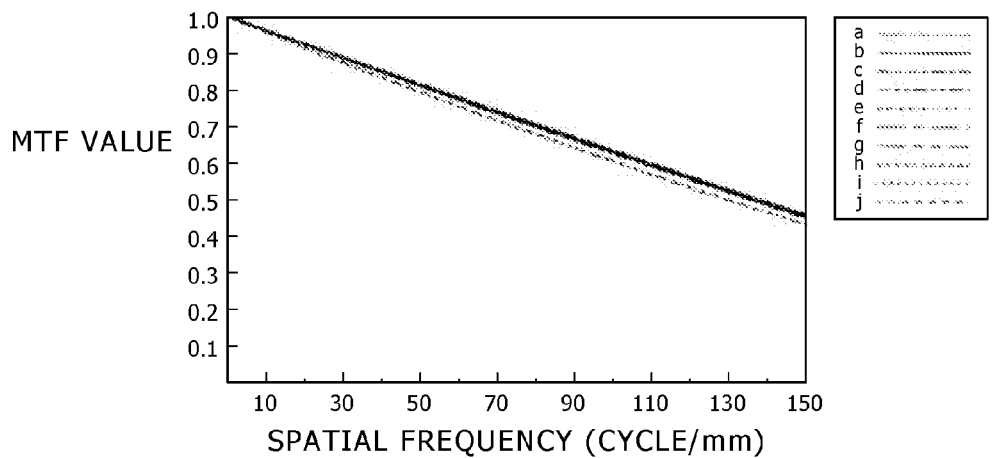

FIGS. 5A to 5C illustrate the MTF (Modulation Transfer Function) value with respect to the spatial frequency of the design example 1. In particular, FIGS. 5A, 5B and 5C illustrate MTF values at the reference wavelength of 555 nm in a wide angle end state, an intermediate focal length state and a telephoto end state, respectively. In FIGS. 5A to 5C, lines a and b indicate diffraction limits, and lines c and d indicate modulation degrees in tangential and radial directions at an image height of 30%; lines e and f indicate those at another image height of 50%; lines g and h indicate those at a further image height of 70%; and lines i and j indicate those at a still further image height of 100%.

From the results of FIGS. 4A to 4C and 5A to 5C, it can be recognized that the zoom lens according to the design example 1 has good optical characteristics in that the aberrations are suppressed and also the MTF values do not indicate disorder. It is to be noted that, though not shown, also the zoom lens according to the comparative example indicates values having no problem in regard to the aspheric aberration, astigmatism and distortional aberration.

Figure 6:
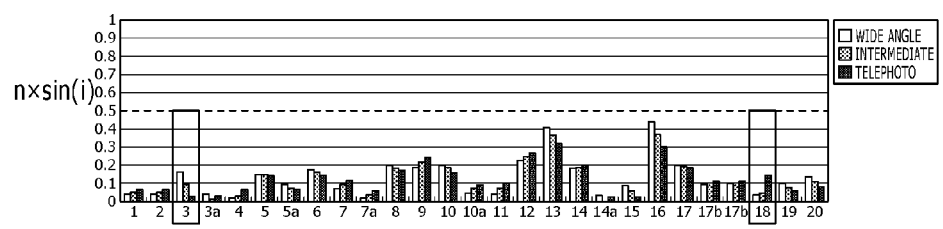
FIG. 6 is a diagrammatic view illustrating an incident angle characteristic of a peripheral light ray to lens surfaces of the zoom lens shown in FIGS. 1A to 1C.
Figure 7:
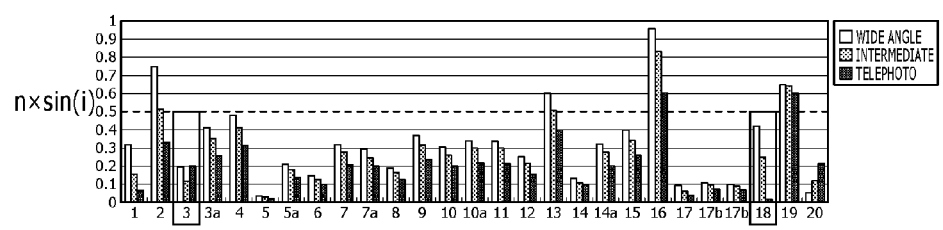
FIG. 7 is a diagrammatic view illustrating an incident angle characteristic of a main light ray to the lens surfaces of the zoom lens shown in FIGS. 1A to 1C.
Figure 8:
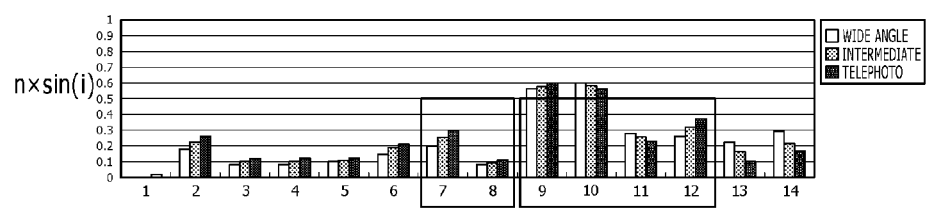
FIG. 8 is a diagrammatic view illustrating an incident angle characteristic of a peripheral light ray to lens surfaces of the zoom lens shown in FIGS. 2A and 2B.
Figure 9:
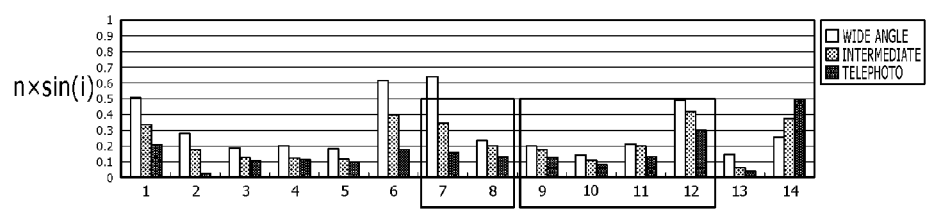
FIG. 9 is a diagrammatic view illustrating an incident angle characteristic of a main light ray to the lens surfaces of the zoom lens shown in FIGS. 2A and 2B.
Figure 10:
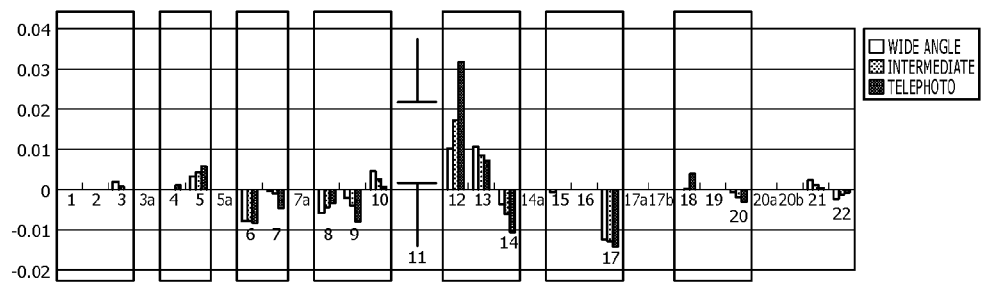
FIG. 10 is a diagrammatic view illustrating spherical surface aberration at the lens surfaces of the zoom lens shown in FIGS. 1A to 1C.
Figure 11:
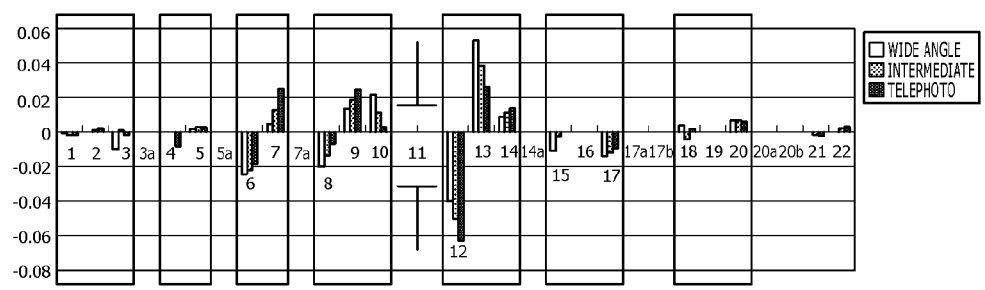
FIG. 11 is a diagrammatic view illustrating comatic aberration at the lens surfaces of the zoom lens shown in FIGS. 1A to 1C.
Figure 12:
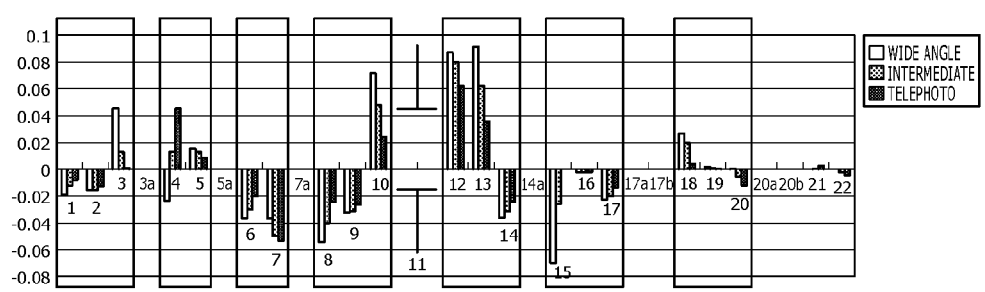
FIG. 12 is a diagrammatic view illustrating astigmatism at the lens surfaces of the zoom lens shown in FIGS. 1A to 1C.
Figure 13:
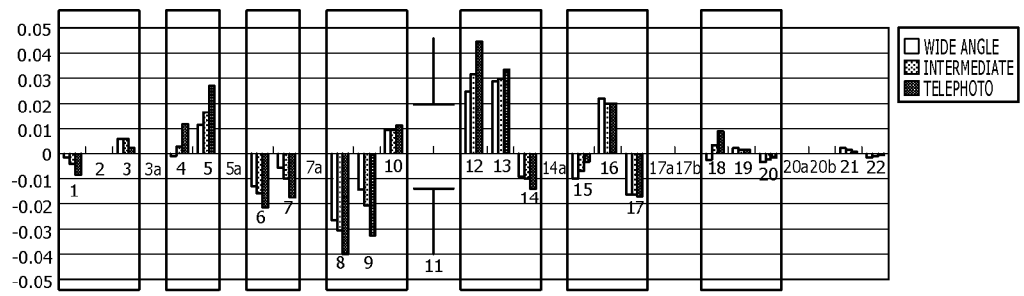
FIG. 13 is a diagrammatic view illustrating on-axis chromatic aberration at the lens surfaces of the zoom lens shown in FIGS. 1A to 1C.

Meanwhile, when the incident angle of a main light ray and a peripheral light ray to the lens surfaces was analyzed in regard to the design example 1 and the comparative example 1, it was found that the incident angle was smaller in the design example 1, that is, a light ray was incident at a smaller angle with respect to the optical axis in the design example 1. Consequently, the design example 1 is advantageous for aberration suppression. Results of the analysis are illustrated in FIGS. 6 to 9. In FIGS. 6 to 9, the axis of ordinate indicates n×sin(i) where n is the refractive index of the lens medium and i is the incident angle or emergent angle. FIGS. 6 and 7 illustrate results of the analysis regarding a peripheral light ray and a main light ray in the design example 1, respectively, and FIGS. 8 and 9 illustrate results of the analysis regarding a peripheral light ray and a main light ray in the comparative example 1, respectively. In FIGS. 6 to 9, for each of the lens surfaces, the value of n×sin(i) in a wide angle end state is indicated by a blank bar graph; that in an intermediate focal length state is indicated by a dotted bar graph; and that in a telephoto end state is indicated by a dark bar graph. It is to be noted that, in FIGS. 6 and 7, lens surfaces 3a, 5a, 7a, 10a, 14a, 17a and 17b are imaginary planes used for the light ray tracking analysis. Further, in FIGS. 6 to 9, variable lenses or movable lenses are indicated by a rectangular framework of a solid line.

If the results of FIGS. 6 and 7 are investigated, then while some surfaces in FIG. 7 which illustrates the n×sin(i) value in regard to a main light ray indicate n×sin(i)>0.5, those surfaces, that is, the second, thirteenth, sixteenth and nineteenth surfaces are pasted interfaces but are not interfaces with the air.

On the other hand, from the results of the comparative example illustrated in FIGS. 8 and 9, it can be recognized that some lens surfaces indicate n×sin(i)>0.5 in regard not only to a peripheral light ray but also to a main light ray. The lens surfaces are a lens surface in the second lens group GR2 or GR3 shown in FIG. 2 and the sixth surface of a lens opposing to the second lens group GR2. From the results, it can be recognized that, where a movable lens is used, some surface exists to which both of a peripheral light ray and a main light ray are incident at a great incident angle.

Accordingly, with the design example 1, a configuration can be implemented wherein the incident angle can be suppressed to a small angle in comparison with a zoom lens which uses a movable lens in the related art and both of a peripheral light ray and a main light ray are incident at a smaller angle with respect to the optical axis to all lens surfaces. Therefore, increase of the aberrations can be suppressed effectively.

It is to be noted that, in the design example 1 described above, since the position of the aperture stop 11 and the lens power on the image side with respect to the aperture stop 11 are set appropriately, the image side is in a telecentric state. Therefore, the design example 1 is advantageous also in that the light ray incident angle to the image pickup element 44 is comparatively proximate to the perpendicular angle.

Further, in the design example 1, the second lens group 52 includes a lens group of the Gauss type or of a type similar to the Gauss type. Calculated values of the spherical aberration, comatic aberration, astigmatism and on-axis chromatic aberration on the lens surfaces in the design example 1 in a wide angle end state, an intermediate focal length state and a telephoto end state, are illustrated in FIGS. 10 to 13, respectively. In FIGS. 10 to 13, the lens surfaces of pasted lenses and single lenses are individually surrounded by frameworks. The deformation surfaces of the variable lenses are the third and eighteenth surfaces.

From FIGS. 10 to 13, it can be recognized apparently that the spherical aberration and the comatic aberration are corrected by the lenses of the second lens group 52 disposed forwardly and backwardly of the aperture stop 11 and exhibit a value substantially equal to zero in the first lens group 51 on the object side and the fourth lens group 54 on the image side. On the other hand, it can be recognized that, although the astigmatism and the on-axis chromatic aberration remain a little, they are corrected likewise to some degree by the second lens group 52 and are suppressed to a low level in the first to fourth lens groups 51 to 54.

Figure 14:
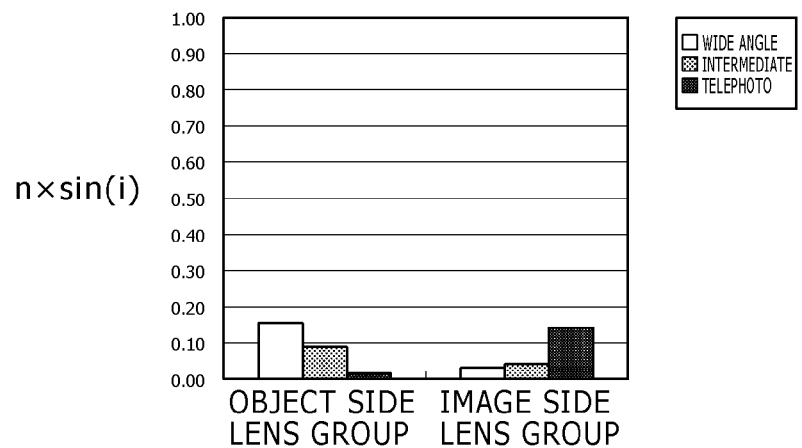
FIG. 14 is a diagrammatic view illustrating a mean value of an off-axis light ray incident angle characteristic of an object side lens group and an image side lens group of the zoom lens shown in FIGS. 1A to 1C.
Figure 15:
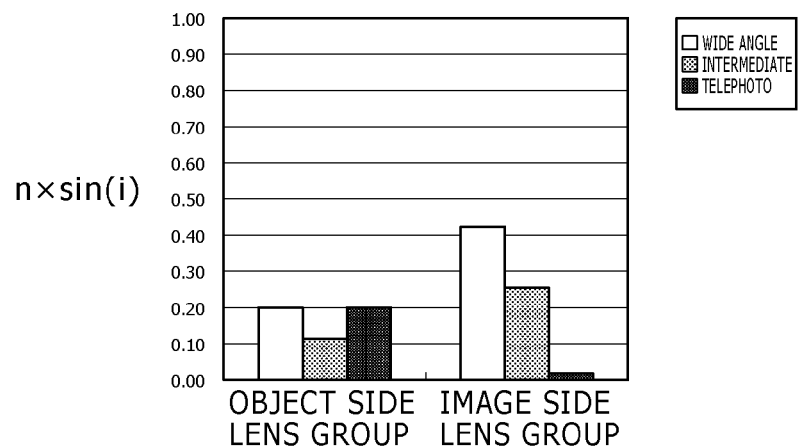
FIG. 15 is a diagrammatic view illustrating a mean value of a main light ray incident angle characteristic of the object side lens group and the image side lens group of the zoom lens shown in FIGS. 1A to 1C.

It is to be noted that FIGS. 14 and 15 indicate results of determination of a mean value of n×sin(i) in the first lens group 51 and the fourth lens group 54 in regard to a peripheral light ray and a main light ray shown in FIGS. 6 and 7. From FIGS. 14 and 15, it can be recognized that the mean value of n×sin(i) is less than 0.5 with the first to fourth lens groups 51 to 54 which include the first and second variable lenses 32 and 41, respectively.

Figure 16:
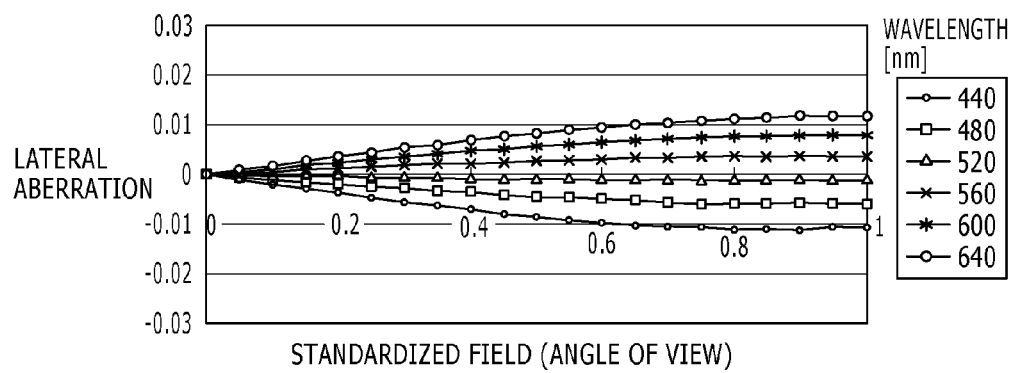
FIG. 16 is a diagrammatic view illustrating a lateral aberration characteristic of light rays of different wavelengths in a wide angle end state of the zoom lens shown in FIGS. 1A to 1C.
Figure 17:
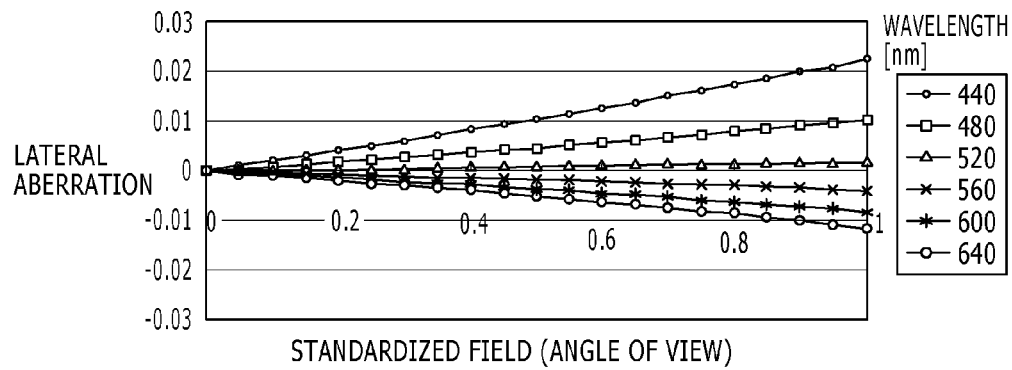
FIG. 17 is a diagrammatic view illustrating a lateral aberration characteristic of light rays of different wavelengths in a telephoto end state of the zoom lens shown in FIGS. 1A to 1C.

Further, in the design example 1, the magnification chromatic aberration is not corrected sufficiently. This is because the on-axis chromatic aberration can be corrected by signal processing. This signifies that, since, with the design example 1, the lateral aberration varies linearly, that is, proportionally in a linear function with respect to the angle of view in a used frequency, correction by signal processing is easy and a lens can be configured by correction by signal processing. FIGS. 16 and 17 indicate results of determination by an analysis of the lateral aberration with respect to a standardized field or field of view in regard to light rays of the wavelengths of 440 nm, 480 nm, 520 nm, 560 nm, 600 nm and 640 nm in a wide angle end state and a telephone end state, respectively. It is to be noted that, in FIGS. 16 and 17, the lateral aberration is indicated as a difference in a unit of μm from that at an image point where the wavelength of the light ray is 530 nm. From the results of FIGS. 16 and 17, it can be recognized that, particularly in a telephoto end state, the lateral aberration regarding all of the light rays of the wavelengths linearly vary with respect to the angle of view.

Figure 18:
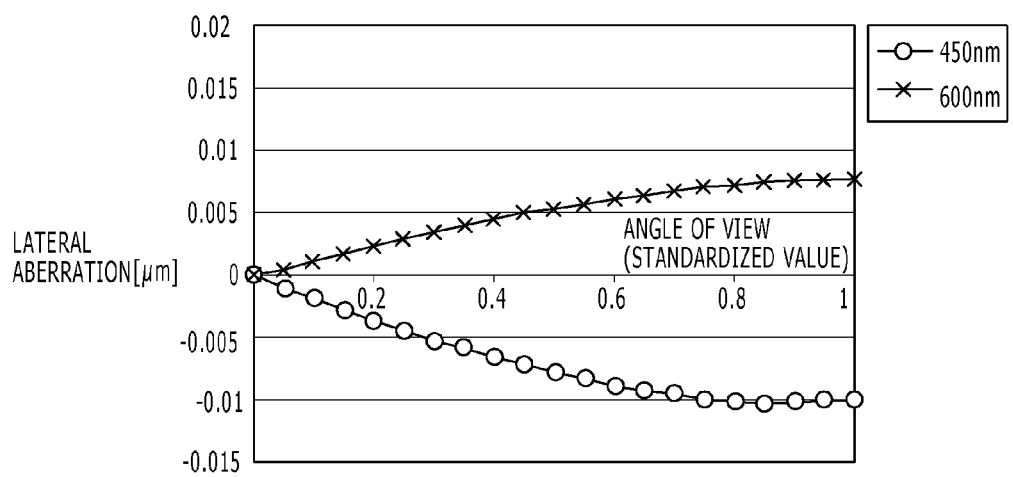
FIG. 18 is a diagrammatic view illustrating a lateral aberration characteristic in a wide angle end state of the zoom lens shown in FIGS. 1A to 1C.
Figure 19:
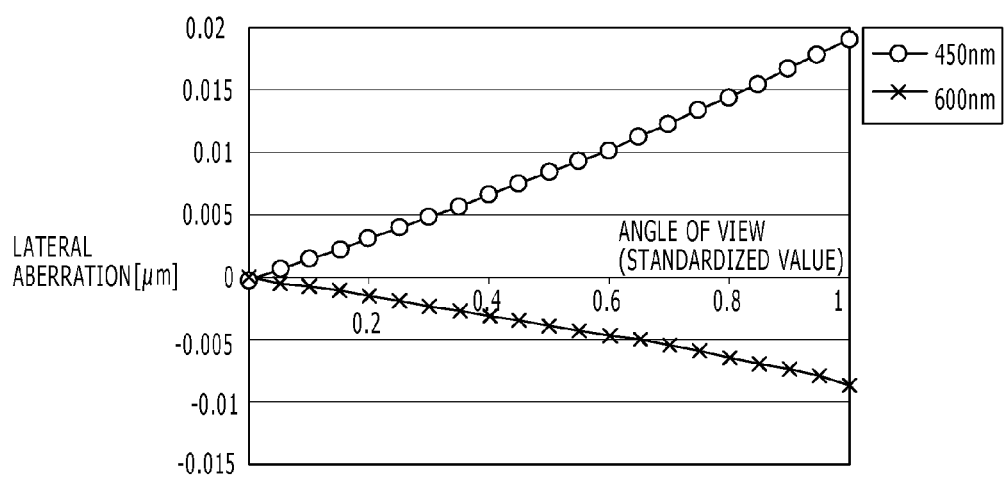
FIG. 19 is a diagrammatic view illustrating a lateral aberration characteristic in a telephoto end state of the zoom lens shown in FIGS. 1A to 1C.

Meanwhile, FIGS. 18 and 19 illustrate results of the analysis of the difference in a unit of μm of the lateral aberration from the image point of the wavelength of 530 nm in regard to light rays of the wavelengths of 450 nm and 600 nm. FIG. 18 shows a lateral aberration characteristic in a wide angle end state, and FIG. 19 shows a lateral aberration characteristic in a telephoto end state. From FIGS. 18 and 19, it can be determined that, particularly in a telephoto end state, the lateral aberration varies linearly with respect to the angle of view and, even if a magnification chromatic aberration correction element is not added, aberration correction by signal processing can be carried out. As regards a wide angle end state, the variation of the lateral aberration is a little different from a linear variation, and magnification chromatic aberration regarding a peripheral light ray remains. However, correction of the aberration can be carried out by signal processing as described above. Therefore, a comparatively simple lens configuration can be implemented without the necessity for further addition of an aberration correction element.

1-5. Design Example 2

Example of Lens Number Reduction

Now, a design example 2 wherein the number of lenses can be reduced as far as possible to achieve good aberration characteristics is described. While the zoom lens of the design example 1 has good optical characteristics, the distance from the first surface to the image surface is 30.33 mm, and it is demanded to reduce the distance of the optical path length as a zoom lens which uses a variable lens. Further, in the design example 1, a material having a comparative low refractive index is used as the medium of the lenses whose surface shape can be varied. Therefore, the power variation of the first lens group 51 is not very great, and it is difficult to reduce the optical path length. In order to increase the refracting power of the first lens group 51 which functions as a variator, also a method of increasing the variation region of the curvature is available. However, this method has a problem in that, where the curvature increases, the spherical aberration is deteriorated. Further, where liquid is used as the medium for a variable lens, the variable lens becomes a concave lens as in a telescope, and if a state wherein the curvature becomes great is involved, then the possibility that air bubbles may be generated occurs.

In order to solve such problems as described above, the zoom lens in the design example 2 uses a variable lens having a lens medium having a high refractive index for the first lens group 51 as a variator in order that the optical path length is made shorter than that in the design example 1. In the present example, the optical system is characterized in that the degree of freedom in design is increased by eliminating restriction to the incident angle of a main optical axis to an image pickup element.

A lens configuration of the zoom lens 103 in the present example is shown in FIGS. 20A to 20C. In particular, FIGS. 20A, 20B and 20C show the lens configuration in a wide angle end state, an intermediate focal length state and a telephoto end state, respectively. Referring to FIGS. 20A to 20C, the lens configuration shown includes a first lens group 151 having a first variable lens 132, a second lens group 152 including an aperture stop 11 sandwiched therein, and a third lens group 154 having a second variable lens 141. The first lens group 151 includes the first variable lens 132 having a variable surface shape and serving as a variator while the third lens group 154 has the second variable lens 141 having a variable surface shape and having a focusing function and a function as a compensator thereby to form a zoom optical system which can carry out power variation. In particular, the first lens group 151 includes a meniscus lens 131 convex toward the object side, a first variable lens 132, and a concave lens 133 and generally has a positive refracting power. The second lens group 152 includes the double-faced convex lens 134 positioned forwardly of the aperture stop 11 and having a positive refracting power, and lenses 135 and 136 having a doublet configuration and having a positive refracting power as a whole. A concave lens 137 and a convex lens 138 are disposed in a doublet configuration on the image side of the aperture stop and have a negative refracting power as a whole. The third lens group 154 includes a second variable lens 141 and a lens 142 pasted to the second variable lens 141 and having a surface convex to the object side and generally has a positive refracting power. A cover glass plate 143 is disposed between the third lens group 154 and the image surface taking it into account that an image pickup element 144 is disposed, for example, on the image surface 20. Also in FIG. 20, the lens surfaces are numbered in order from 0 to 20 from the object side.

In the present design example 2, liquid having optical constants of the refractive index nd of a d line of nd=1.5057 and the Abbe number vd of vd=34.9 is used for the first and second variable lenses 132 and 141 whose surface shape is variable. Various dimensions of the zoom lens in the design example 2 are indicated in Table 6 given below, and various data are indicated in Table 7.

TABLE 6 surface data

| Surface number | Radius of curvature | Surface distance | Refractive index (nd) | Abbe number (vd) | Effective diameter |
|---|---|---|---|---|---|
| 1 | 7.03737 | 1.41 | 1.747286 | 37.79 | 4.04 |
| 2 | 18.95952 | d22 | 1.5057 | 34.9 | 3.7123 |
| 3 | r23 | d23 | | | 2.8498 |
| 4 | 123.36383 | 0.75 | 1.755201 | 27.58 | |
| 5 | 4.58215 | 5.5 | | | 2.6492 |
| 6 | 37.18724 | 1.02 | 1.753021 | 29.78 | 2.3146 |
| 7 | −14.01367 | 0.8 | | | 2.3554 |

TABLE 6-continued surface data

| Surface number | Radius of curvature | Surface distance | Refractive index (nd) | Abbe number (vd) | Effective diameter |
|---|---|---|---|---|---|
| 8 | 6.30822 | 1.06 | 1.743972 | 44.85 | 1.9946 |
| 9 | 49.71571 | 0.8 | 1.535923 | 50.44 | 1.9447 |
| 10 | 5.41752 | 0.4 | | | |
| 11 | Apertures stop | 1.2 | | | |
| 12 | 26.91075 | 0.8 | 1.755201 | 27.58 | 1.4806 |
| 13 | 3.4863 | 1.54 | 1.634968 | 57.58 | 1.2276 |
| 14 | −9.39829 | d214 | | | 1.2697 |
| 15 | r215 | d215 | 1.5057 | 34.90 | |
| 16 | 3.62705 | 1.62 | 1.62041 | 60.32 | |
| 17 | −1395.48172 | 1.941048 | | | 1.642 |
| 18 | INFINITY | 0.105 | 1.51633 | 64.14 | 1.817 |
| 19 | INFINITY | 2.089027 | | | 1.8482 |
| 20 (image surface) | INFINITY | | | | |

TABLE 7 various data

Zoom ratio 3

| | Wide angle end | Intermediate focal length | Telephoto end |
|---|---|---|---|
| Focal length | 3.73 | 6.46 | 11.19 |
| F number | 3.20 | 3.64 | 4.78 |
| Angle of view [degrees] | 63.4 | 39.3 | 23.3 |
| Total length | | 26.4 (fixed) | |
| BF | | 4.03 (except cover glass thickness) | |
| d22 | 0.03042 | 0.84686 | 1.22928 |
| r23 | 3.47577 | 5.91976 | 10.86437 |
| d23 | 1.861958 | 1.05314 | 0.67072 |
| d214 | 1.97739 | 2.41492 | 3.41536 |
| r215 | 9.17703 | 25.95864 | −7.93467 |
| d215 | 1.63261 | 1.19508 | 0.19464 |

In this manner, in the present design example 2, the distance from the lens first surface to the image is 26.4 mm. Accordingly, if the present design example 2 is used, then reduction of the optical path length by approximately 13% can be achieved in comparison with the design example 1. Further, the total length which includes the back focus and parallel flat plates (in air-conversion value) is 22.45 mm, and the total glass thickness is 10.4 mm and the ratio of them is 10.4/22.45≈46.4%. In other words, the number of lenses is reduced from that in the design example 1 while the length of the air portion is reduced to achieve significant compression of the total length.

The effective diameter of the second variable lens 141 which is a compensator decreases by approximately 2.247/2.579≈12.9% with respect to the design example 1. From this, by inserting a light deflecting element such as a returning mirror between the first lens group 151 and the second lens group 152, reduction in thickness of the zoom lens housing can be achieved as a whole because the thickness and the width of the housing of the entire zoom lens depend upon the effective diameter of the optical system following the second lens group 152. The design example 2 further has an advantage that an optical system having a lower F value than that in the design example 1 can be implemented.

Figure 21A:
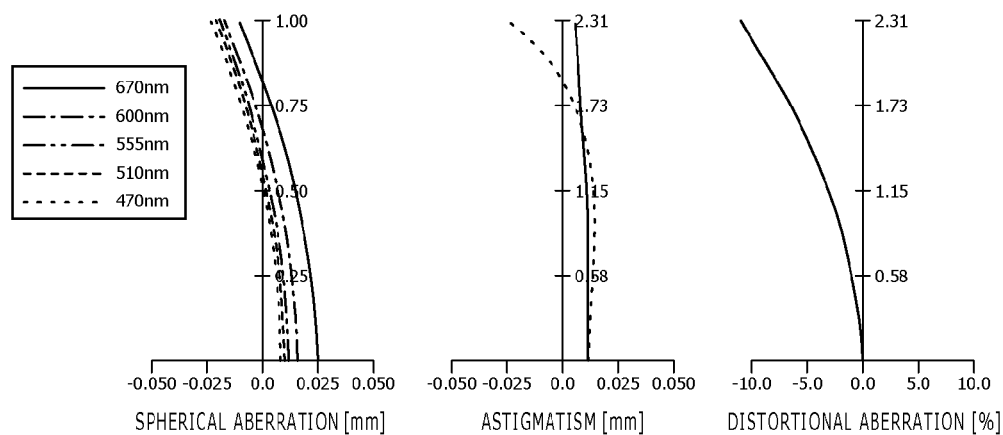
FIGS. 21A, 21B and 21C are diagrammatic views illustrating several aberration characteristics of the zoom lens shown in FIGS. 20A to 20C in a wide angle end state, an intermediate focal length state and a telephoto end state, respectively.
Figure 21B:
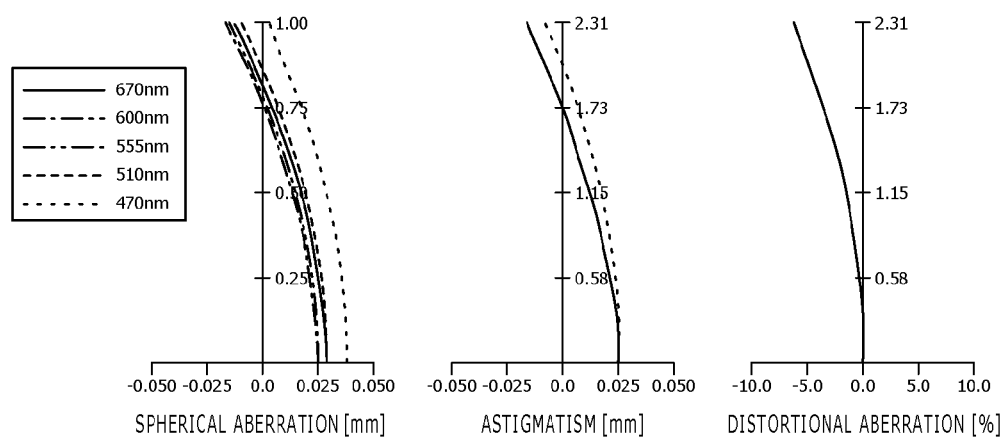
Figure 21C:
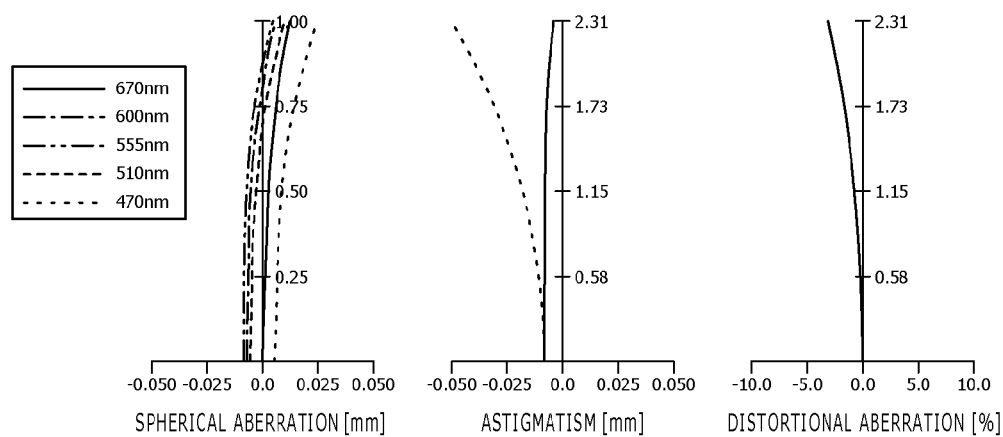
Figure 22A:
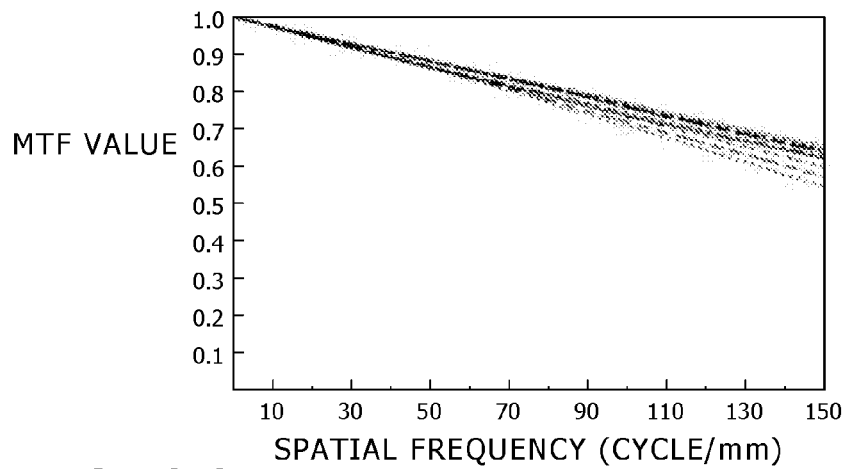
FIGS. 22A, 22B and 22C are diagrammatic views illustrating a spatial frequency characteristic of the zoom lens shown in FIGS. 20A to 20C in a wide angle end state, an intermediate focal length state and a telephoto end state, respectively.
Figure 22B:
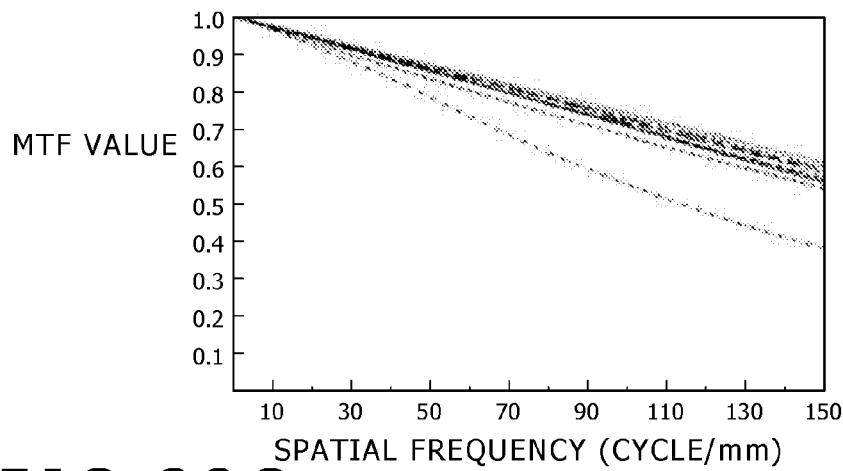
Figure 22C:
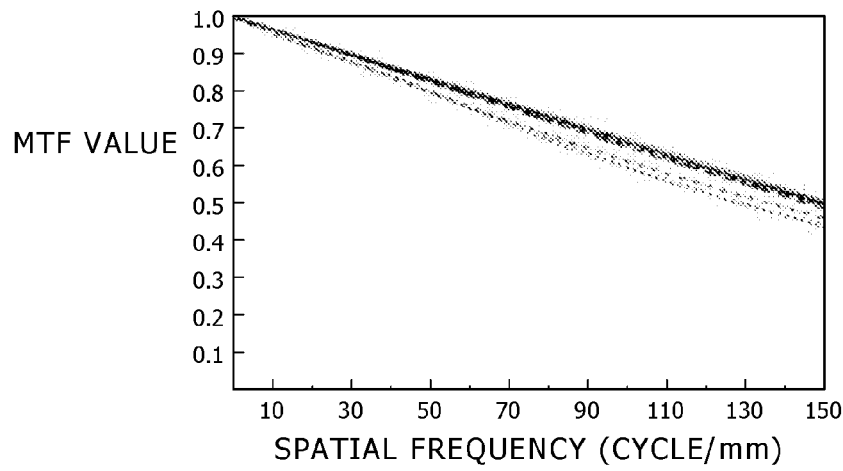

The spherical aberration, astigmatism and distortional aberration in a wide angle end state, an intermediate focal length state and a telephoto end state in the design example 2 are illustrated in FIGS. 21A, 21B and 21C, respectively. In the views of the spherical aberration, a solid line indicates the spherical aberration at the wavelength of 670 nm; an alternate long and short dash line indicates that at the wavelength of 600 nm; an alternate long and two short dashes line indicates that at the wavelength of 555 nm; a thick broken line indicates that at the wavelength of 510 nm; and a thin broken line indicates that at the wavelength of 470 nm. Meanwhile, in the views of the astigmatism, a solid line indicates a sagittal image plane, and a broken line indicates a meridional image plane. Further, MTF spatial frequency characteristics in a wide angle end state, an intermediate focal length state and a telephoto end state at the reference wavelength of 555 nm are illustrated in FIGS. 22A, 22B and 22C, respectively. Also in FIGS. 22A to 22C, lines a and b indicate diffraction limits, and lines c and d indicate modulation degrees in tangential and radial directions at an image height of 30%; lines e and f indicate those at another image height of 50%; lines g and h indicate those at a further image height of 70%; and lines i and j indicate those at a still further image height of 100%. From the results of the FIGS. 21A to 21C and 22A to 22C, it can be recognized that, also with the design example 2, good aberration characteristics are obtained.

Figure 23:
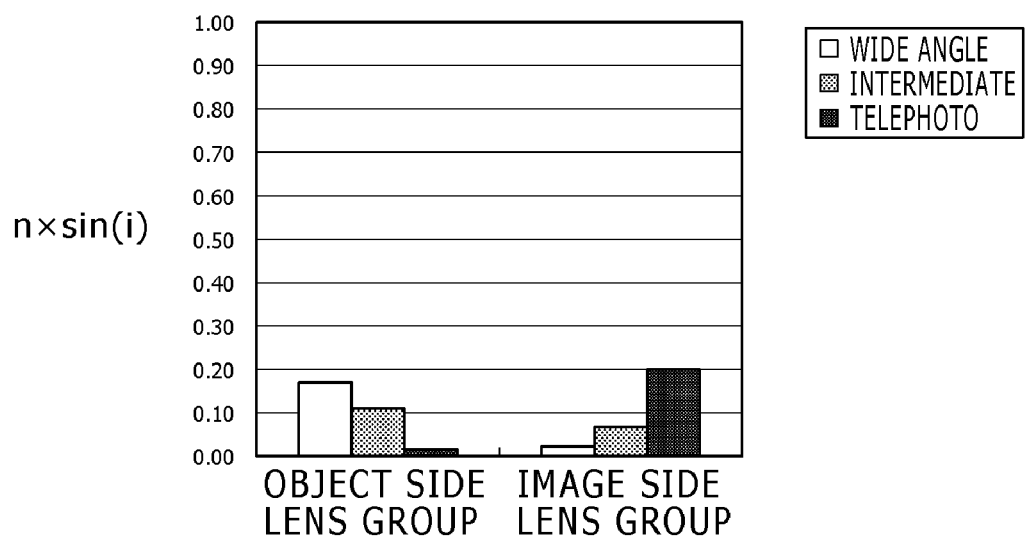
FIG. 23 is a diagrammatic view illustrating a mean value of an off-axis light ray incident angle characteristic of an object side lens group and an image side lens group of the zoom lens shown in FIGS. 20A to 20C.
Figure 24:
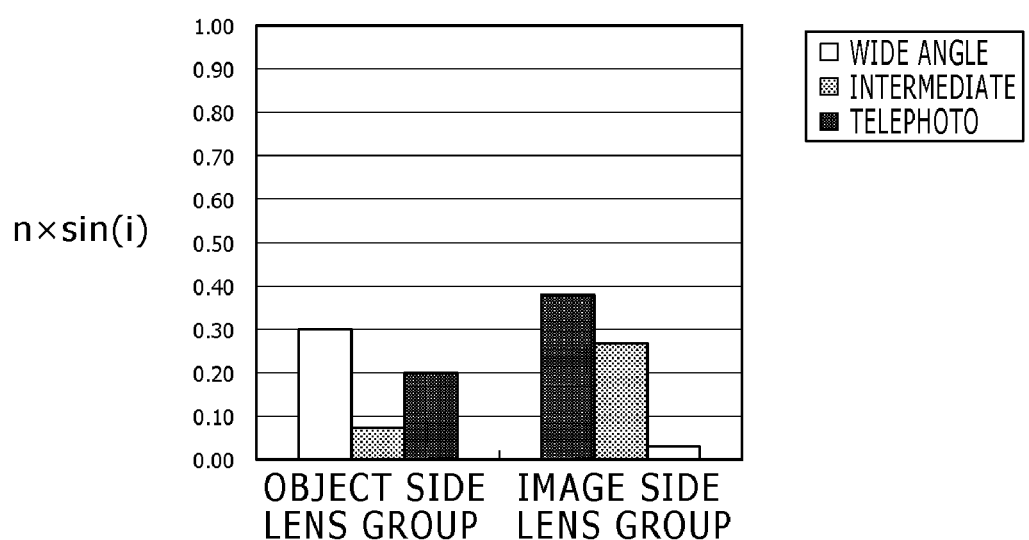
FIG. 24 is a diagrammatic view illustrating a mean value of a main light ray incident angle characteristic of the object side lens group and the image side lens group of the zoom lens shown in FIGS. 20A to 20C.

FIGS. 23 and 24 illustrate results of determination of the mean value of n×sin(i) in the first lens group 151 and the third lens group 153 with regard to an off-axis light ray and a main light ray. From FIGS. 23 and 24, it can be recognized that the mean value of n×sin(i) becomes less than 0.5 in regard to the first and third lens groups 151 and 153 including the first and second variable lenses 132 and 141.

Figure 25:
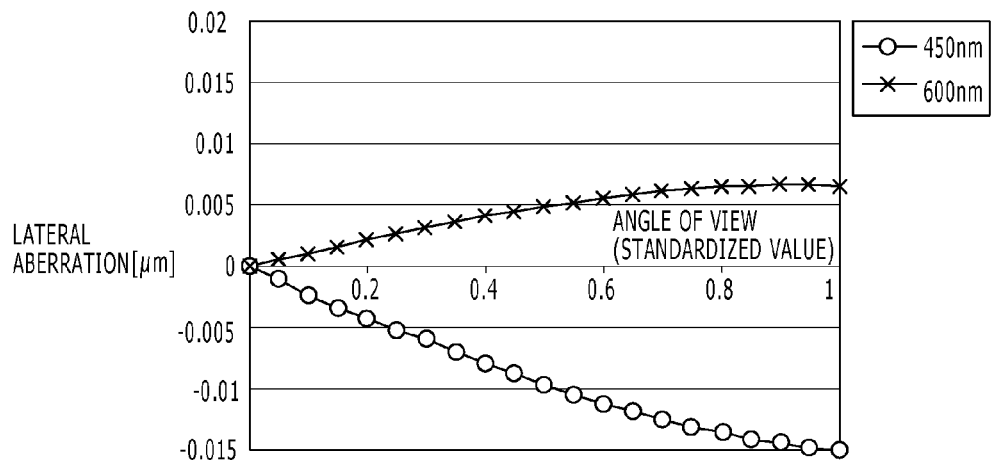
FIG. 25 is a diagrammatic view illustrating a lateral aberration characteristic in a wide angle end state of the zoom lens shown in FIGS. 20A to 20C.
Figure 26:
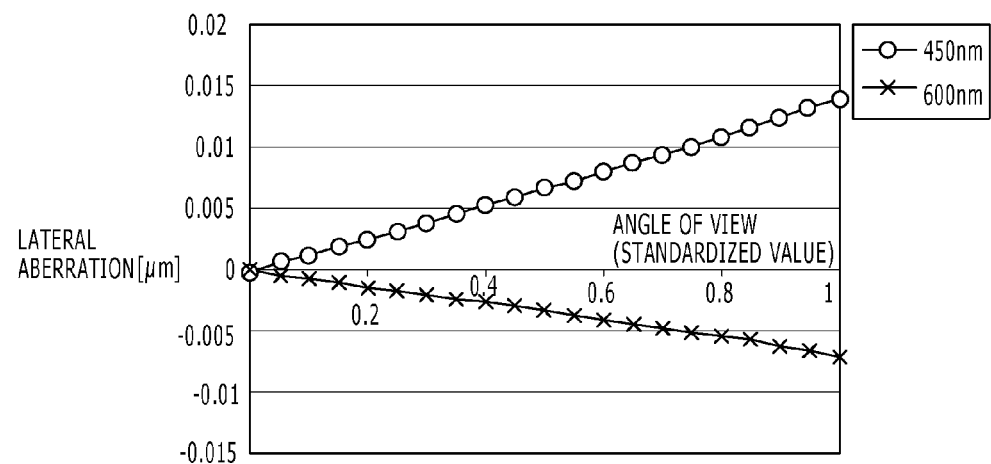
FIG. 26 is a diagrammatic view illustrating a lateral aberration characteristic in a telephoto end state of the zoom lens shown in FIGS. 20A to 20C.

FIGS. 25 and 26 illustrate results of an analysis of the difference in a unit of μm of the lateral aberration to a standardized field or angle of view from the image point of the wavelength of 530 nm in regard to light rays of the wavelengths of 450 nm and 600 nm. In particular, FIG. 25 illustrates the lateral aberration in a wide angle end state and FIG. 26 illustrates the lateral aberration in a telephoto end state. From FIGS. 25 and 26, also in the present example, it can be determined that, particularly in a telephoto end state, the lateral aberration varies linearly with respect to the angle of view and, even if a magnification chromatic aberration correction element is not added, aberration correction by signal processing can be carried out. As regards a wide angle end state, although the variation of the lateral aberration is a little different from a linear variation, it remains in a range in which there is no problem. In other words, the design example 2 is configured such that magnification chromatic aberration remains. However, correction of the aberration can be carried out by signal processing as described above. Therefore, a simpler lens configuration than in the design example 1 can be implemented without the necessity for addition of an aberration correction element.

2. Second Embodiment

Zoom Lens which Uses an Aspheric Surface

Now, a zoom lens according to a second embodiment of the present invention is described. The zoom lens of the present second embodiment is similar to that of the first embodiment except that at least one surface of fixed lenses is formed as an aspheric surface. First, a reference example wherein a deviation of a deformation surface of a pressure lens from a spherical surface is taken into consideration.

2-1. Reference Example 1

Explanation of Deviation Amount of the Deformation Surface from the Spherical Surface In the optical system of the zoom lens according to the first embodiment described hereinabove, the variable lenses used for the variator and the compensator have spherical surfaces. Where not an electro-wetting lens but a refracting surface deformation type lens wherein such a transparent elastic film of silicon resin or the like as described hereinabove is used for the variable lenses to be deformed by changing liquid pressure, the actual surface shape deviates to some degree from a spherical surface shape. Further, the sag amount of the refracting surface deformation type lens is great. In particular, as the curvature increases, the deviation amount described above becomes more conspicuous, and the influence had on the optical characteristics may not be ignored. In the following description, the deviation amount from the spherical surface is referred to as spherical surface deviation amount.

Therefore, an optical system which reflects a surface shape of an actual refracting surface deformation type lens is deteriorated particularly in characteristics in comparison with design values. Above all, deterioration of optical performances in a wide angle end state in which the curvature of the variator exhibits a maximum value appears conspicuously. Further, it is considered that, if the zoom rate is high, then since it becomes necessary to earn the refracting power variation at the deformation surface, then the curvature variation, that is, the deformation amount, becomes greater and also the spherical surface deviation amount becomes greater in comparison with that of a zoom lens of a lower magnification. Furthermore, the spherical surface deviation amount depends on tension of a film or the like forming the deformation surface.

Accordingly, in design of a zoom lens wherein a refracting surface deformation type lens is used as a variable lens, improvement of optical characteristics can be anticipated by configuring an optical system taking the aspheric surface shape of the refracting surface deformation type lens into consideration. Therefore, the zoom lens according to the second embodiment is provided in order to achieve improvement of optical characteristics by alteration of various dimensions of the fixed lens groups based on the zoom lens according to the first embodiment taking it into consideration that the surface shape of the refracting surface deformation type lens becomes an aspheric surface shape.

Here, a lens whose surface shape is varied is described taking a refracting surface deformation type lens as an example. It is to be noted that it is considered that also a refracting surface deformation type gel lens has a similar characteristic of shape variation.

Surface data where the deformation faces of the first and second variable lenses 32 and 41 are formed as aspheric surfaces in the design example 1 described hereinabove with reference to FIGS. 1A to 1C are indicated in Table 8 given below, and various dimensions and surface distances are indicated in Table 9 given below while aspheric surface data are indicated in Table 10 given below.

TABLE 8 surface data

| Surface number | Radius of curvature | Surface distance | Refractive index(nd) | Abbe number(vd) | Effective diameter |
|---|---|---|---|---|---|
| 1 | 16.1754 | 1.41 | 1.7440 | 44.79 | 4.0607 |
| 2 | −109.60855 | d12 | 1.5057 | 34.90 | 3.6864 |
| 3* | r13 | d13 | | | 3.0238 |
| 4 | −29.15474 | 0.6 | 1.7552 | 27.51 | 2.76 |
| 5 | 11.91251 | 5.5 | | | 2.5976 |
| 6 | 15.09107 | 1.02 | 1.7440 | 44.79 | 2.6296 |
| 7 | −20.45717 | 0.8 | | | 1.9999 |
| 8 | 5.70415 | 1.06 | 1.7552 | 27.53 | 1.576 |
| 9 | −89.48983 | 0.8 | 1.5225 | 59.84 | 1.3346 |
| 10 | 3.98084 | 0.4 | | | 1.0366 |
| 11 | Aperture stop | 1.2 | | | 0.9502 |
| 12 | −4.81816 | 0.8 | 1.7552 | 27.53 | 1.1125 |
| 13 | 5.7367 | 1.54 | 1.5638 | 60.83 | 1.3166 |
| 14 | −5.40399 | 1.61 | | | 1.5993 |
| 15 | 20.74906 | 0.8 | 1.7408 | 27.79 | 2.1095 |
| 16 | 4.4 | 2.35 | 1.7434 | 44.79 | 2.2475 |
| 17 | −10.56317 | d117 | | | 2.4 |
| 18* | r118 | d118 | 1.5057 | 34.90 | 2.5785 |
| 19 | 4.85262 | 1.62 | 1.5638 | 60.83 | 2.4557 |
| 20 | 24.27371 | 1.941048 | | | 2.3646 |
| 21 | INFINITY | 0.105 | 1.5163 | 64.14 | |
| 22 | INFINITY | 1.97763 | | | |
| 23 (image surface) | INFINITY | | | | |

TABLE 9 various data

Zoom ratio 3

| | Wide angle end | Intermediate focal length | Telephoto end |
|---|---|---|---|
| Focal length | 3.73 | 6.46 | 11.19 |
| F number | 3.2 | 3.85 | 5.3 |
| Angle of view [degrees] | 63.4 | 39.3 | 23.3 |
| Total length | | 30.3 (fixed) | |
| BF | | 3.9 (except cover glass thickness) | |
| d12 | 0.03042 | 0.84686 | 1.22928 |
| r13 | 4.70096 | 9.17627 | 21.45534 |
| d13 | 1.86958 | 1.05314 | 0.67072 |
| d117 | 1.26741 | 1.69039 | 2.59977 |
| r118 | 7.40355 | 12.94742 | −16.43472 |
| d118 | 1.63259 | 1.20961 | 0.30023 |

TABLE 10 aspheric surface coefficient

| | Wide angle end | Intermediate focal length | Telephoto end |
|---|---|---|---|
| Third surface | | | |
| k | −1 | −1 | −1 |
| $A^4$ | $1.5507 \times 10^{-3}$ | $1.9793 \times 10^{-4}$ | $-7.7287 \times 10^{-6}$ |
| $A^6$ | $6.4537 \times 10^{-5}$ | $3.2942 \times 10^{-6}$ | $9.1154 \times 10^{-6}$ |
| $A^8$ | $-1.4741 \times 10^{-6}$ | $-2.5720 \times 10^{-8}$ | $-1.5517 \times 10^{-6}$ |
| $A^{10}$ | $3.5145 \times 10^{-7}$ | $-2.8353 \times 10^{-9}$ | $9.3965 \times 10^{-8}$ |
| 18th surface | | | |
| k | −1 | −1 | −1 |
| $A^4$ | $3.3057 \times 10^{-4}$ | $1.8181 \times 10^{-5}$ | $3.3148 \times 10^{-5}$ |
| $A^6$ | $3.2447 \times 10^{-5}$ | $2.3226 \times 10^{-5}$ | $-4.0486 \times 10^{-5}$ |
| $A^8$ | $-4.5300 \times 10^{-6}$ | $-4.0617 \times 10^{-6}$ | $1.0280 \times 10^{-5}$ |
| $A^{10}$ | $2.7591 \times 10^{-7}$ | $2.5643 \times 10^{-7}$ | $-9.3530 \times 10^{-7}$ |

Figure 27:
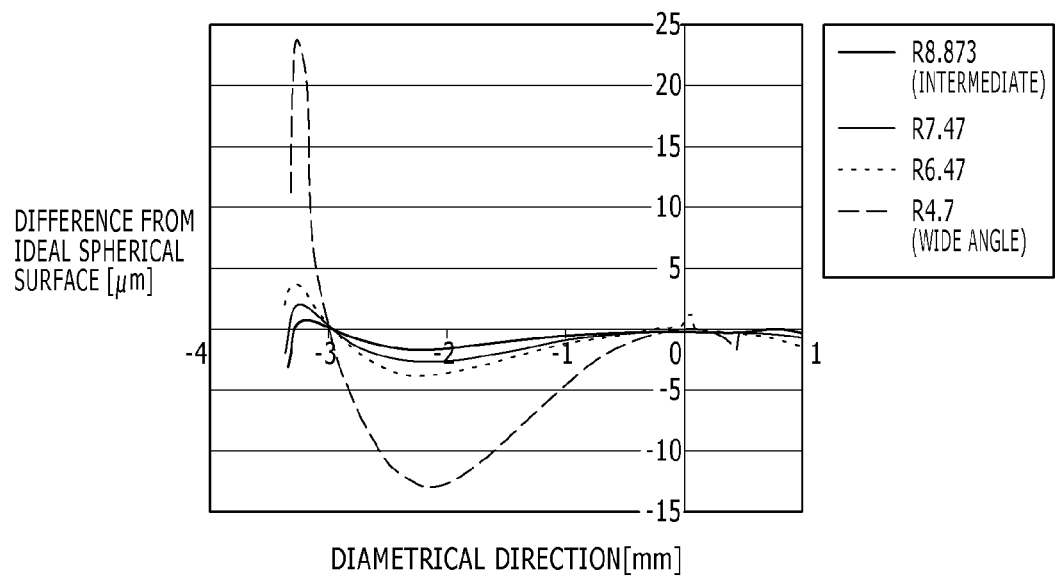
FIG. 27 is a diagrammatic view illustrating a difference of a spherical surface of a refracting surface deformation type lens in a diametrical direction from an ideal spherical surface.
Figure 28:
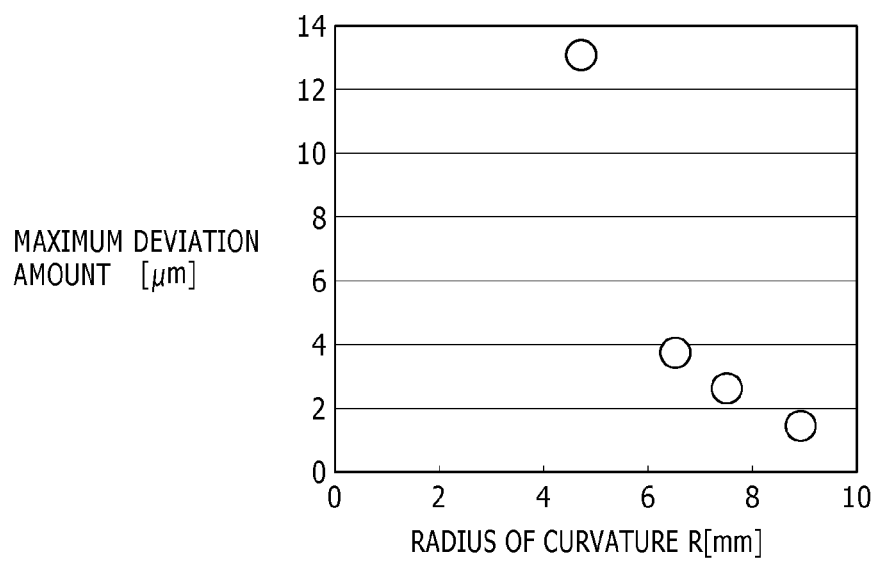
FIG. 28 is a diagrammatic view illustrating a maximum deviation amount of a radius of curvature of a refracting surface deformation type lens from a spherical surface.

FIG. 27 illustrates the difference of the deformation surface of a variable lens of the refracting surface deformation type incorporated as the variator in the present reference example 1, that is, a cross section taken along a diametrical direction and passing the surface center of the third surface, from an ideal spherical surface. Meanwhile, FIG. 28 illustrates a maximum spherical surface deviation amount with respect to the radius R of curvature of the third surface. It is to be noted that, for the convenience of description, the fitted ideal spherical surface has a lens effective diameter of φ6 mm in a wide angle end state of the variator in the design example 1.

From FIG. 27, it can be seen that, as the radius of curvature changes from 8.873 mm, which is an intermediate focal length, successively to 7.47 mm, 6.47 mm and 4.7 mm, which corresponds to the wide angle end, the variation in the diametrical direction increases. Further, as can be recognized from FIG. 28, as the radius of curvature of the variable lens of the refracting surface deformation type decreases, or in other words, as the curvature increases, the spherical surface deviation amount of the lens surface of the refracting surface deformation type lens becomes more conspicuous. With the radius at the wide angle end, a spherical deviation of approximately 13 μm occurs in the maximum.

Figure 29A:
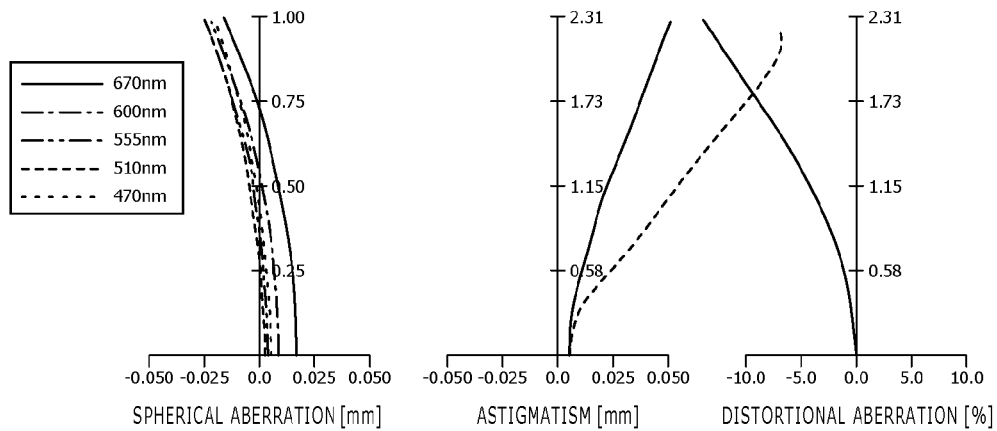
FIGS. 29A, 29B and 29C are diagrammatic views illustrating several aberration characteristics of a zoom lens according to a reference example 1 which reflects the surface shape of a variable lens of the zoom lens shown in FIG. 1 in a wide angle end state, an intermediate focal length state and a telephoto end state, respectively.
Figure 29B:
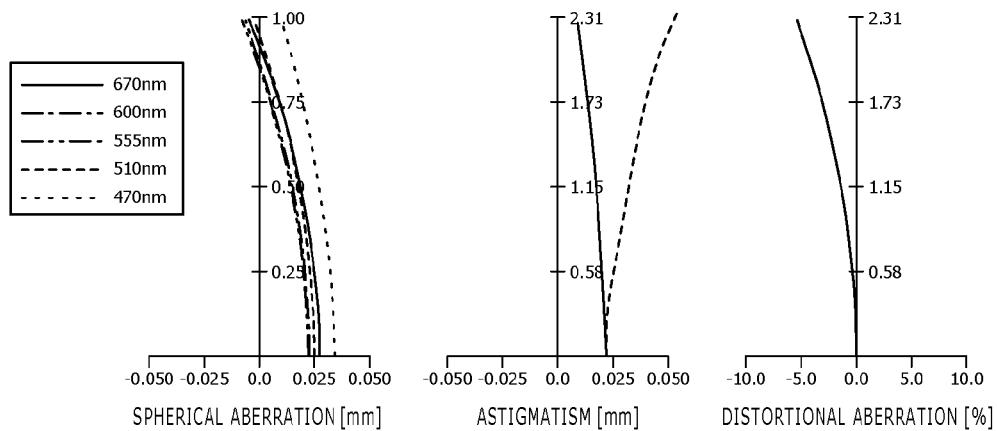
Figure 29C:
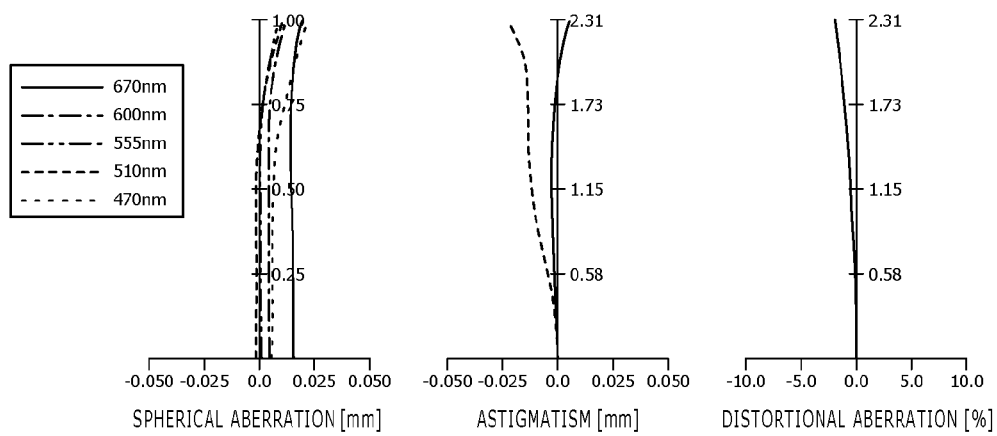
Figure 30A:
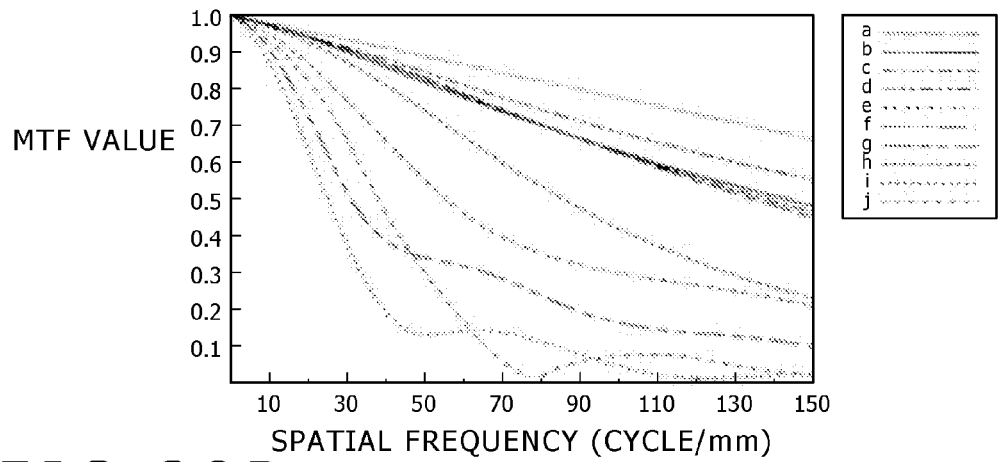
FIGS. 30A, 30B and 30C are diagrammatic views illustrating a spatial frequency characteristic of the zoom lens according to the reference example 1 which reflects the surface shape of the variable lens of the zoom lens shown in FIG. 1 in a wide angle end state, an intermediate focal length state and a telephoto end state, respectively.
Figure 30B:
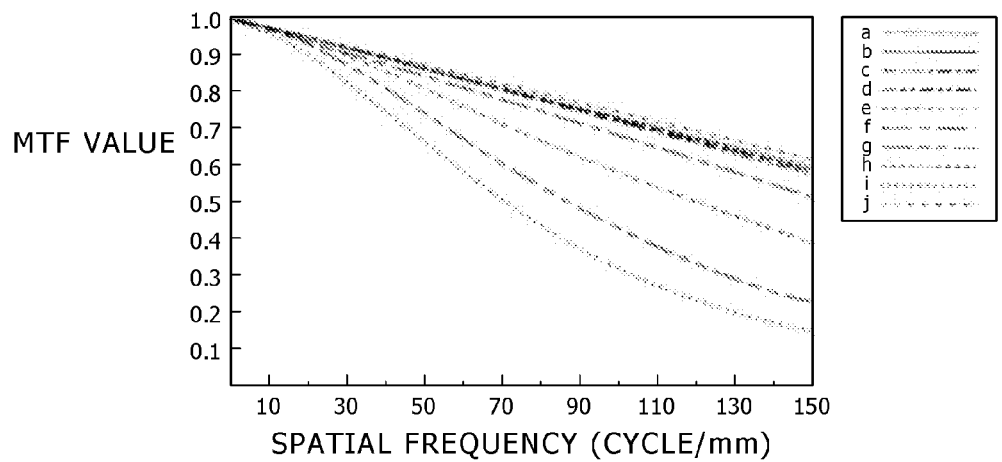
Figure 30C:
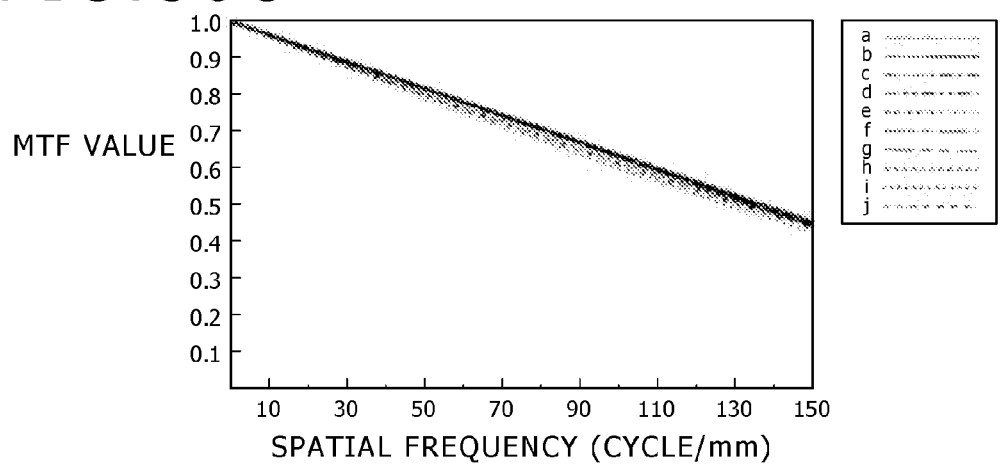

The example wherein the surface shape described is reflected is determined as a reference example 1, and optical characteristics where measurement results of the surface shape of the two first and second variable lenses 32 and 41 incorporated as the variator and the compensator in the design example 1 are reflected by polynomial approximation were determined by calculation. A result of this is given below. FIGS. 29A, 29B and 29C show various aberration diagrams in a wide angle end state, an intermediate focal length state and a telephoto end state, respectively. In the spherical surface aberration diagrams, a solid line indicates the spherical surface aberration at the wavelength of 670 nm; an alternate long and short dash line indicates that at the wavelength of 600 nm; an alternate long and two short dashes line indicates that at the wavelength of 555 nm; a thick broken line indicates that at the wavelength of 510 nm; and a thin broken line indicates that at the wavelength of 470 nm. Further, in the views of the astigmatism, a solid line indicates a sagittal image plane, and a broken line indicates a meridional image plane. Meanwhile, MTF spatial frequency characteristics in a wide angle end state, an intermediate focal length state and a telephoto end state at the reference wavelength of 555 nm are illustrated in FIGS. 30A, 30B and 30C, respectively. Also in FIGS. 30A to 30C, lines a and b indicate diffraction limits, and lines c and d indicate modulation degrees in tangential and radial directions at an image height of 30%; lines e and f indicate those at another image height of 50%; lines g and h indicate those at a further image height of 70%; and lines i and j indicate those at a still further image height of 100%.

As apparent from FIGS. 29A to 29C and 30A to 30C, if the spherical surface deviation amount of the refracting surface deformation type variable lens is reflected, then the optical characteristics are deteriorated from those expected with regard to the design example 1. Above all, the deterioration of the optical characteristics in a wide angle end state is conspicuous, and the astigmatism, image surface curving and distortional aberration degrade and also the MTF spatial frequency characteristic degrades. It is to be noted that this relates to a case wherein an ordinary elastic film designed without taking an aspheric surface into consideration is used. However, depending upon such conditions as a characteristic of a deformation film material, tension and so forth, the degradation of the aberrations can be moderated from the result described.

2-2. Reference Example 2

Figure 31A:
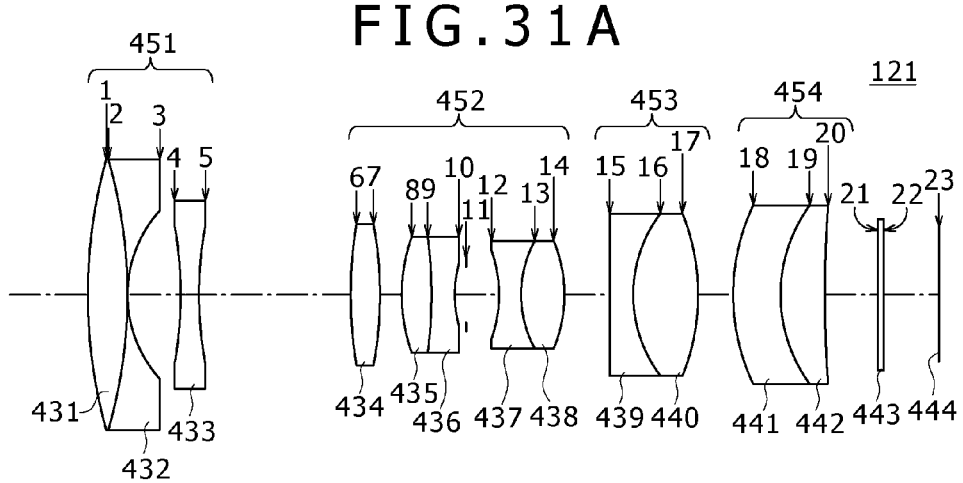
FIGS. 31A, 31B and 31C are schematic views showing sectional configurations of a zoom lens according to a reference example 2 wherein, where the surface shape of the variable lens of the zoom lens shown in FIG. 1 is reflected, the other fixed lens surfaces are optimized in a wide angle end state, an intermediate focal length state and a telephoto end state, respectively.
Figure 31B:
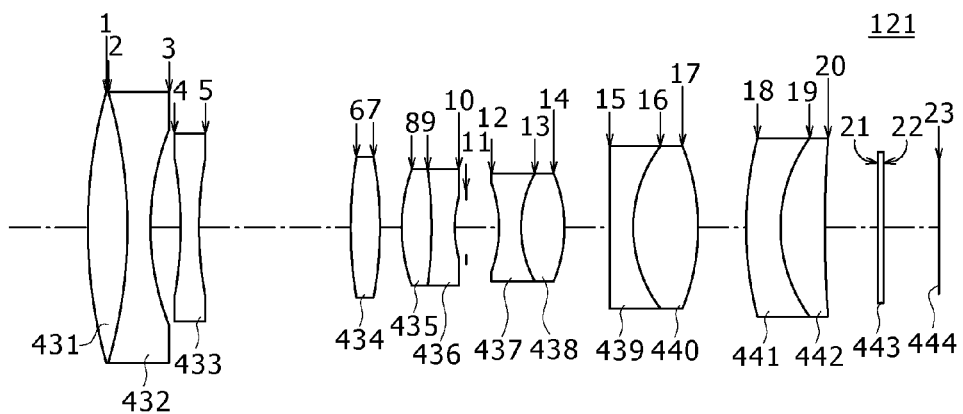
Figure 31C:
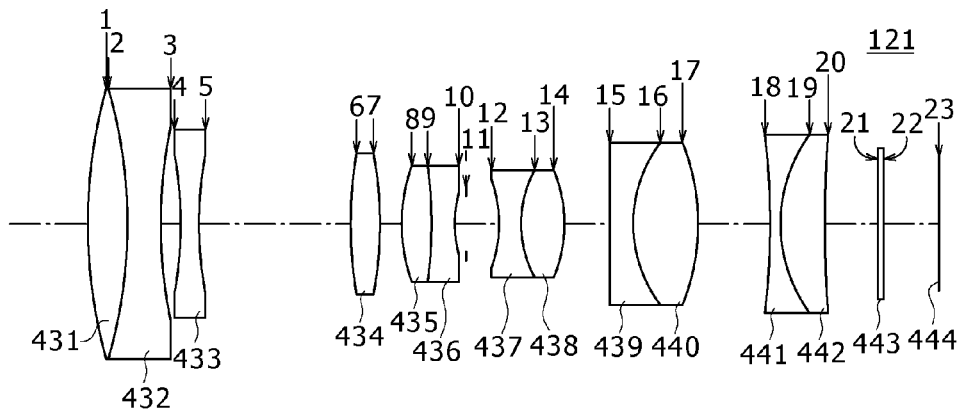

Example wherein the Reference Example 1 is Optimized without Using an Aspheric Surface It was studied whether or not the surface data of the fixed lenses in the reference example 1 can be optimized without using an aspheric surface to achieve improvement in the optical performances. A general lens configuration of the present example in a wide angle end state, an intermediate focal length state and a telephoto end state is shown in FIGS. 31A to 31C, respectively. It is to be noted that the number of lens groups, the refracting powers and the number and arrangement of those lenses which are formed as pasted lenses are substantially similar to those of the design example 1, but only the surface data are altered a little. In particular, as seen in FIGS. 31A to 31C, also in the zoom lens 121 according to the present reference example 2, a first lens group 451 including a first variable lens 432 and a second lens group 452 of the Gauss type including an aperture stop sandwiched therein on the object side and the image side are disposed in order from the object side. Further, a third lens group 453 for carrying out principally on-axis aberration correction and a fourth lens group 454 including a second variable lens 441 are disposed at a succeeding stage to the second lens group 452. As fixed lenses, lenses 431, 433, 434 to 440 and 442 are provided in order from the object side. Further, a cover glass plate 443 is provided assuming that an image pickup element 444 is disposed on an image surface 23. Also in FIGS. 31A to 31C, surface numbers 1 to 23 are applied in order from the object side. Surface data of the reference example 2 are indicated in Table 17 given below, and various dimensions and surface distances of the reference example 2 are indicated in Table 18. Further, aspheric surface data of the reference example 3 are indicated in Table 19. It is to be noted that, also in the present reference example 2, liquid having a refractive index nd of a d line of nd=1.5057 and an Abbe number vd of vd=34.90 is used as the medium of the refracting surface deformation type liquid lens for use with the variable lenses similarly as in the design example 1.

TABLE 17 surface data

| Surface number | Radius of curvature | Surface distance | Refractive index (nd) | Abbe number (vd) |
|---|---|---|---|---|
| 1 | 16.1754 | 1.41 | 1.7440 | 44.79 |
| 2 | −18.82513 | d52 | 1.5057 | 34.90 |
| 3* | r53 | d53 | | |
| 4 | −15.6344 | 0.75 | 1.7552 | 27.51 |
| 5 | 12.10594 | 5.5 | | |
| 6 | 18.27895 | 1.02 | 1.7440 | 44.79 |
| 7 | −15.83137 | 0.8 | | |
| 8 | 6.21915 | 1.06 | 1.7552 | 27.53 |
| 9 | −13.78252 | 0.8 | 1.5225 | 59.84 |
| 10 | 5.07364 | 0.4 | | |
| 11 | Aperture stop | 1.2 | | |
| 12 | −4.58759 | 0.8 | 1.7552 | 27.53 |
| 13 | 4.07559 | 1.54 | 1.5638 | 60.83 |
| 14 | −5.24593 | 1.61 | | |
| 15 | −1809.13877 | 0.8 | 1.7408 | 27.79 |
| 16 | 4.4 | 2.35 | 1.7434 | 44.79 |
| 17 | −7.83455 | d517 | | |
| 18* | r518 | d518 | 1.5057 | 34.90 |
| 19 | 4.85262 | 1.62 | 1.5638 | 60.83 |

TABLE 17-continued surface data

| Surface number | Radius of curvature | Surface distance | Refractive index (nd) | Abbe number (vd) |
|---|---|---|---|---|
| 20 | 44.46226 | 1.941048 | | |
| 21 | INFINITY | 0.105 | 1.5163 | 64.14 |
| 22 | INFINITY | 1.97763 | | |
| 23 (image surface) | INFINITY | | | |

TABLE 18 various data

Zoom ratio 3

| | Wide angle end | Intermediate focal length | Telephoto end |
|---|---|---|---|
| Focal length | 3.74 | 6.46 | 11.18 |
| F number | 3.20 | 3.87 | 5.36 |
| Angle of view [degrees] | 63.4 | 39.3 | 23.3 |
| Total length | | 30.3 (fixed) | |
| BF | | 3.9 (except cover glass thickness) | |
| d52 | 0.03042 | 0.84686 | 1.22928 |
| r53 | 4.70096 | 9.17627 | 21.45534 |
| d53 | 1.26741 | 1.69039 | 2.59977 |
| d517 | 1.80536 | 0.80492 | 0.36739 |
| r518 | 7.40355 | 12.94742 | −16.43472 |
| d518 | 1.63259 | 1.20961 | 0.30023 |

TABLE 19 aspheric surface coefficient

| | Wide angle end | Intermediate focal length | Telephoto end |
|---|---|---|---|
| Third surface | | | |
| k | −1 | −1 | −1 |
| $A^4$ | $1.5507 \times 10^{-3}$ | $1.9793 \times 10^{-4}$ | $-7.7287 \times 10^{-6}$ |
| $A^6$ | $6.4537 \times 10^{-5}$ | $3.2942 \times 10^{-6}$ | $9.1154 \times 10^{-6}$ |
| $A^8$ | $-1.4741 \times 10^{-6}$ | $-2.5720 \times 10^{-8}$ | $-1.5517 \times 10^{-6}$ |
| $A^{10}$ | $3.5145 \times 10^{-7}$ | $-2.8353 \times 10^{-9}$ | $9.3965 \times 10^{-8}$ |
| 18th surface | | | |
| k | −1 | −1 | −1 |
| $A^4$ | $3.3057 \times 10^{-4}$ | $1.8181 \times 10^{-5}$ | $3.3148 \times 10^{-5}$ |
| $A^6$ | $3.2447 \times 10^{-5}$ | $2.3226 \times 10^{-5}$ | $-4.0486 \times 10^{-5}$ |
| $A^8$ | $-4.5300 \times 10^{-6}$ | $-4.0617 \times 10^{-6}$ | $1.0280 \times 10^{-5}$ |
| $A^{10}$ | $2.7591 \times 10^{-7}$ | $2.5643 \times 10^{-7}$ | $-9.3530 \times 10^{-7}$ |

Figure 32A:
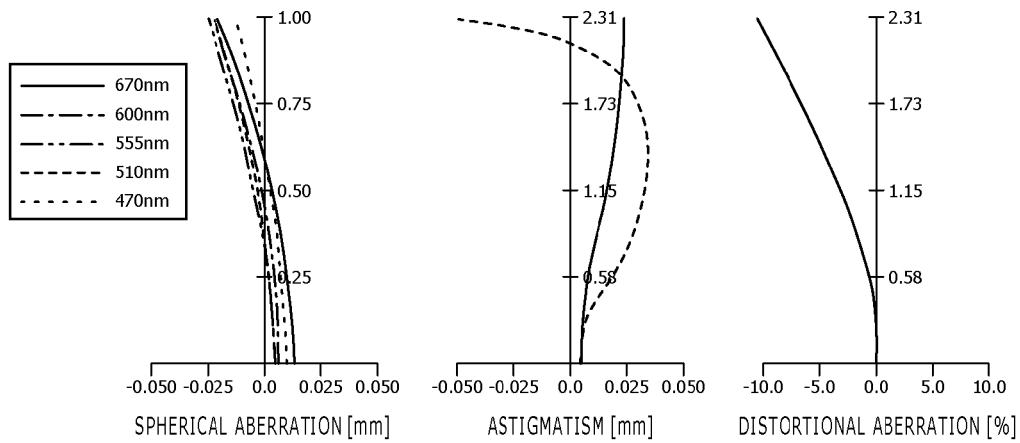
FIGS. 32A, 32B and 32C are diagrammatic views illustrating several aberration characteristics of the zoom lens shown in FIGS. 31A to 31C in a wide angle end state, an intermediate focal length state and a telephoto end state, respectively.
Figure 32B:
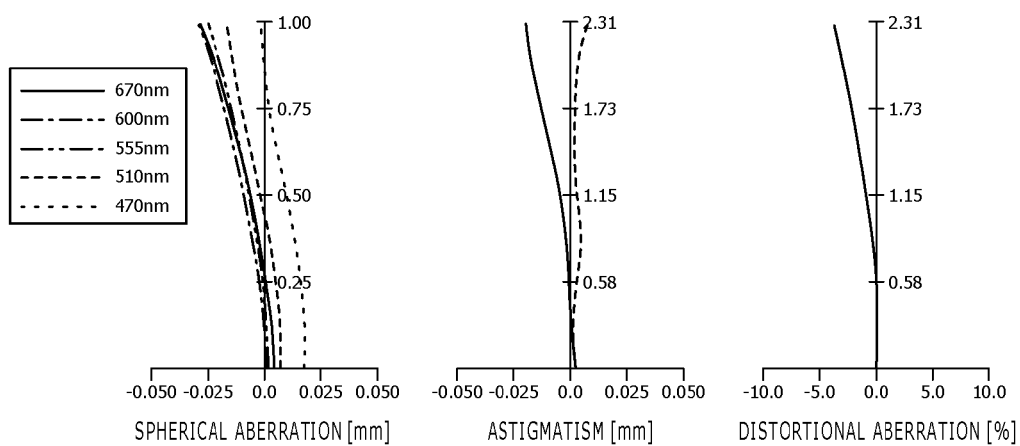
Figure 32C:
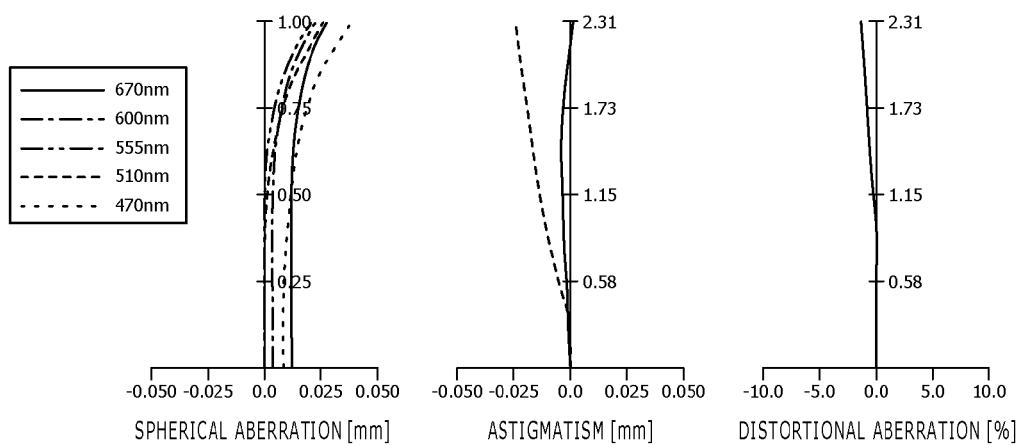
Figure 33A:
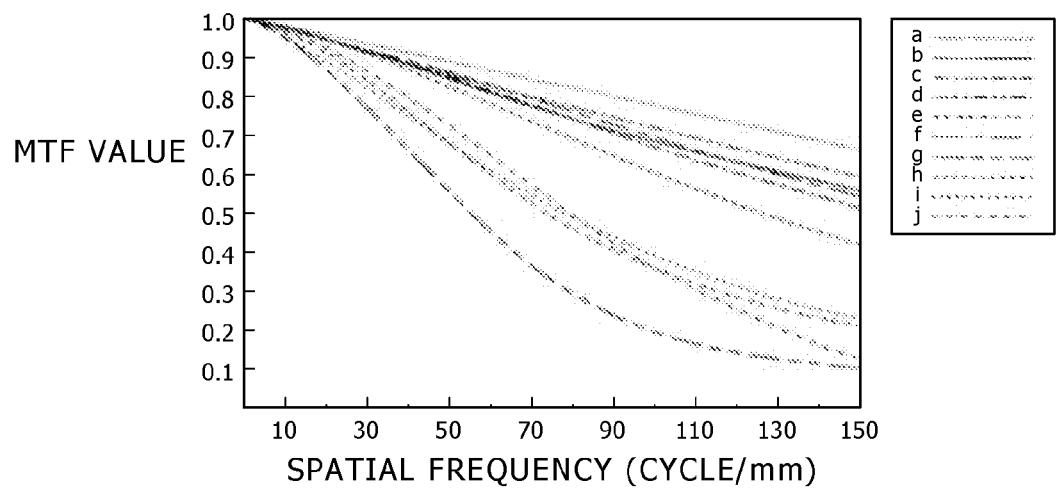
FIGS. 33A, 33B and 33C are diagrammatic views illustrating a spatial frequency characteristic of the zoom lens shown in FIGS. 31A to 31C in a wide angle end state, an intermediate focal length state and a telephoto end state, respectively.
Figure 33B:
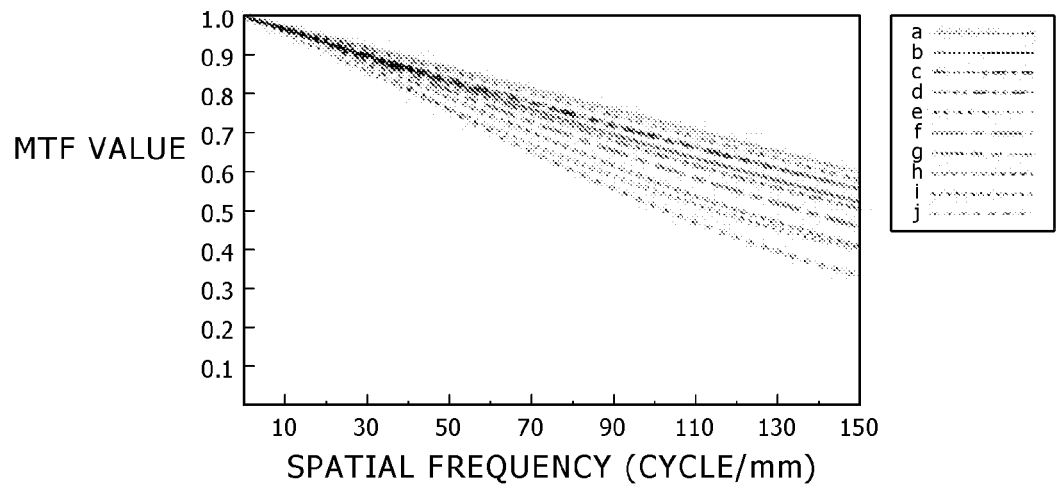
Figure 33C:
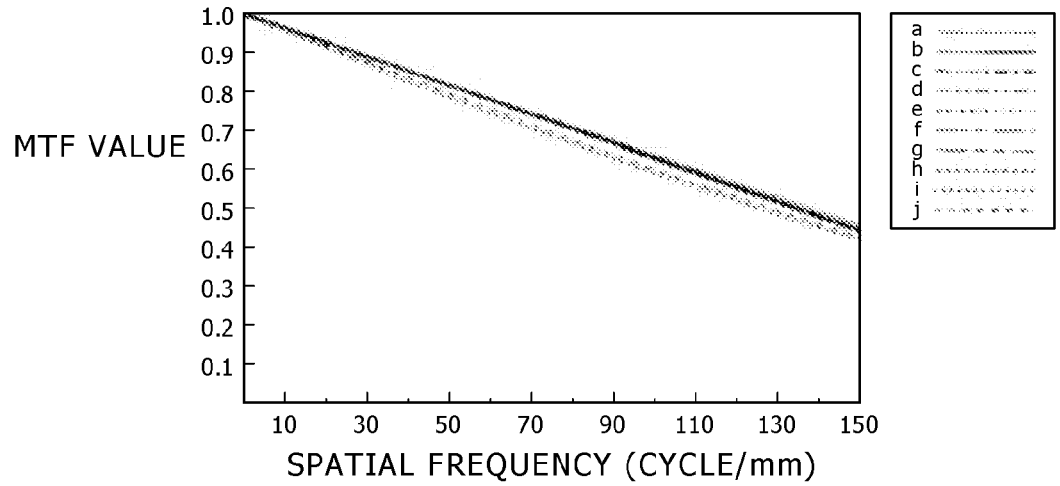

The spherical surface aberration, astigmatism and distortional aberration in a wide angle end state, an intermediate focal length state and a telephoto end state in the reference example 2 are illustrated in FIGS. 32A, 32B and 32C, respectively. In the spherical surface aberration diagrams, a solid line indicates the spherical surface aberration at the wavelength of 670 nm; an alternate long and short dash line indicates that at the wavelength of 600 nm; an alternate long and two short dashes line indicates that at the wavelength of 555 nm; a thick broken line indicates that at the wavelength of 510 nm; and a thin broken line indicates that at the wavelength of 470 nm. Further, in the views of the astigmatism, a solid line indicates a sagittal image plane, and a broken line indicates a meridional image plane. Meanwhile, MTF spatial frequency characteristics in a wide angle end state, an intermediate focal length state and a telephoto end state at the reference wavelength of 555 nm are illustrated in FIGS. 33A, 33B and 33C, respectively. Also in FIGS. 33A to 33C, lines a and b indicate diffraction limits, and lines c and d indicate modulation degrees in tangential and radial directions at an image height of 30%; lines e and f indicate those at another image height of 50%; lines g and h indicate those at a further image height of 70%; and lines i and j indicate those at a still further image height of 100%. From the results of FIGS. 32A to 32C and 33A to 33C, it can be recognized that, even if it is intended to use only a spherical surface to optimize the fixed lenses in this manner, good aberration characteristics may not be obtained and the zoom lens may not be placed sufficiently into practical use. Accordingly, where the spherical surface deviation amount of a deformation surface is comparatively great in this manner, preferably an aspheric surface is used for one or more surfaces of the fixed lenses in design.

2-3. Design Example 3

Example wherein One Aspheric Surface is Added

An optical system was re-designed taking the spherical surface deviation amount of the refracting surface deformation type liquid lens based on the results given above into consideration.

Figure 34A:
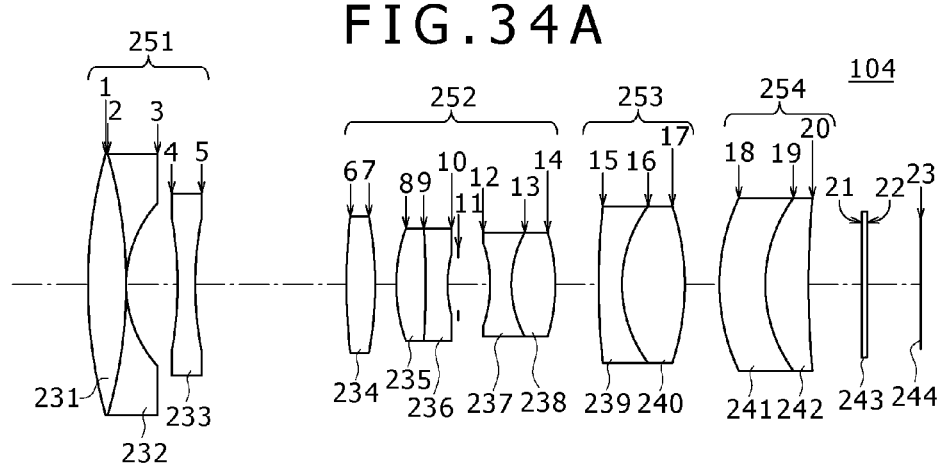
FIGS. 34A, 34B and 34C are schematic views showing a lens configuration of an example of a zoom lens according to a second embodiment of the present invention in a wide angle end state, an intermediate focal length state and a telephoto end state, respectively.
Figure 34B:
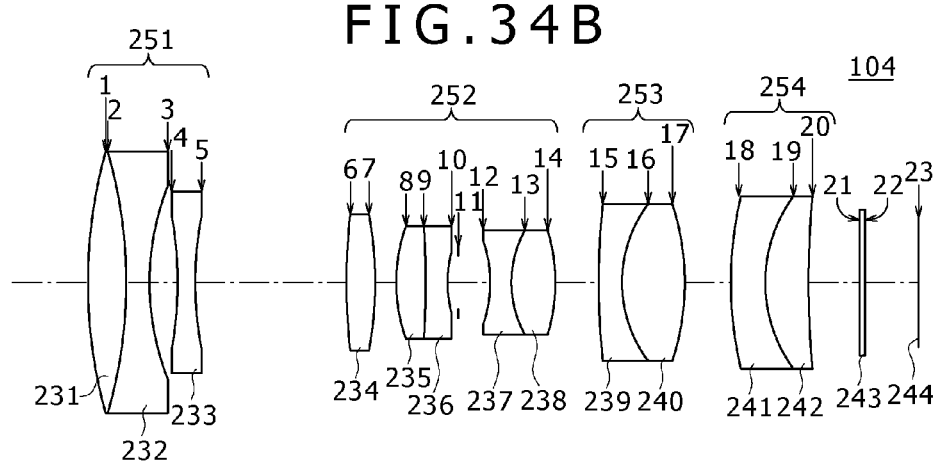
Figure 34C:
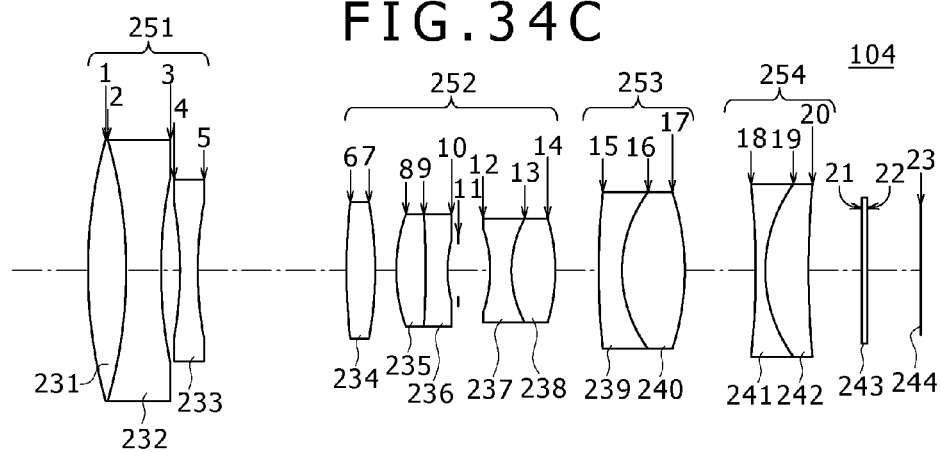

In the present design example 3, the surface shape of each refracting surface deformation type liquid lens to be used as a variable lens was reflected to change the radius of curvature of the fixed lens groups to improve the optical system. A general lens configuration of the present example in a wide angle end state, an intermediate focal length state and a telephoto end state is shown in FIGS. 34A to 34C, respectively. It is to be noted that the number of lens groups, the refracting powers and the number and arrangement of those lenses which are formed as pasted lenses are substantially similar to those of the design example 1, but the surface data are altered a little. In particular, as seen in FIGS. 34A to 34C, also in the zoom lens 104, a first lens group 251 including a first variable lens 232 and a second lens group 252 of the Gauss type including an aperture stop sandwiched therein on the object side and the image side are disposed in order from the object side. Further, a third lens group 253 for carrying out principally on-axis aberration correction and a fourth lens group 254 including a second variable lens 241 are disposed at a succeeding stage to the second lens group 252. As fixed lenses, lenses 231, 233, 234 to 240 and 242 are provided in order from the object side. Further, a cover glass plate 243 is provided assuming that an image pickup element 244 is disposed on an image surface 23. Also in FIGS. 34A to 34C, surface numbers 1 to 23 are applied in order from the object side. Surface data of the design example 3 are indicated in Table 11 given below, and various dimensions and surface distances of the design example 3 are indicated in Table 12. Further, aspheric surface data of the design example 3 are indicated in Table 13. It is to be noted that, also in the present reference example 3, liquid having a refractive index nd of a d line of nd=1.5057 and an Abbe number vd of vd=34.90 is used as the medium of the refracting surface deformation type lens for use with the variable lenses similarly as in the design example 1.

TABLE 11 surface data

| Surface number | Radius of curvature | Surface distance | Refractive index (nd) | Abbe number (vd) | Effective diameter |
|---|---|---|---|---|---|
| 1 | 17.18464 | 1.41 | 1.7440 | 44.79 | 4.1556 |
| 2 | −18.37532 | d32 | 1.5057 | 34.90 | 3.9368 |
| 3* | r33 | d33 | | | 2.9956 |
| 4 | −16.75079 | 0.6 | 1.7552 | 27.51 | 2.7599 |
| 5 | 12.82512 | 5.5 | | | 2.5775 |
| 6 | 15.6892 | 1.02 | 1.7440 | 44.79 | 2.0451 |
| 7 | −19.45989 | 0.8 | | | 1.9568 |
| 8 | 6.05049 | 1.06 | 1.7552 | 27.53 | 1.6303 |
| 9 | −20.91537 | 0.8 | 1.5225 | 59.84 | 1.4064 |
| 10 | 4.66761 | 0.4 | | | 1.0723 |
| 11 | Aperture stop | 1.2 | | | 0.9593 |
| 12 | −5.44351 | 0.8 | 1.7552 | 27.53 | 1.0949 |
| 13 | 4.16131 | 1.54 | 1.5638 | 60.83 | 1.2747 |
| 14 | −7.11498 | 1.61 | | | 1.5406 |
| 15 | 24.23089 | 0.8 | 1.7408 | 27.79 | 2.0445 |
| 16 | 4.16923 | 2.35 | 1.7434 | 44.79 | 2.2185 |
| 17 | −8.83975 | d317 | | | 2.4018 |
| 18* | r318 | d318 | 1.5057 | 34.90 | 2.5893 |
| 19 | 4.85262 | 1.62 | 1.5638 | 60.83 | 2.4623 |
| 20* | 23.95966 | 1.941048 | | | 2.3695 |
| 21 | INFINITY | 0.105 | 1.5163 | 64.14 | 2.298 |
| 22 | INFINITY | 1.988394 | | | 2.2955 |
| 23 (image surface) | INFINITY | | | | 2.305 |

TABLE 12 various data

Zoom ratio 3

| | Wide angle end | Intermediate focal length | Telephoto end |
|---|---|---|---|
| Focal length | 3.74 | 6.46 | 11.19 |
| F number | 3.20 | 3.86 | 5.34 |
| Angle of view [degrees] | 63.4 | 39.3 | 23.3 |
| Total length | | 30.3 (fixed) | |
| BF | | 3.93 (except cover glass thickness) | |
| d32 | 0.03042 | 0.84686 | 1.22928 |
| r33 | 4.70096 | 9.17627 | 21.45534 |
| d33 | 1.86958 | 1.05314 | 0.67072 |
| d317 | 1.26741 | 1.69039 | 2.599772 |
| r318 | 7.40355 | 12.94742 | −16.43472 |
| d318 | 1.63259 | 1.20961 | 0.30023 |

TABLE 13 aspheric surface coefficient

| | Wide angle end | Intermediate focal length | Telephoto end |
|---|---|---|---|
| Third surface (deformation surface) | | | |
| k | −1 | −1 | −1 |
| $A^4$ | $1.5507 \times 10^{-3}$ | $1.9793 \times 10^{-4}$ | $-7.7287 \times 10^{-6}$ |
| $A^6$ | $6.4537 \times 10^{-5}$ | $3.2942 \times 10^{-6}$ | $9.1154 \times 10^{-6}$ |
| $A^8$ | $-1.4741 \times 10^{-6}$ | $-2.5720 \times 10^{-8}$ | $-1.5517 \times 10^{-6}$ |
| $A^{10}$ | $3.5145 \times 10^{-7}$ | $-2.8353 \times 10^{-9}$ | $9.3965 \times 10^{-8}$ |
| 18th surface (deformation surface) | | | |
| k | −1 | −1 | −1 |
| $A^4$ | $3.3057 \times 10^{-4}$ | $1.8181 \times 10^{-5}$ | $3.3148 \times 10^{-5}$ |
| $A^6$ | $3.2447 \times 10^{-5}$ | $2.3226 \times 10^{-5}$ | $-4.0486 \times 10^{-5}$ |

TABLE 13-continued

| aspheric surface coefficient | | | |
|---|---|---|---|
| | Wide angle end | Intermediate focal length | Telephoto end |
| $A^8$ | $-4.5300 \times 10^{-6}$ | $-4.0617 \times 10^{-6}$ | $1.0280 \times 10^{-5}$ |
| $A^{10}$ | $2.7591 \times 10^{-7}$ | $2.5643 \times 10^{-7}$ | $-9.3530 \times 10^{-7}$ |

20th surface (fixed)

Figure 35A:
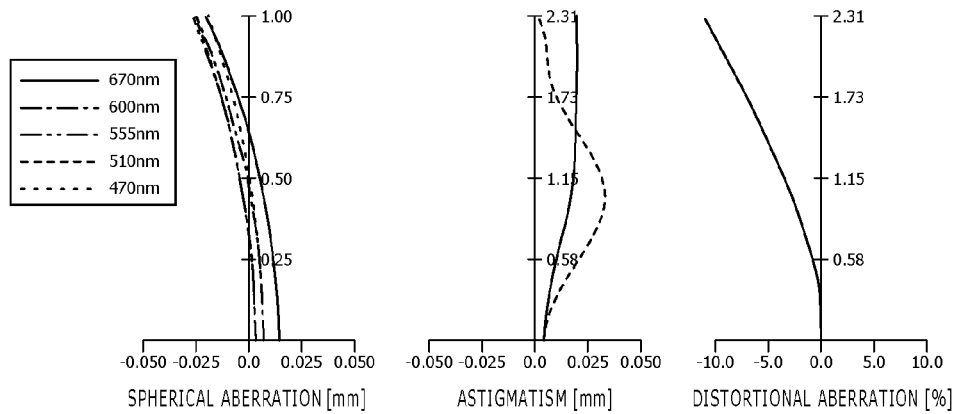
FIGS. 35A, 35B and 35C are diagrammatic views illustrating several aberration characteristics of the zoom lens shown in FIGS. 34A to 34C in a wide angle end state, an intermediate focal length state and a telephoto end state, respectively.
Figure 35B:
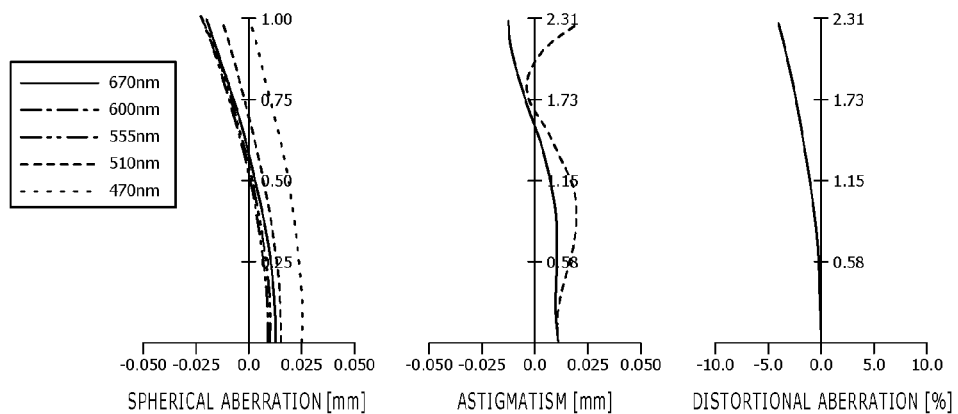
Figure 35C:
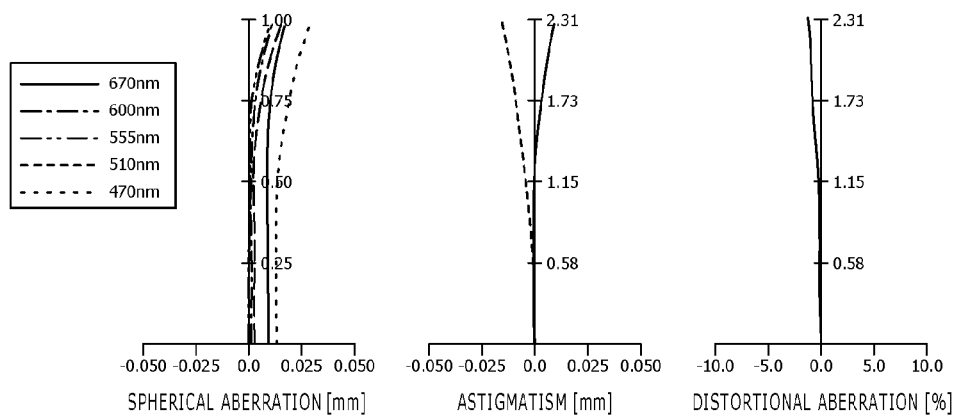
Figure 36A:
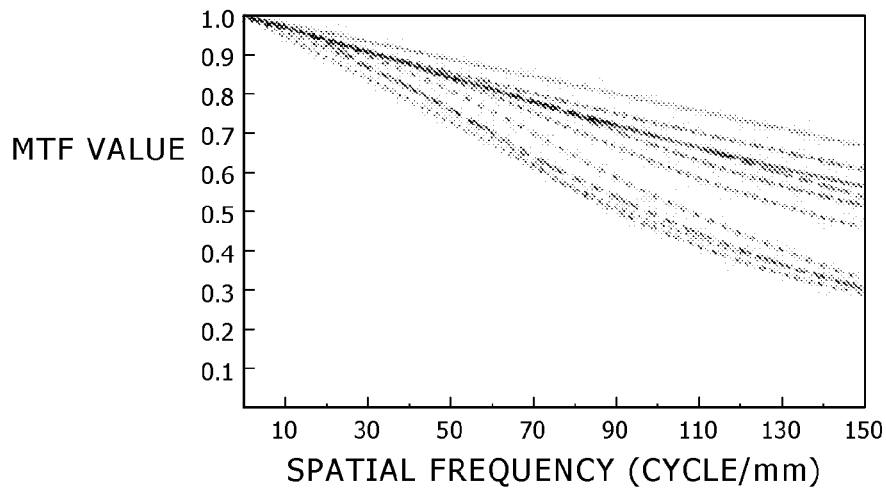
FIGS. 36A, 36B and 36C are diagrammatic views illustrating a spatial frequency characteristic of the zoom lens shown in FIGS. 34A to 34C in a wide angle end state, an intermediate focal length state and a telephoto end state, respectively.
Figure 36B:
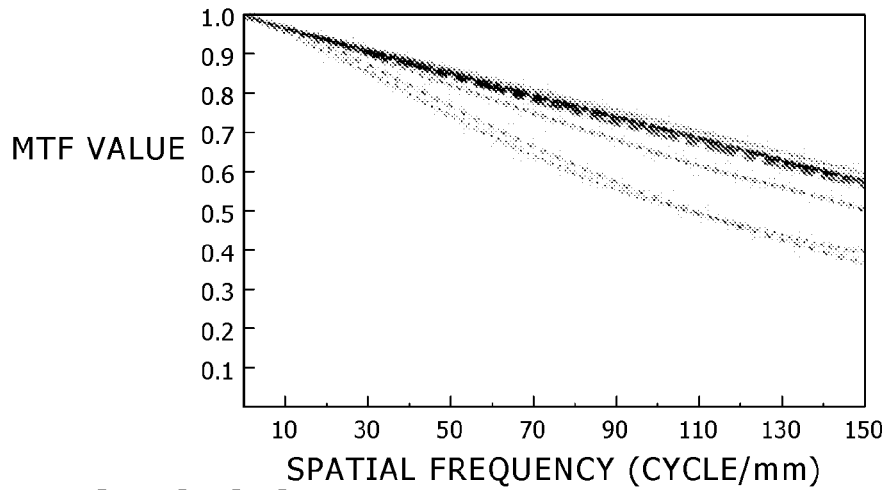
Figure 36C:
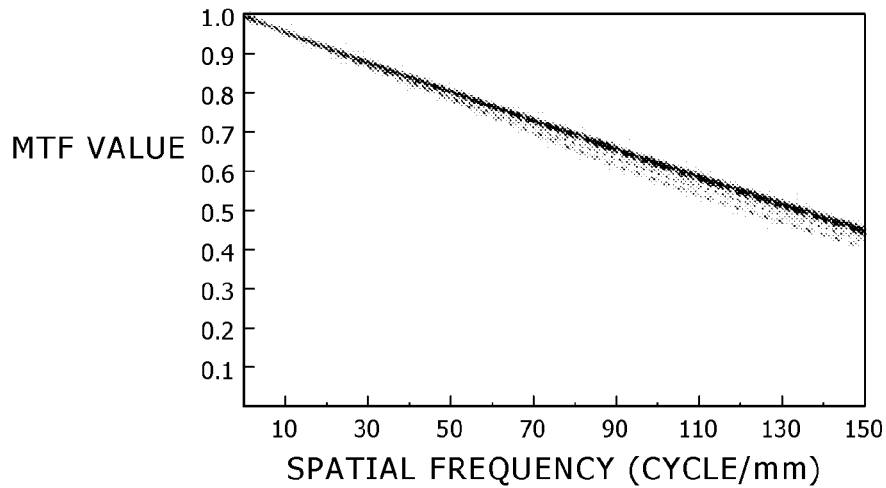

$k = -1, A^4 = 4.7969 \times 10^{-4}, A^6 = -4.0486 \times 10^{-5},$
$A^8 = 6.8513 \times 10^{-6}, A^{10} = 0$ The spherical surface aberration, astigmatism and distortional aberration in a wide angle end state, an intermediate focal length state and a telephoto end state in the design example 3 are illustrated in FIGS. 35A, 35B and 35C, respectively. In the spherical surface aberration diagrams, a solid line indicates the spherical surface aberration at the wavelength of 670 nm; an alternate long and short dash line indicates that at the wavelength of 600 nm; an alternate long and two short dashes line indicates that at the wavelength of 555 nm; a thick broken line indicates that at the wavelength of 510 nm; and a thin broken line indicates that at the wavelength of 470 nm. Further, in the views of the astigmatism, a solid line indicates a sagittal image plane, and a broken line indicates a meridional image plane. Meanwhile, MTF spatial frequency characteristics in a wide angle end state, an intermediate focal length state and a telephoto end state at the reference wavelength of 555 nm are illustrated in FIGS. 36A, 36B and 36C, respectively. Also in FIGS. 36A to 36C, lines a and b indicate diffraction limits, and lines c and d indicate modulation degrees in tangential and radial directions at an image height of 30%; lines e and f indicate those at another image height of 50%; lines g and h indicate those at a further image height of 70%; and lines i and j indicate those at a still further image height of 100%. It can be recognized from the results of FIGS. 35A to 35C and 36A to 36C that, also with the present design example 3, good aberration characteristics can be obtained.

Figure 37:
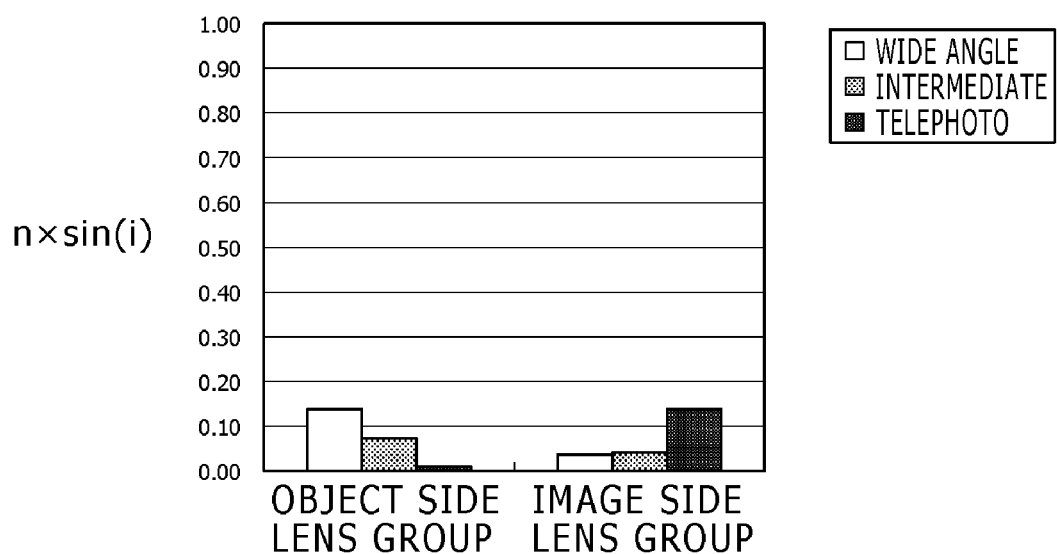
FIG. 37 is a diagrammatic view illustrating a mean value of an off-axis light ray incident angle characteristic of an object side lens group and an image side lens group of the zoom lens shown in FIGS. 34A to 34C.
Figure 38:
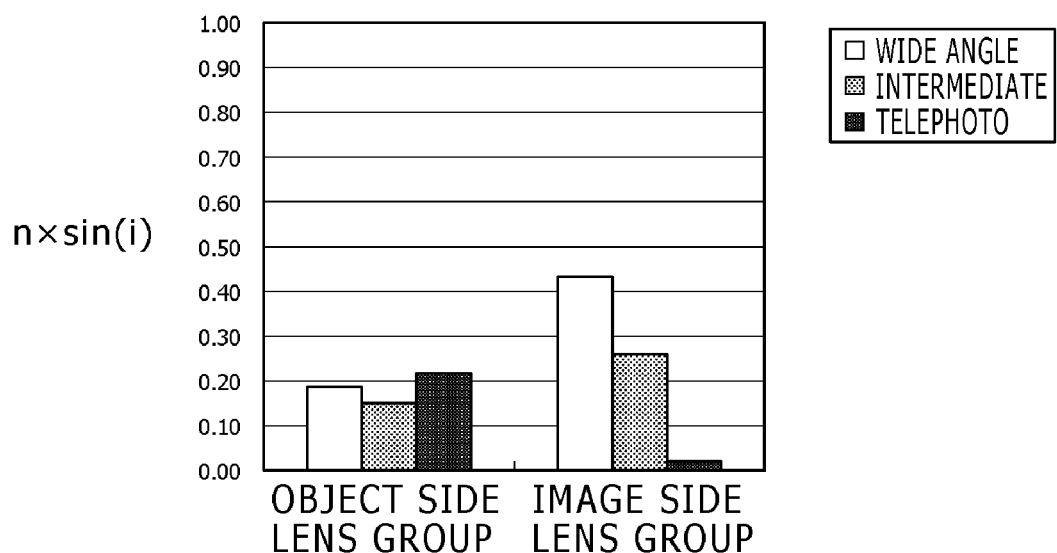
FIG. 38 is a diagrammatic view illustrating a mean value of a main light ray incident angle characteristic of the object side lens group and the image side lens group of the zoom lens shown in FIGS. 34A to 34C.

FIGS. 37 and 38 illustrate results of determination of the mean value of n×sin(i) in the first lens group 151 and the third lens group 153 with regard to an off-axis light ray and a main light ray, respectively. From FIGS. 37 and 38, it can be recognized that the mean value of n×sin(i) becomes less than 0.5 in regard to the first and fourth lens groups 251 and 254 including the first and second variable lenses 232 and 241.

Figure 39:
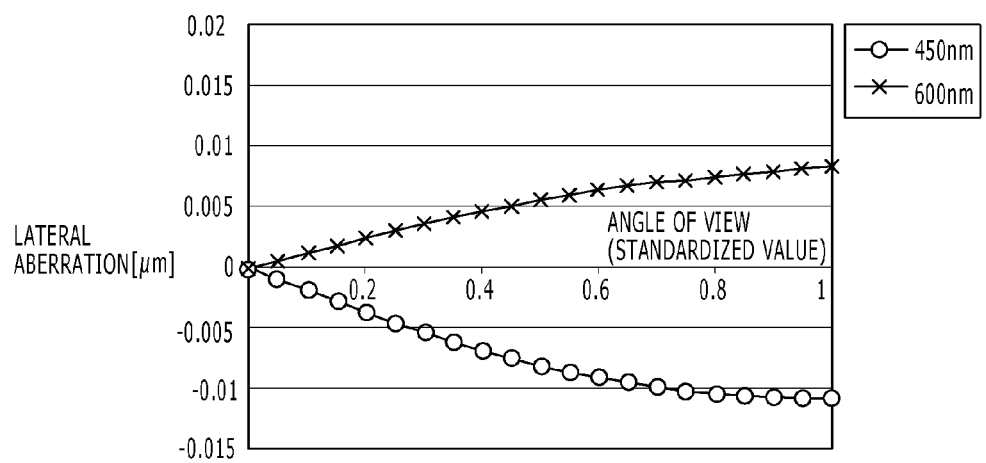
FIG. 39 is a diagrammatic view illustrating a lateral aberration characteristic of the zoom lens shown in FIGS. 34A to 34C in a wide angle end state.
Figure 40:
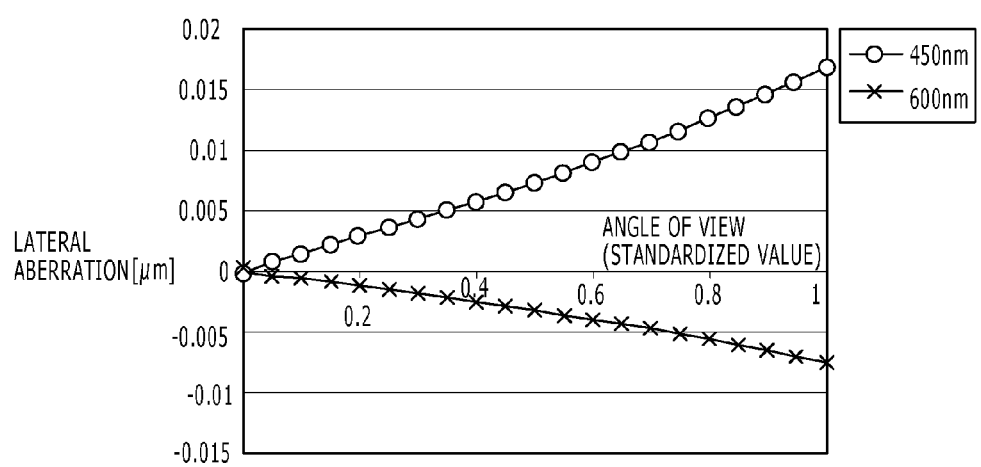
FIG. 40 is a diagrammatic view illustrating a lateral aberration characteristic of the zoom lens shown in FIGS. 34A to 34C in a telephoto end state.

FIGS. 39 and 40 illustrate results of an analysis of the difference in a unit of μm of the lateral aberration to a standardized field or angle of view from the image point of the wavelength of 530 nm in regard to light rays of the wavelengths of 450 nm and 600 nm. In particular, FIG. 39 illustrates the lateral aberration in a wide angle end state and FIG. 40 illustrates the lateral aberration in a telephoto end state. From FIGS. 39 and 40, also in the present example, it can be determined that, particularly in a telephoto end state, the lateral aberration varies linearly with respect to the angle of view and, even if a magnification chromatic aberration correction element is not added, aberration correction by signal processing can be carried out. As regards a wide angle end state, the variation of the lateral aberration is a little different from a linear variation. However, in the present example, since the third lens group 253 is provided, on-axis aberration correction is carried out. Therefore, in the third design example 3, magnification chromatic aberration of a peripheral light ray remains. However, correction of the aberration can be carried out by signal processing as described above. Therefore, on-axis aberration correction can be applied to obtain good optical characteristics similarly as in the design example 1.

Figure 41:
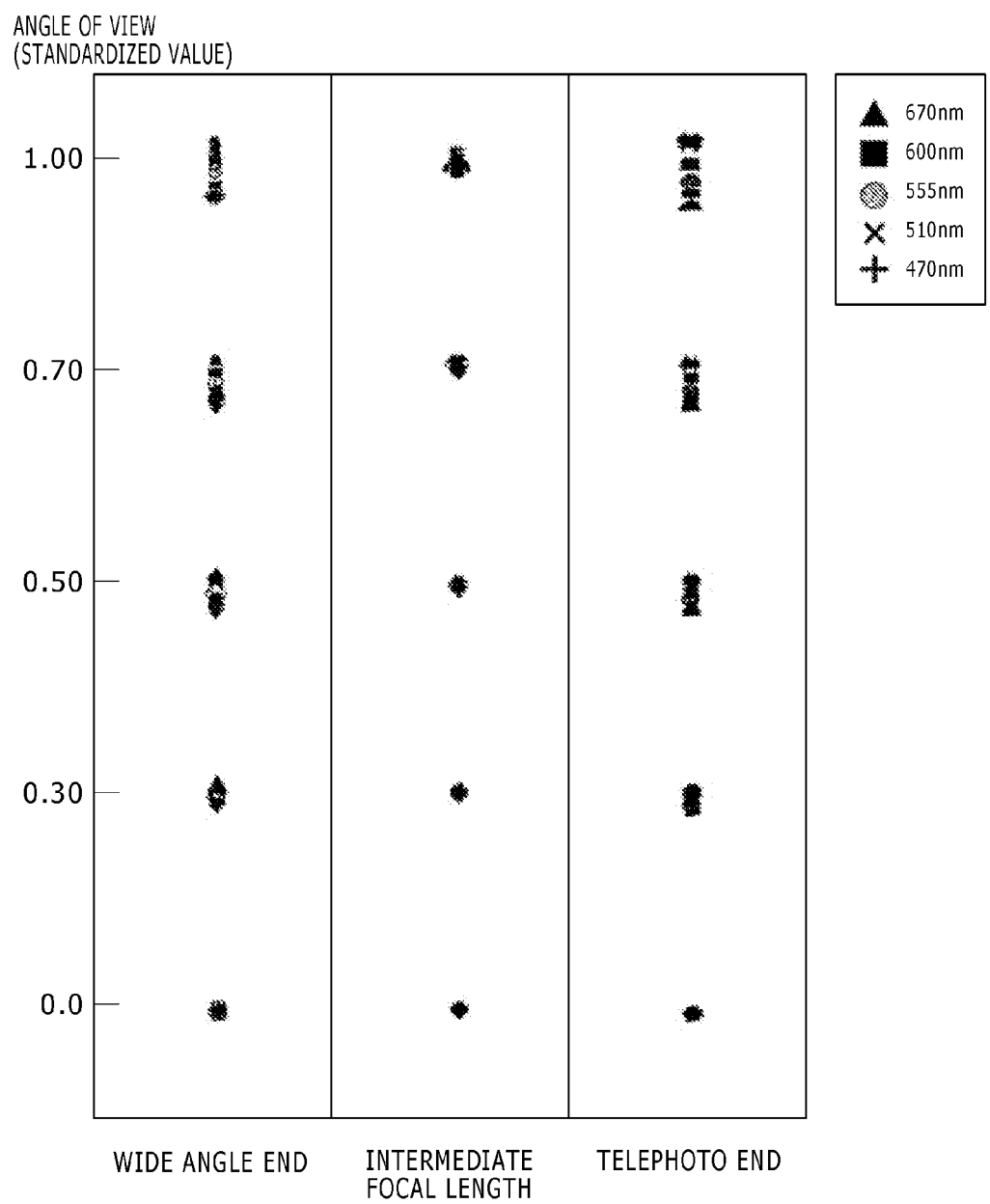
FIG. 41 is a diagrammatic view illustrating magnification chromatic aberration of the zoom lens shown in FIG. 1 in a wide angle end state, an intermediate focal length state and a telephoto end state.
Figure 42:
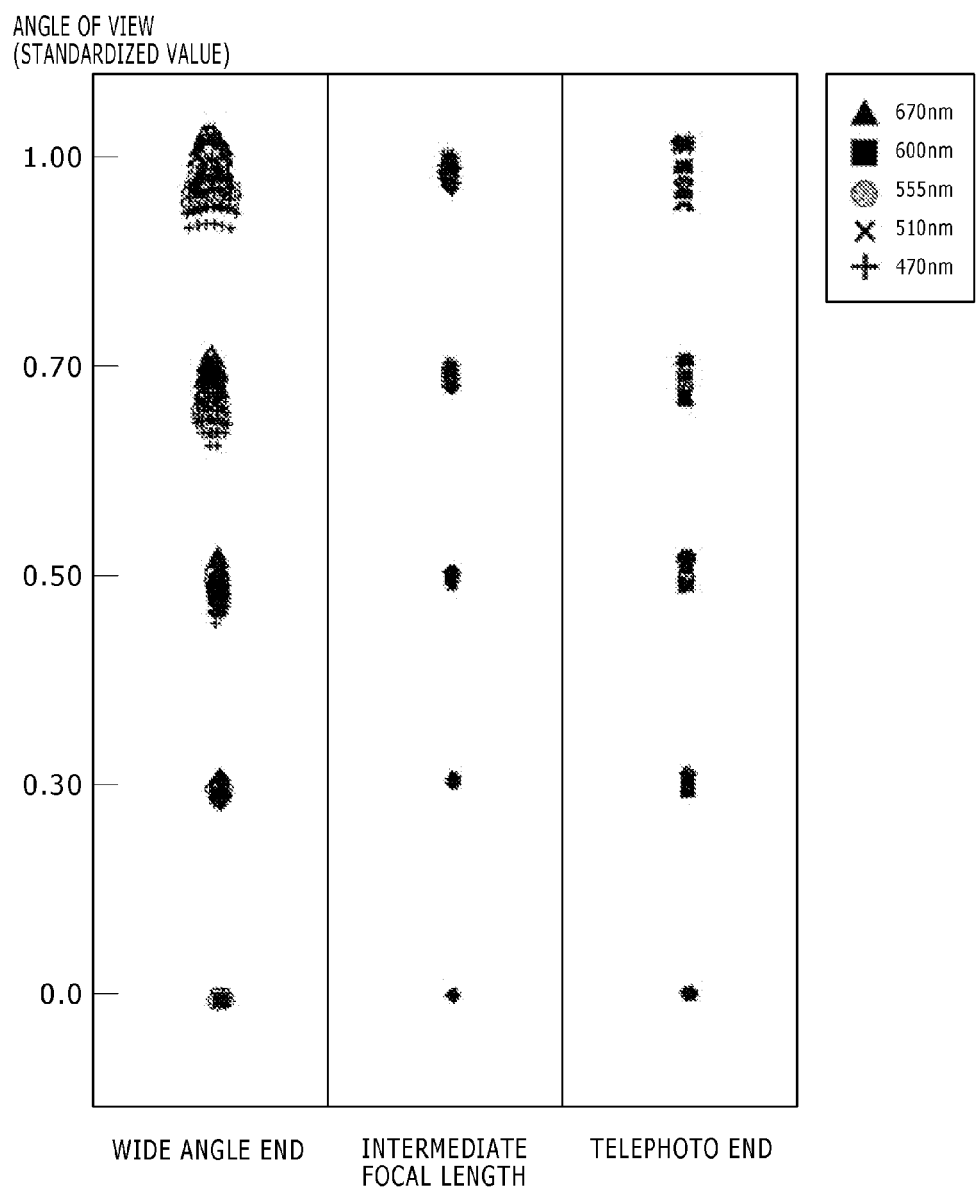
FIG. 42 is a diagrammatic view illustrating magnification chromatic aberration of the zoom lens shown in FIG. 1 where the surface shape of the variable lens of the zoom lens is reflected in a wide angle end state, an intermediate focal length state and a telephoto end state.
Figure 43:
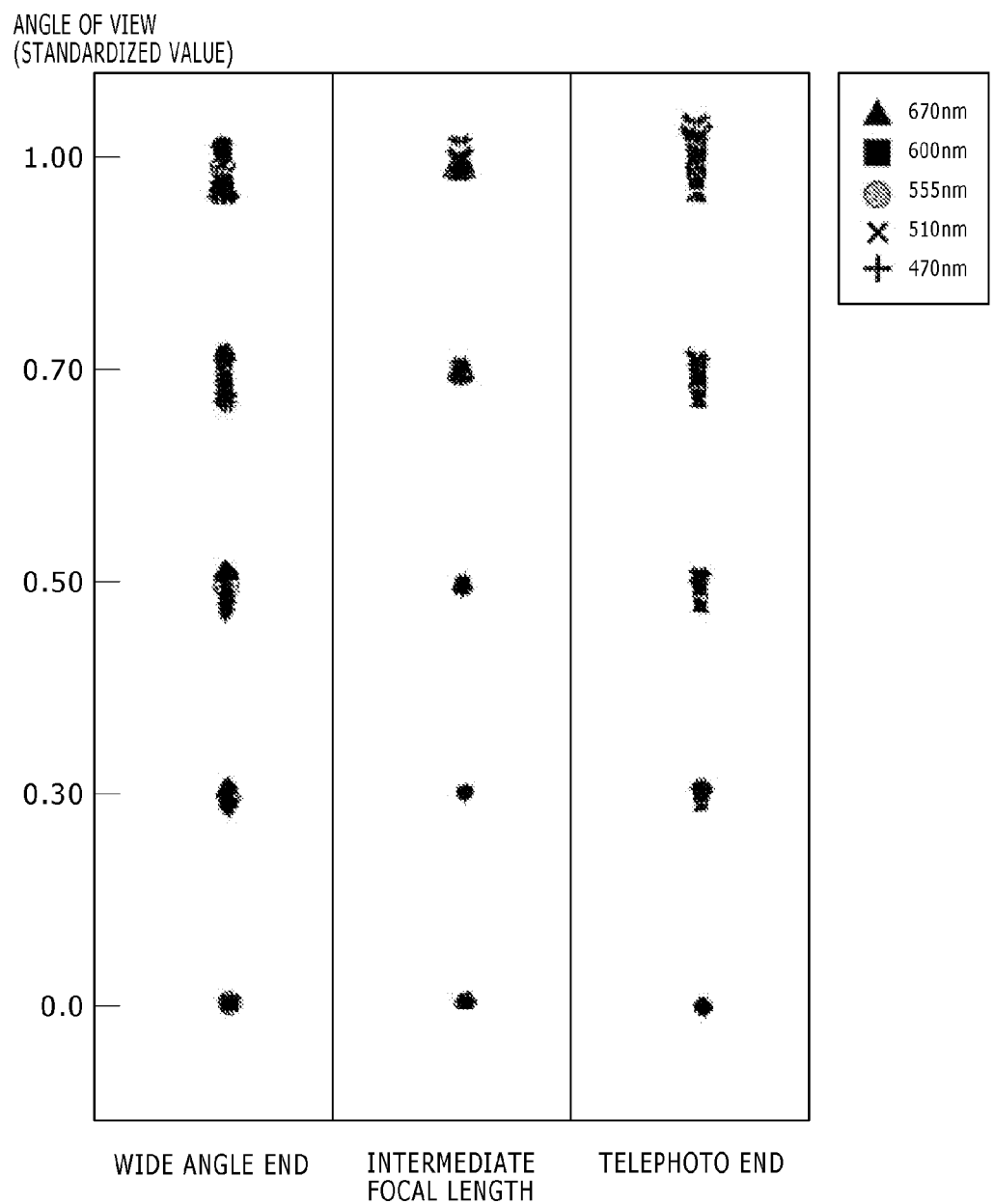
FIG. 43 is a diagrammatic view illustrating magnification chromatic aberration of the zoom lens shown in FIG. 34 in a wide angle end state, an intermediate focal length state and a telephoto end state.

FIGS. 41, 42 and 43 illustrate magnification chromatic aberrations in the design example 1, reference example 1 and design example 3. In particular, in each of FIGS. 41 to 43, magnification chromatic aberrations in a wide angle state, an intermediate focal length state and a telephoto end state are illustrated. Further, in FIGS. 41 to 43, a triangle mark indicates magnification chromatic aberration at the frequency of 670 nm; a square mark indicates that at the frequency of 600 nm; a round mark indicates that at the wavelength of 550 nm; a mark × indicates that at the frequency of 510 nm; and a mark + indicates that at the wavelength of 470 nm. As can be seen apparently from comparison of FIGS. 41 to 43, in the design example 1, where the spherical surface deviation amount is sufficiently small to regard the lens surface as a spherical surface, the distortion of a spot is little. However, if the spherical surface deviation amount of the lens surface having an aspheric surface shape becomes great, then elliptical distortion appears particularly in a wide angle end state and the astigmatism becomes great. On the other hand, it can be recognized that, where an aspheric surface is incorporated into one surface of the fixed lenses in the design example 3, the magnification chromatic aberration is improved significantly and also the astigmatism and the comatic aberration are suppressed.

In this instance, since significant improvement is not achieved under such a restrictive condition that a spherical surface lens is used for the fixed lens group of a deformation surface as in the reference example 1, improvement in performance is implemented by using an aspheric surface lens for the last surface, that is, the 20th surface, on the most image side.

Further, in the present design example 3, the performance improvement is achieved not only by converting one surface of the fixed lens group into an aspheric surface but also by changing the radius of curvature and further changing the lens distance, lens thickness and used material.

It is to be noted that, in the design example 3, the distance from the lens first surface to the image is 30.3 mm. Further, the total length which does not include the back focus and the parallel flat plates (air-converted) is 26.3 mm, and the glass total thickness is 13.5 mm and the ratio between them is 13.5/26.3≈51%. In other words, also in the design example 3, the rate of the total value of the lens thickness to the lens total length is set higher than 40% to achieve miniaturization similarly as in the design example 3.

By incorporating an aspheric surface into the configuration of the zoom lens according to the second embodiment, that is, into a fixed lens in this manner, also where the spherical surface deviation amount of the deformation surface becomes great in comparison with that in the zoom lens according to the first embodiment, an optical system having good optical characteristics can be implemented.

2-4. Design Example 4

Example wherein Two Aspheric Surfaces are Added

Figure 44A:
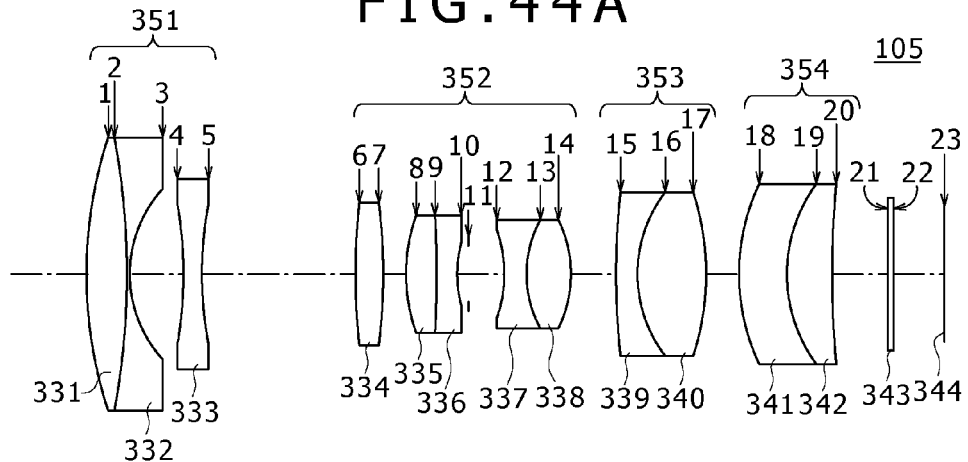
FIGS. 44A, 44B and 44C are schematic views showing sectional configurations of another example of the zoom lens according to the second embodiment in a wide angle end state, an intermediate focal length state and a telephoto end state, respectively.
Figure 44B:
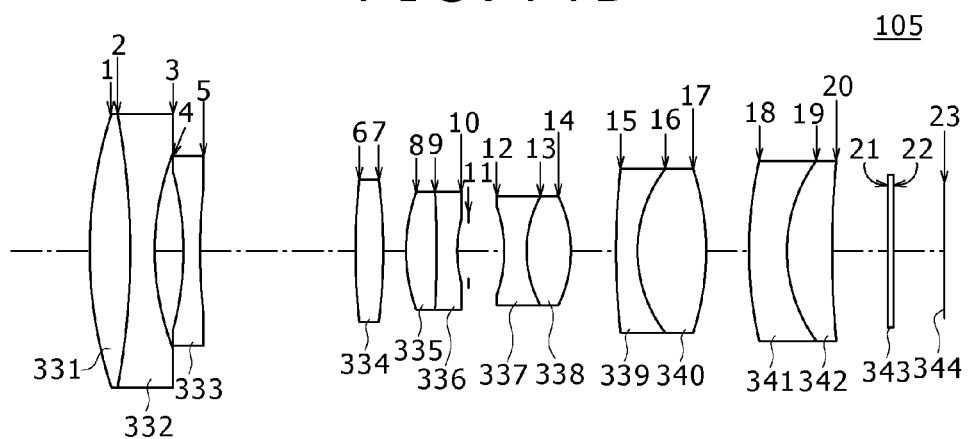
Figure 44C:
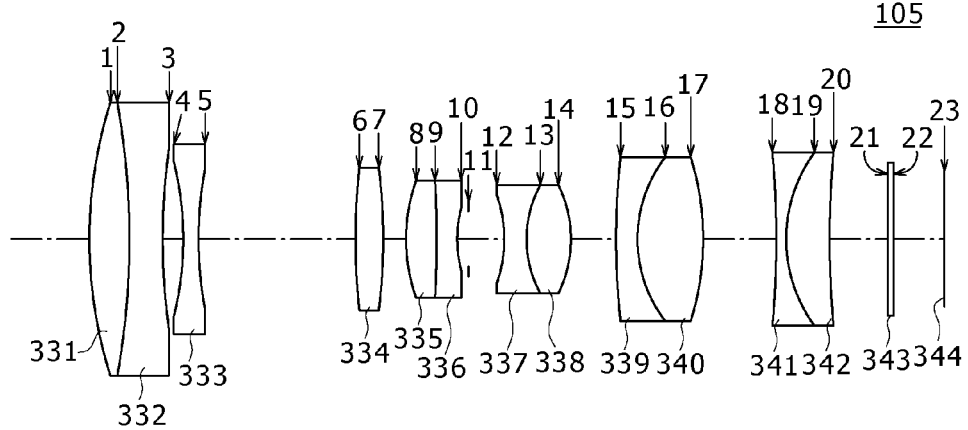

A design example 4 wherein the number of aspheric surfaces is changed to achieve improvement in optical characteristics was investigated. A general lens configuration of the present example in a wide angle end state, an intermediate focal length state and a telephoto end state is shown in FIGS. 44A to 44C, respectively. It is to be noted that the number of lens groups, the refracting powers and the number and arrangement of those lenses which are formed as pasted lenses are substantially similar to those of the design examples 1 and 3, but the surface data are altered a little. In particular, as seen in FIGS. 44A to 44C, also in the zoom lens 105, a first lens group 351 including a first variable lens 332 and a second lens group 352 of the Gauss type including an aperture stop sandwiched therein on the object side and the image side across are disposed in order from the object side. Further, a third lens group 353 for carrying out principally on-axis aberration correction and a fourth lens group 354 including a second variable lens 341 are disposed at a succeeding stage to the second lens group 352. As fixed lenses, lenses 331, 333, 334 to 340 and 342 are provided in order from the object side. Further, a cover glass plate 343 is provided assuming that an image pickup element 344 is disposed on an image surface 23. Also in FIGS. 44A to 44C, surface numbers 1 to 23 are applied in order from the object side. Surface data of the design example 4 are indicated in Table 14 given below, and various dimensions and surface distances of the design example 4 are indicated in Table 15. Further, aspheric surface data of the design example 4 are indicated in Table 16. It is to be noted that, also in the present design example 4, liquid having a refractive index nd of a d line of nd=1.5057 and an Abbe number vd of vd=34.90 is used as the medium of the refracting surface deformation type liquid lens for use with the variable lenses similarly as in the design examples 1 and 3.

TABLE 14 surface data
(Two aspheric surfaces added, first surface, 20th surface)

| Surface number | Radius of curvature | Surface distance | Refractive index (nd) | Abbe number (vd) | Effective diameter |
|---|---|---|---|---|---|
| 1* | 16.1754 | 1.41 | 1.7440 | 44.79 | 4.1028 |
| 2 | −28.48612 | d42 | 1.5057 | 34.90 | 3.8288 |
| 3* | r43 | d43 | | | 2.9699 |
| 4 | −11.97721 | 0.6 | 1.7552 | 27.51 | 2.7615 |
| 5 | 24.54135 | 5.5 | | | 2.6345 |
| 6 | 23.96047 | 1.02 | 1.7440 | 44.79 | 2.6521 |
| 7 | −20.28325 | 0.8 | | | 1.9603 |
| 8 | 5.07312 | 1.06 | 1.7552 | 27.53 | 1.8698 |
| 9 | −52.55789 | 0.8 | 1.5225 | 59.84 | 1.5698 |
| 10 | 4.25199 | 0.4 | | | 1.341 |
| 11 | Aperture stop | 1.2 | | | 1.0474 |
| 12 | −4.60686 | 0.8 | 1.7552 | 27.53 | 1.0919 |
| 13 | 4.49736 | 1.54 | 1.5638 | 60.83 | 0.9587 |
| 14 | −5.34143 | 1.61 | | | 1.1015 |
| 15 | 21.43089 | 0.8 | 1.7408 | 27.79 | 1.3084 |
| 16 | 4.4 | 2.35 | 1.7434 | 44.79 | 1.5866 |
| 17 | −9.95388 | d417 | | | 2.0997 |
| 18* | r418 | d418 | 1.5057 | 34.90 | 2.2449 |
| 19 | 4.85262 | 1.62 | 1.5638 | 60.83 | 2.4085 |
| 20* | 22.2209 | 1.941048 | | | 2.582 |
| 21 | INFINITY | 0.105 | 1.5163 | 64.14 | 2.4506 |
| 22 | INFINITY | 1.968658 | | | 2.3533 |
| 23 (image surface) | INFINITY | | | | |

TABLE 15 various data

| | Wide angle end | Intermediate focal length | Telephoto end |
|---|---|---|---|
| Focal length | 3.73 | 6.46 | 11.19 |
| F number | 3.20 | 3.85 | 5.30 |
| Angle of view [degrees] | 63.4 | 39.3 | 23.3 |
| Total length | | 30.3 (fixed) | |
| BF | | 3.91 (except cover glass thickness) | |
| d42 | 0.03042 | 0.84686 | 1.22928 |
| r43 | 4.70096 | 9.17627 | 21.45534 |
| d43 | 1.86958 | 1.05314 | 0.67072 |
| d417 | 1.26741 | 1.69039 | 2.599772 |

TABLE 15-continued various data

| | Wide angle end | Intermediate focal length | Telephoto end |
|---|---|---|---|
| r418 | 7.40355 | 12.94742 | −16.43472 |
| d418 | 1.63259 | 1.20961 | 0.30023 |

TABLE 16 aspheric surface coefficient

| | Wide angle end | Intermediate focal length | Telephoto end |
|---|---|---|---|
| First surface (fixed) | | | |

$k = -1, A^4 = 1.61 \times 10^{-4}, A^6 = 3.11 \times 10^{-6},$
$A^8 = -9.61 \times 10^{-8}, A^{10} = 0$ Third surface (deformation surface)

| | | | |
|---|---|---|---|
| k | −1 | −1 | −1 |
| $A^4$ | $1.5507 \times 10^{-3}$ | $1.9793 \times 10^{-4}$ | $-7.7287 \times 10^{-6}$ |
| $A^6$ | $6.4537 \times 10^{-5}$ | $3.2942 \times 10^{-6}$ | $9.1154 \times 10^{-6}$ |
| $A^8$ | $-1.4741 \times 10^{-6}$ | $-2.5720 \times 10^{-8}$ | $-1.5517 \times 10^{-6}$ |
| $A^{10}$ | $3.5145 \times 10^{-7}$ | $-2.8353 \times 10^{-9}$ | $9.3965 \times 10^{-8}$ |

18th surface (deformation surface)

| | | | |
|---|---|---|---|
| k | −1 | −1 | −1 |
| $A^4$ | $3.3057 \times 10^{-4}$ | $1.8181 \times 10^{-5}$ | $3.3148 \times 10^{-5}$ |
| $A^6$ | $3.2447 \times 10^{-5}$ | $2.3226 \times 10^{-5}$ | $-4.0486 \times 10^{-5}$ |
| $A^8$ | $-4.5300 \times 10^{-6}$ | $-4.0617 \times 10^{-6}$ | $1.0280 \times 10^{-5}$ |
| $A^{10}$ | $2.7591 \times 10^{-7}$ | $2.5643 \times 10^{-7}$ | $-9.3530 \times 10^{-7}$ |

20th surface (fixed)

Figure 45A:
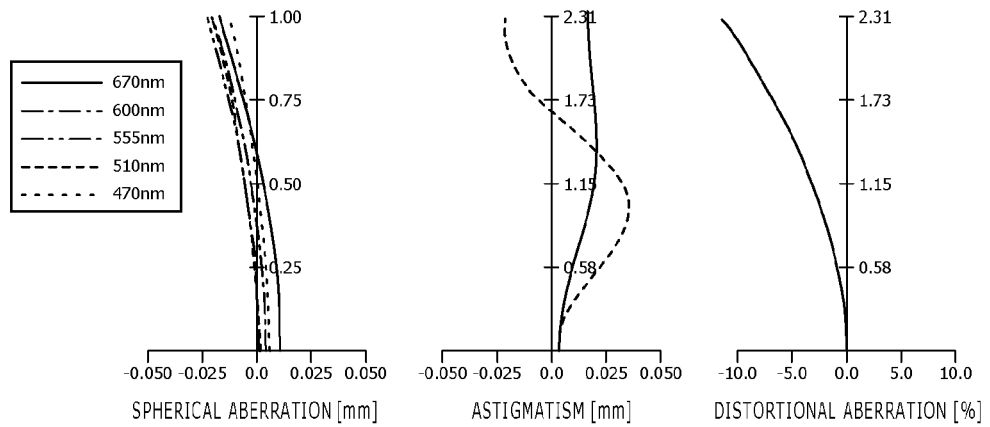
FIGS. 45A, 45B and 45C are diagrammatic views illustrating several aberration characteristics of the zoom lens shown in FIGS. 44A to 44C in a wide angle end state, an intermediate focal length state and a telephoto end state, respectively.
Figure 45B:
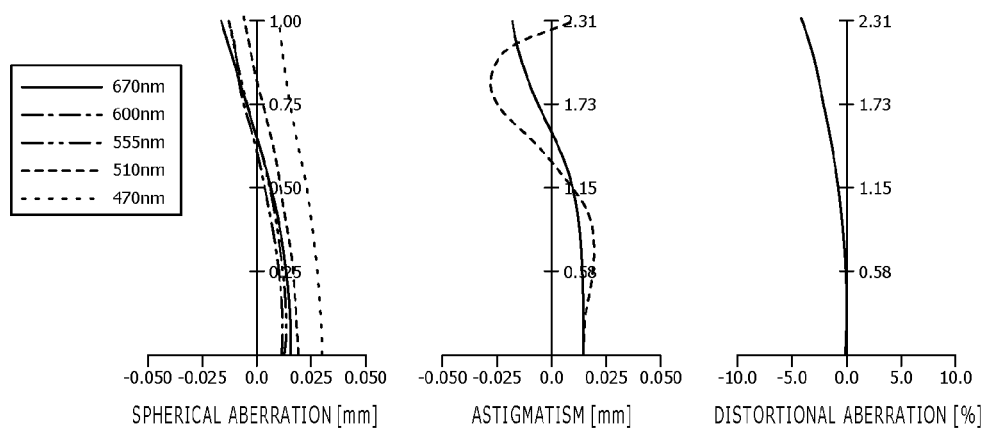
Figure 45C:
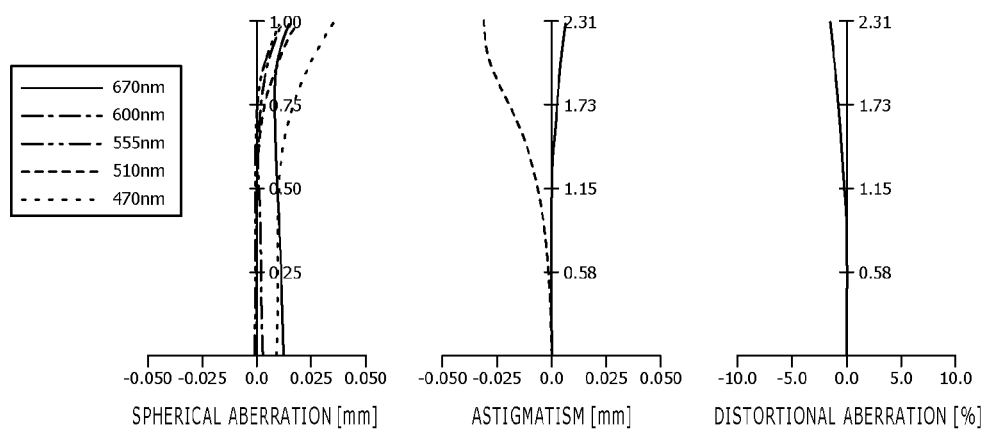
Figure 46A:
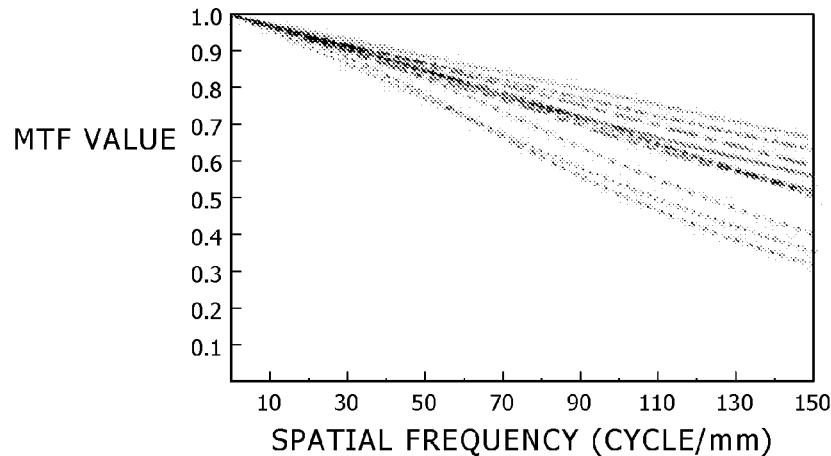
FIGS. 46A, 46B and 46C are diagrammatic views illustrating a spatial frequency characteristic of the zoom lens shown in FIGS. 44A to 44C in a wide angle end state, an intermediate focal length state and a telephoto end state, respectively.
Figure 46B:
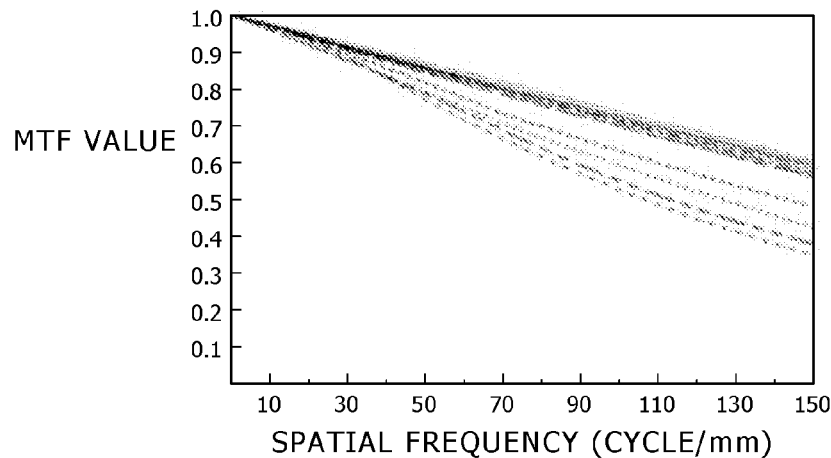
Figure 46C:
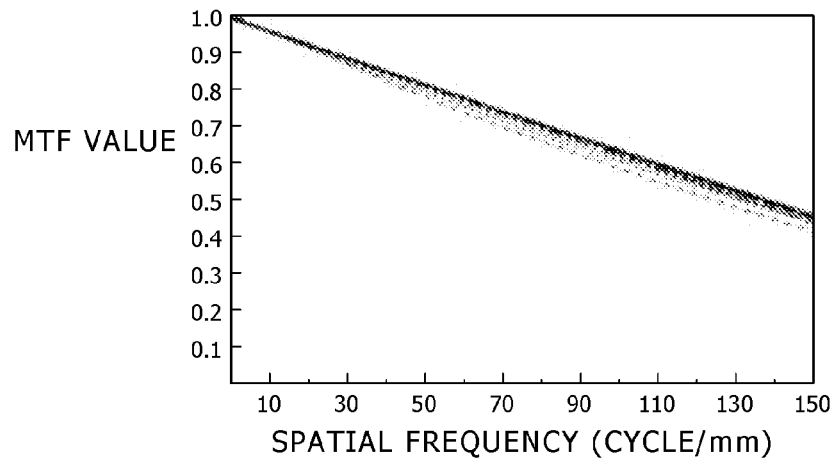

$k = -1, A^4 = 4.7969 \times 10^{-4}, A^6 = -4.0486 \times 10^{-5},$
$A^8 = 6.8513 \times 10^{-6}, A^{10} = 0$ The spherical surface aberration, astigmatism and distortional aberration in a wide angle end state, an intermediate focal length state and a telephoto end state in the design example 4 are illustrated in FIGS. 45A, 45B and 45C, respectively. In the spherical surface aberration diagrams, a solid line indicates the spherical surface aberration at the wavelength of 670 nm; an alternate long and short dash line indicates that at the wavelength of 600 nm; an alternate long and two short dashes line indicates that at the wavelength of 555 nm; a thick broken line indicates that at the wavelength of 510 nm; and a thin broken line indicates that at the wavelength of 470 nm. Further, in the views of the astigmatism, a solid line indicates a sagittal image plane, and a broken line indicates a meridional image plane. Meanwhile, MTF spatial frequency characteristics in a wide angle end state, an intermediate focal length state and a telephoto end state at the reference wavelength of 555 nm are illustrated in FIGS. 46A, 46B and 46C, respectively. Also in FIGS. 46A to 46C, lines a and b indicate diffraction limits, and lines c and d indicate modulation degrees in tangential and radial directions at an image height of 30%; lines e and f indicate those at another image height of 50%; lines g and h indicate those at a further image height of 70%; and lines i and j indicate those at a still further image height of 100%. It can be recognized from the results of FIGS. 45A to 45C and 46A to 46C that, also with the present design example 4, good aberration characteristics can be obtained.

Figure 47:
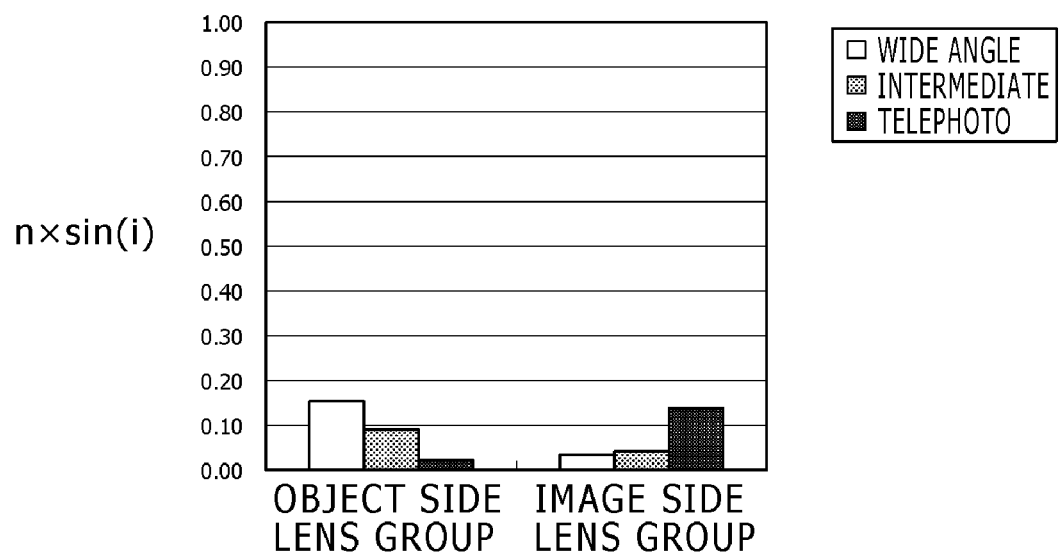
FIG. 47 is a diagrammatic view illustrating a mean value of an off-axis light ray incident angle characteristic of an object side lens group and an image side lens group of the zoom lens shown in FIGS. 44A to 44C.
Figure 48:
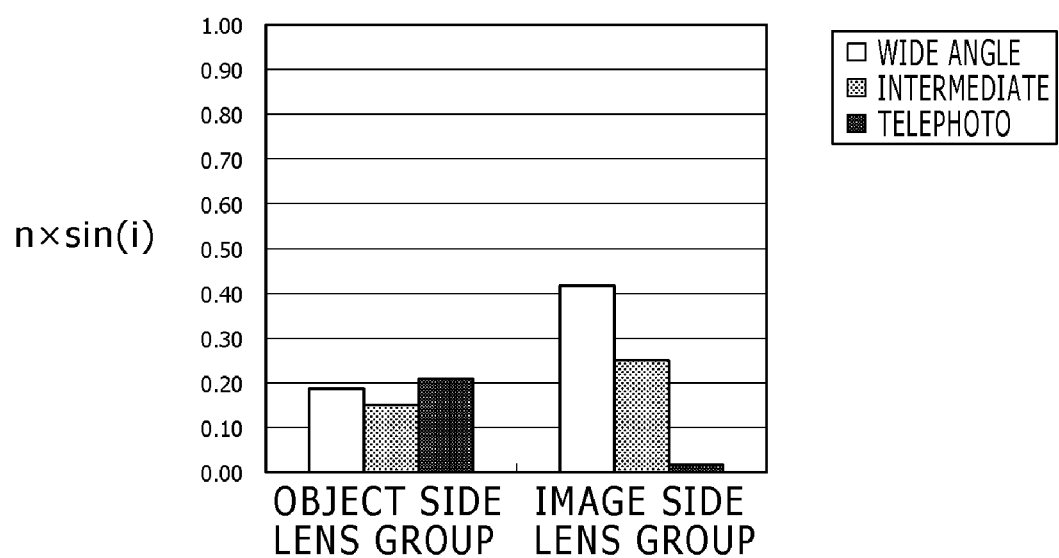
FIG. 48 is a diagrammatic view illustrating a mean value of a main light ray incident angle characteristic of the object side lens group and the image side lens group of the zoom lens shown in FIGS. 44A to 44C.

FIGS. 47 and 48 illustrate results of determination of the mean value of n×sin(i) in the first lens group 351 and the fourth lens group 354 with regard to an off-axis light ray and a main light ray, respectively. From FIGS. 47 and 48, it can be recognized that the mean value of n×sin(i) becomes less than 0.5 in regard to the first and fourth lens groups 351 and 354 including the first and second variable lenses 332 and 341.

Figure 49:
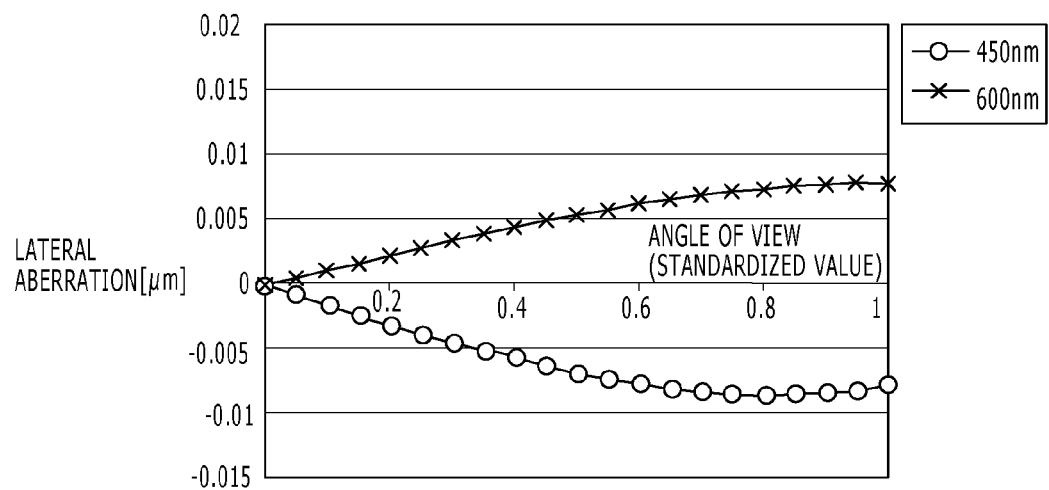
FIG. 49 is a diagrammatic view illustrating a lateral aberration characteristic in a wide angle end state of the zoom lens shown in FIGS. 44A to 44C.
Figure 50:
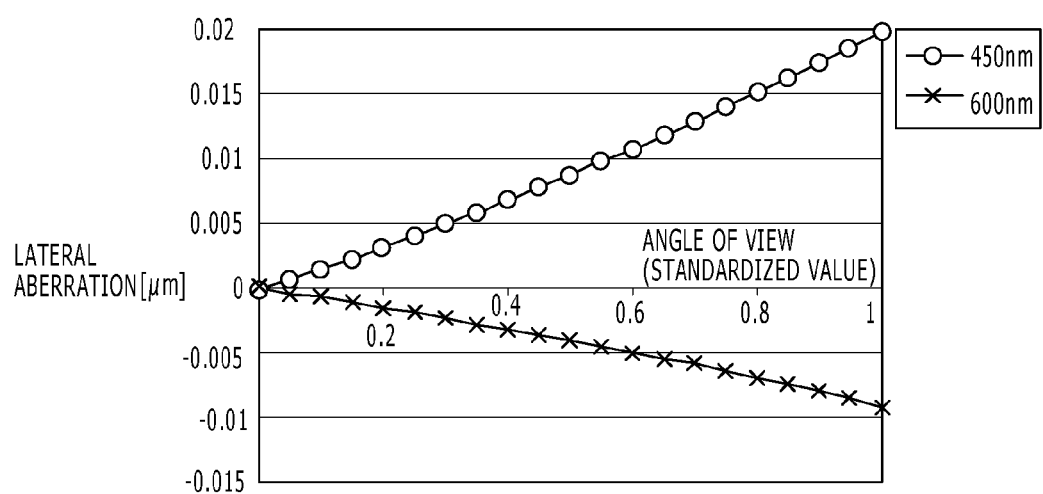
FIG. 50 is a diagrammatic view illustrating a lateral aberration characteristic in a telephoto end state of the zoom lens shown in FIGS. 44A to 44C.

FIGS. 49 and 50 illustrate results of an analysis of the difference in a unit of μm of the lateral aberration to a standardized field or angle of view from the image point of the wavelength of 530 nm in regard to light rays of the wavelengths of 450 nm and 600 nm. In particular, FIG. 49 illustrates the lateral aberration in a wide angle end state and FIG. 50 illustrates the lateral aberration in a telephoto end state. From FIGS. 49 and 50, also in the present example, it can be determined that, particularly in a telephoto end state, the lateral aberration varies linearly with respect to the angle of view and, even if a magnification chromatic aberration correction element is not added, aberration correction by signal processing can be carried out. As regards a wide angle end state, the variation of the lateral aberration is a little different from a linear variation. However, also in the present example, since the third lens group 353 is provided similarly as in the design example 3, on-axis aberration correction is carried out. Therefore, in the third design example 4, magnification chromatic aberration of a peripheral light ray remains. However, correction of the aberration can be carried out by signal processing as described above. Therefore, on-axis aberration correction can be applied to obtain good optical characteristics similarly as in the design examples 1 and 3.

In the present design example 4, an aspheric surface lens is used for the lens last surface, that is, for the 20th surface, which is the most image side lens surface and also the most object side lens surface is formed as an aspheric surface to implement improvement in performance similarly as in the design example 3.

Further, also in the present design example 4, by changing the radius of curvature, lens distance, lens thickness and used glass material from those in the design example 1 in addition to increase of the number of aspheric surfaces of the fixed lens group, also where the spherical deviation amount of the deformation surfaces becomes great, aberration can be suppressed and optical characteristics can be kept good.

It is to be noted that, in the design example 4, the distance from the lens first surface to the image is 30.3 mm. Further, the total length which does not include the back focus and the parallel flat plates (air-converted) is 26.3 mm, and the glass total thickness is 13.5 mm and the ratio between them is 13.5/26.3≈51%. In other words, also in the design example 4, the rate of the total value of the lens thickness to the lens total length is set higher than 40% to achieve miniaturization similarly as in the design example 3.

3. Third Embodiment

Example wherein the Number of Lenses is Reduced Using an Aspheric Surface 3-1. Design Example 5

Figure 51A:
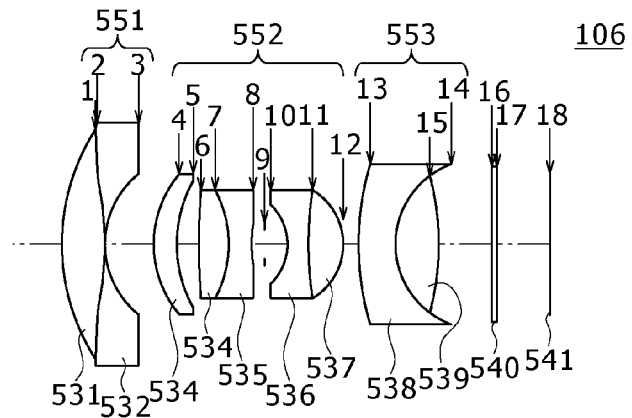
FIGS. 51A, 51B and 51C are schematic views showing sectional configurations of an example of a zoom lens according to a third embodiment in a wide angle end state, an intermediate focal length state and a telephoto end state, respectively.
Figure 51B:
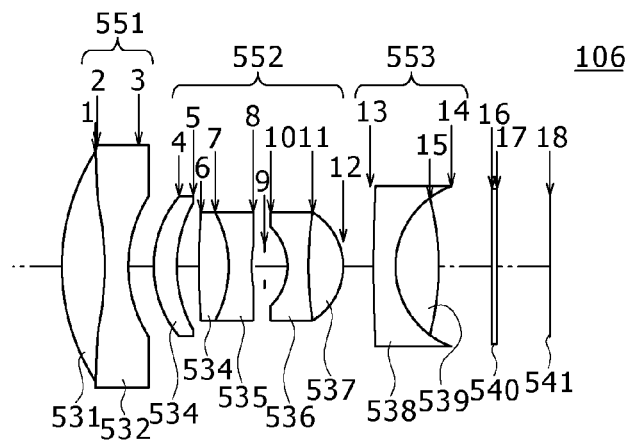
Figure 51C:
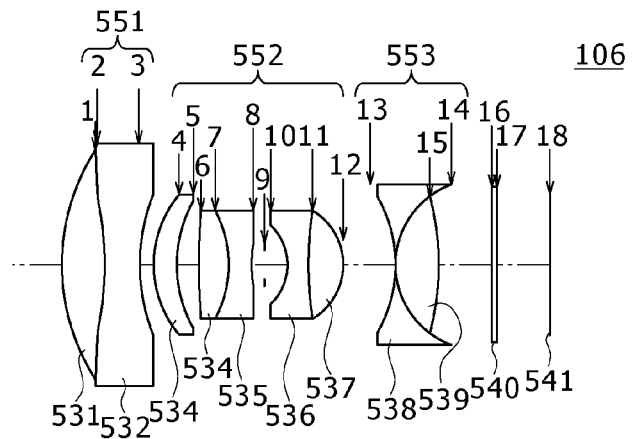

Example wherein Three Aspheric Surfaces are Used to Decrease the Number of Lenses A design example 5 wherein an aspheric surface is provided and the number of aspheric surfaces is reduced to achieve improvement in optical characteristics and miniaturization was investigated. A general lens configuration of the present example in a wide angle end state, an intermediate focal length state and a telephoto end state is shown in FIGS. 51A to 51C, respectively. It is to be noted that the number of lens groups, the refracting powers and the number and arrangement of those lenses which are formed as pasted lenses are substantially similar to those of the design example 2, but the surface data are altered a little. In particular, as seen in FIGS. 51A to 51C, also in the zoom lens 106, a first lens group 551 including a first variable lens 532 and a second lens group 552 of the Gauss type an aperture stop sandwiched therein on the object side and the image side are disposed in order from the object side. Further, a third lens group 553 including a second variable lens 538 is disposed at a succeeding stage to the second lens group 552. As fixed lenses, lenses 531, 533, 534 to 537 and 539 are provided in order from the object side. Also in FIGS. 51A to 51C, surface numbers 1 to 18 are applied in order from the object side. Lens surface data of the reference example 5 are indicated in Table 20 given below, and various dimensions and surface distances of the design example 5 are indicated in Table 21 below. Further, aspheric surface data of the design example 5 are indicated in Table 22 below. Also in the present design example 5, liquid having a refractive index nd of a d line of nd=1.5057 and an Abbe number vd of vd=34.90 is used as the medium of the refracting surface deformation type lenses for use with the variable lenses similarly as in the design examples 1 and 3.

TABLE 20 surface data
(Three aspheric surfaces added, second surface, tenth surface, 15th surface)

| Surface number | Radius of curvature | Surface distance | Refractive index (nd) | Abbe number (vd) | Effective diameter |
|---|---|---|---|---|---|
| 1 | 7.54899 | 1.5 | 1.743997 | 44.79 | 3.6697 |
| 2* | −10.59909 | d52 | 1.5057 | 34.90 | 3.5408 |
| 3 | r53 | d53 | | | 2.4304 |
| 4 | 3.67506 | 0.8 | 1.48749 | 70.41 | 1.9989 |
| 5 | 4.40199 | 0.8 | | | 1.7237 |
| 6 | 38.83283 | 1.06 | 1.755201 | 27.58 | 1.4738 |
| 7 | −3.44066 | 0.8 | 1.551243 | 49.21 | 1.239 |
| 8 | 5.58805 | 0.4 | 1.7552 | 27.53 | 0.7903 |
| 9 | Aperture stop | 0.8 | | | |
| 10* | −2.67752 | 0.8 | 1.696146 | 31.66 | 0.8246 |
| 11 | 12.31034 | 1.2 | 1.642457 | 56.31 | 1.2563 |
| 12 | −2.22673 | d512 | | | 1.51 |
| 13 | r513 | d513 | 1.5057 | 34.90 | 1.9679 |
| 14 | 2.89037 | 1.5 | 1.606736 | 61.05 | 2.2641 |
| 15* | −11.15041 | 1.941048 | | | 2.2731 |
| 16 | INFINITY | 0.105 | 1.51633 | 64.14 | |
| 17 | INFINITY | 1.898967 | | | |
| 18 (image surface) | INFINITY | | | | |

TABLE 21 various data

| | Wide angle end | Intermediate focal length | Telephoto end |
|---|---|---|---|
| Focal length | 3.74 | 6.46 | 11.18 |
| F number | 3.20 | 3.78 | 5.22 |
| Angle of view [degrees] | 63.4 | 39.3 | 23.3 |
| Total length | 17.2 (fixed) | | |
| BF | 3.84 (except cover glass thickness) | | |
| d52 | 1.24825 | 0.89009 | 0.01681 |
| r53 | 6.37941 | 4.45693 | 3.08110 |
| d53 | 0.50175 | 0.85991 | 1.73319 |

TABLE 21-continued various data

| | Wide angle end | Intermediate focal length | Telephoto end |
|---|---|---|---|
| d512 | 1.83366 | 1.07571 | 0.52982 |
| r513 | −5.28355 | 53.97592 | 8.86056 |
| d513 | 0.01634 | 0.77429 | 1.32018 |

TABLE 22 aspheric surface coefficient

| Second surface (fixed) | $k = -1, A^4 = 1.6728 \times 10^{-3}, A^6 = -1.1612 \times 10^{-5}, A^8 = 1.5511 \times 10^{-6}, A^{10} = -5.4570 \times 10^{-8}$ |
| Tenth surface (fixed) | $k = -1, A^4 = -2.9369 \times 10^{-2}, A^6 = -1.8407 \times 10^{-2}, A^8 = 1.5115 \times 10^{-2}, A^{10} = -9.1391 \times 10^{-3}$ |
| 15th surface (fixed) | $k = -1, A^4 = -1.0445 \times 10^{-3}, A^6 = -7.2504 \times 10^{-5}, A^8 = 2.1739 \times 10^{-5}, A^{10} = 7.9055 \times 10^{-7}$ |

Figure 52A:
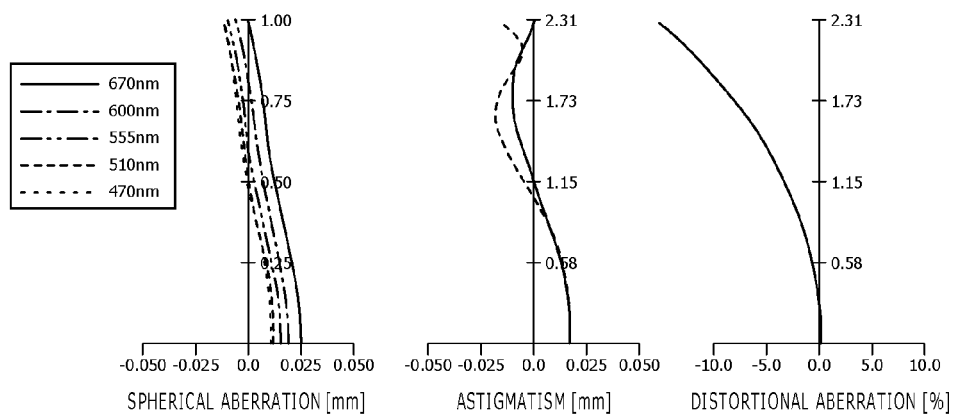
FIGS. 52A, 52B and 52C are diagrammatic views illustrating several aberration characteristics of the zoom lens shown in FIGS. 51A to 51C in a wide angle end state, an intermediate focal length state and a telephoto end state, respectively.
Figure 52B:
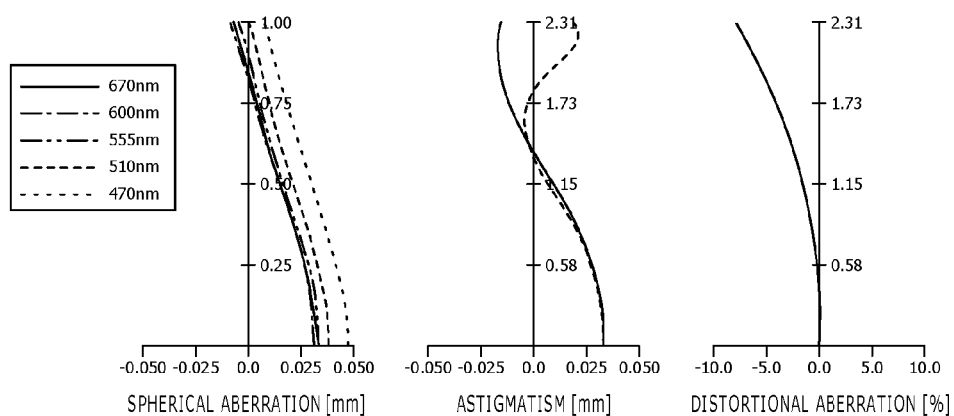
Figure 52C:
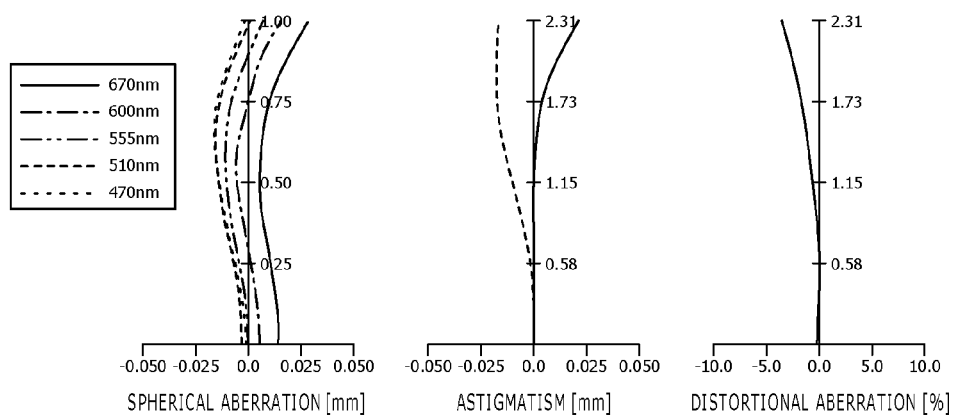
Figure 53A:
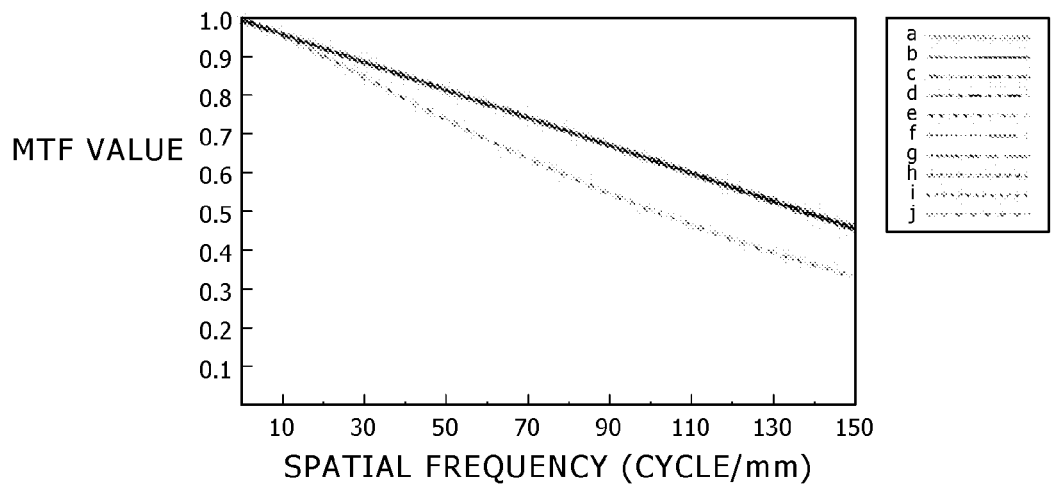
FIGS. 53A, 53B and 53C are diagrammatic views illustrating a spatial frequency characteristic of the zoom lens shown in FIGS. 51A to 51C in a wide angle end state, an intermediate focal length state and a telephoto end state, respectively.
Figure 53B:
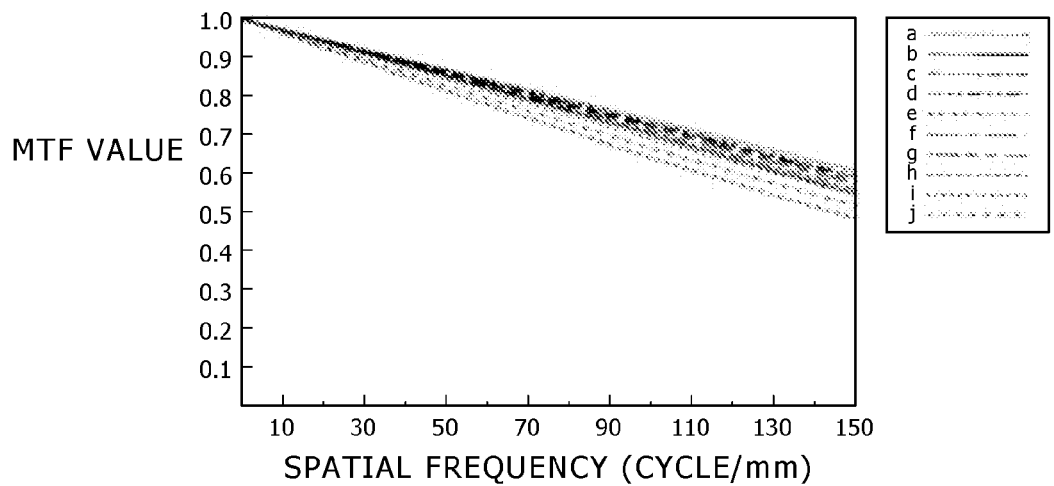
Figure 53C:
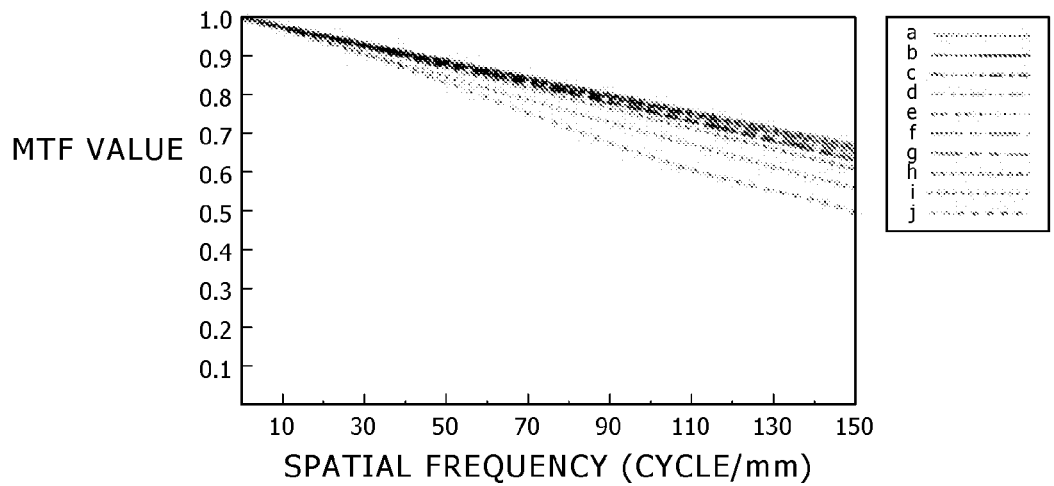

The spherical surface aberration, astigmatism and distortional aberration in a wide angle end state, an intermediate focal length state and a telephoto end state in the design example 5 are illustrated in FIGS. 52A, 52B and 52C, respectively. In the spherical surface aberration diagrams, a solid line indicates the spherical surface aberration at the wavelength of 670 nm; an alternate long and short dash line indicates that at the wavelength of 600 nm; an alternate long and two short dashes line indicates that at the wavelength of 555 nm; a thick broken line indicates that at the wavelength of 510 nm; and a thin broken line indicates that at the wavelength of 470 nm. Further, in the views of the astigmatism, a solid line indicates a sagittal image plane, and a broken line indicates a meridional image plane. Meanwhile, MTF spatial frequency characteristics in a wide angle end state, an intermediate focal length state and a telephoto end state at the reference wavelength of 555 nm are illustrated in FIGS. 53A, 53B and 53C, respectively. Also in FIGS. 53A to 53C, lines a and b indicate diffraction limits, and lines c and d indicate modulation degrees in tangential and radial directions at an image height of 30%; lines e and f indicate those at another image height of 50%; lines g and h indicate those at a further image height of 70%; and lines i and j indicate those at a still further image height of 100%. It can be recognized from the results of FIGS. 52A to 52C and 53A to 53C that, also with the present design example 4, good aberration characteristics can be obtained.

Figure 54:
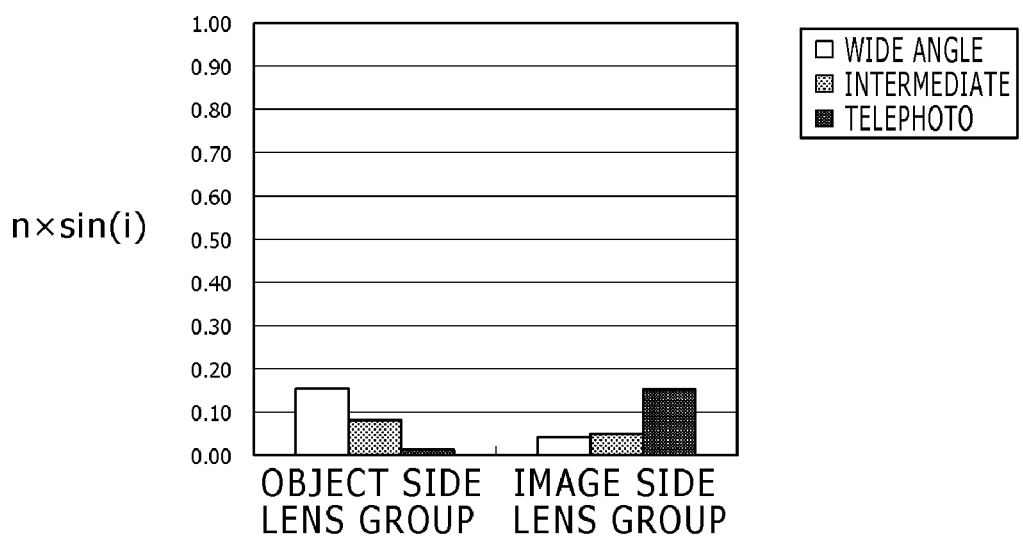
FIG. 54 is a diagrammatic view illustrating a mean value of an off-axis light ray incident angle characteristic of an object side lens group and an image side lens group of the zoom lens shown in FIGS. 51A to 51C.
Figure 55:
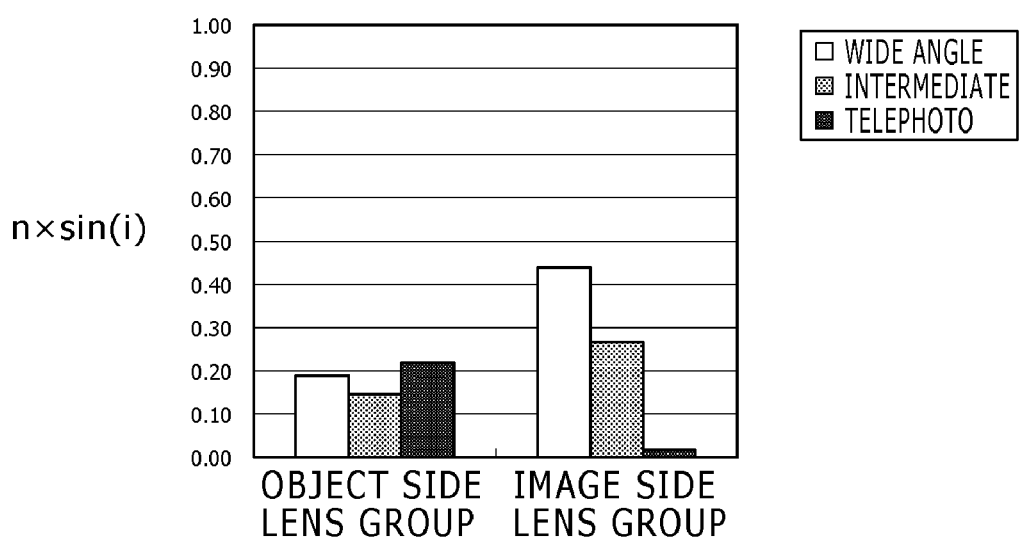
FIG. 55 is a diagrammatic view illustrating a mean value of a main light ray incident angle characteristic of the object side lens group and the image side lens group of the zoom lens shown in FIGS. 51A to 51C.

FIGS. 54 and 55 illustrate results of determination of the mean value of n×sin(i) in the first lens group 551 and the third lens group 553 with regard to an off-axis light ray and a main light ray. From FIGS. 54 and 55, it can be recognized that the mean value of n×sin(i) becomes less than 0.5 in regard to the first and third lens groups 551 and 553 including the first and second variable lenses 532 and 538.

Figure 56:
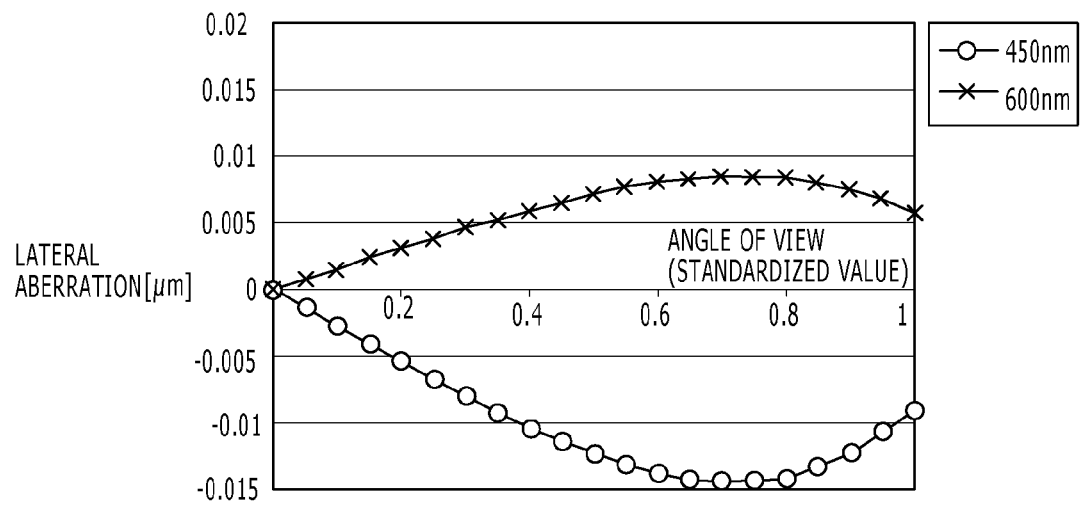
FIG. 56 is a diagrammatic view illustrating a lateral aberration characteristic of the zoom lens shown in FIGS. 51A to 51C in a wide angle end state.
Figure 57:
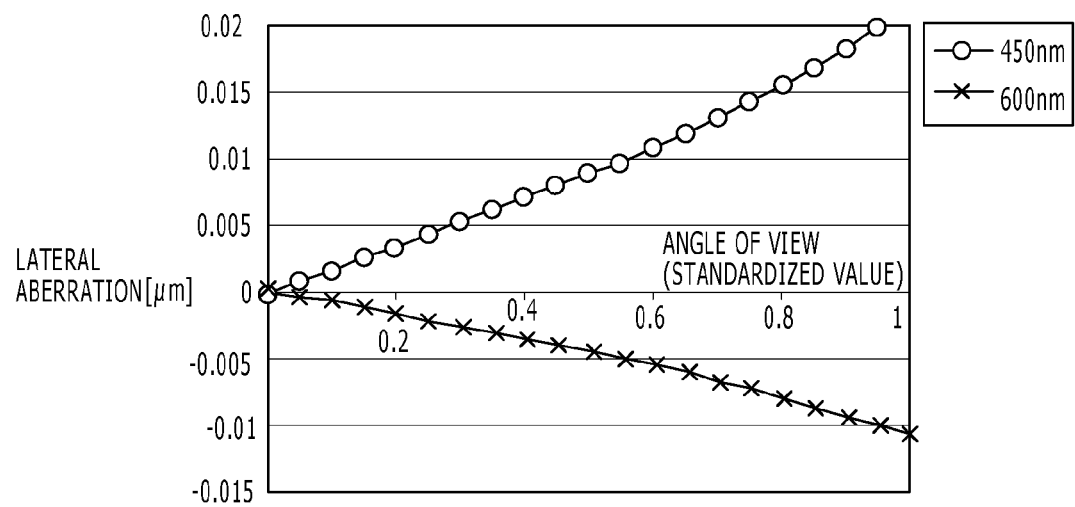
FIG. 57 is a diagrammatic view illustrating a lateral aberration characteristic of the zoom lens shown in FIGS. 51A to 51C in a telephoto end state.

FIGS. 56 and 57 illustrate results of an analysis of the difference in a unit of μm of the lateral aberration to a standardized field or angle of view from the image point of the wavelength of 530 nm in regard to light rays of the wavelengths of 450 nm and 600 nm. In particular, FIG. 56 illustrates the lateral aberration in a wide angle end state and FIG. 57 illustrates the lateral aberration in a telephoto end state. From FIGS. 56 and 57, also in the present example, it can be determined that, particularly in a telephoto end state, the lateral aberration varies linearly with respect to the angle of view and, even if a magnification chromatic aberration correction element is not added, aberration correction by signal processing can be carried out. As regards a wide angle end state, the variation of the lateral aberration is a little different from a linear variation. However, the variation remains within a range within which there is no problem. Therefore, in the design example 5, magnification chromatic aberration of a peripheral light ray remains. However, correction of the aberration can be carried out by signal processing as described above. Besides, the number of lenses can be reduced to implement a configuration which achieves miniaturization of the entire apparatus similarly as in the design example 2.

In the present design example 5, an aspheric surface lens is used for the lens last surface, that is, for the 15th surface, which is the most image side lens surface, similarly as in the design examples 3 and 4, and also the second surface of the second most object side lens surface is formed as an aspheric surface to implement improvement in performance.

Further, also in the present design example 5, by changing the radius of curvature, lens distance, lens thickness and used material from those in the design example 1 in addition to increase of the number of aspheric surfaces of the fixed lens group, also where the spherical deviation amount of the deformation surfaces becomes great, optical characteristics can be kept good.

It is to be noted that, in the design example 5, the distance from the lens first surface to the image is 26.4 mm. Accordingly, by using the present design example 5, reduction of the optical path length by approximately 13% in comparison with that in the design example 1 can be anticipated. Further, the total length which does not include the back focus and the parallel flat plates (air-converted) is 22.26 mm, and the glass total thickness is 10.27 mm and the ratio between them is 10.27/22.26≈46.1%. In other words, while the number of lenses is reduced from that in the design example 1, the length of the air portion is reduced and significant reduction of the total length is achieved.

4. Study of the Distance Between a Variable Lens and the Aperture Stop 4-1. Design Example 6

Example wherein Three Aspheric Surfaces are Used

Now, results of investigation of the ratio of the distance from the position of an aperture stop to a deformation surface of a variable lens to the lens total length as a technique for determining a range of an optimum position at which the variable lens is to be provided are described.

Figure 58:
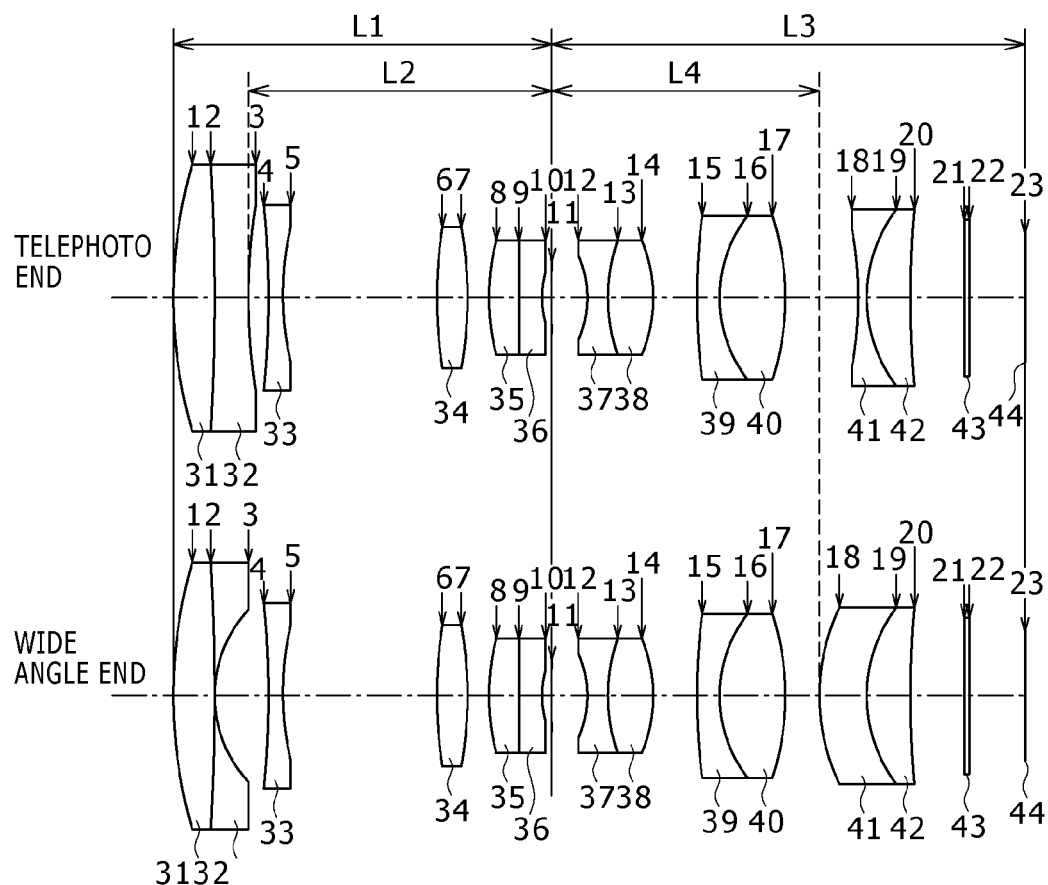
FIG. 58 is a schematic view illustrating a position of the variable lens of the zoom lens shown in FIG. 1 with respect to an aperture stop.

First, the ratio of the distance from the aperture stop to the variable lens deformation surface to the lens total length in the design example 1 is described with reference to FIG. 58. FIG. 58 shows the zoom lens in a telephoto end state and a wide angle state, and pertaining distances are defined in both of the telephoto end state and the wide angle end state. In particular, as seen in FIG. 58, the distance from the surface of the convex lens 31 on the object side to the aperture stop is represented by L1, and the distance from the aperture stop to the variation surface 3 of the first variable lens 32 on the object side is represented by L2. Similarly, the distance from the aperture stop to the image surface 23 is represented by L3, and the distance from the aperture stop to the deformation surface 18 of the second variable lens 41 on the image side is represented by L4.

In this instance,

L2/L1 (front side)=80.4% (telephoto end)

89.3% (wide angle end)

L4/L3 (rear side)=64.7% (telephoto end)
56.8% (wide angle end)
are satisfied. In particular, $$L2/L1 \geq 0.55$$

$$L4/L3 \geq 0.3$$

are satisfied.

Where the ranges given above were applied, an optical system was obtained wherein the aberrations are reduced and there is no problem particularly in regard to the magnification chromatic aberration. This is described below with reference to the design example 6.

Figure 59:
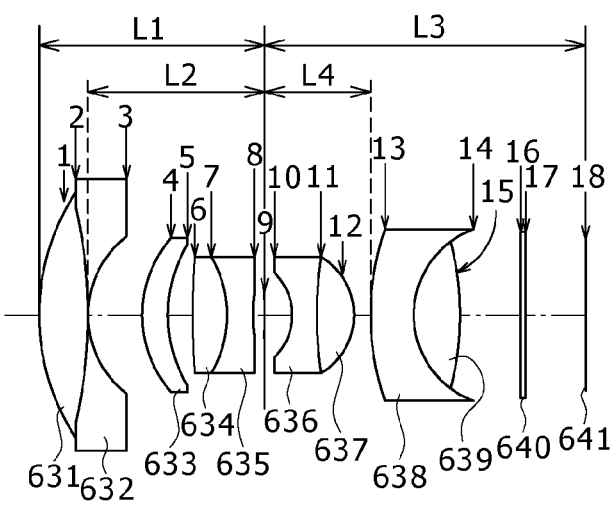
FIG. 59 is a schematic view showing a sectional configuration of another example of the zoom lens according to the third embodiment of the present invention in an intermediate focal length state.

In the present design example 6, reduction of the number of lenses is achieved and an aspheric surface lens is used for a fixed lens. A general lens configuration of the optical system in an intermediate focal length state is shown in FIG. 59.

In the present example, the zoom lens includes an object side lens group including a first variable lens 632, a lens group having a Gauss type configuration including an aperture stop sandwiched between therein, an image side lens group including a second variable lens 638. The object side lens group includes a convex lens 631 having a negative refracting power and a first variable lens 632, disposed in order from the object side. Meanwhile, the Gauss type lens group includes a meniscus lens 633 having a positive refracting power, a pasted lens of a lens 634 having a positive refracting power and a concave 635 having a negative refracting power, and a concave lens 636 and a convex lens 637 having a negative refracting power and sandwiching an aperture stop 9 therebetween. The image side lens group includes a second variable lens 638 having a positive refracting power and a convex lens 639 having a positive refracting power. The lenses 631, 632 and 638, 639 are formed integrally with each other. Lens surface data in the design example 6 are indicated in Table 23 given below, and various data and surface distances are indicated in Table 24 given below. Further, aspheric surface data are indicated in Table 25 given below. In the present design example 6, liquid having a refractive index nd of a d line of nd=1.58 and an Abbe number νd of νd=29.1 is used as the medium of the refracting surface deformation type liquid lens for use with the variable lenses. Further, in the present example, the second, tenth and 15th surfaces are aspheric surfaces.

TABLE 23 surface data (unit:mm)

| Surface number | Radius of curvature | Surface distance | Refractive index (nd) | Abbe number (νd) |
|---|---|---|---|---|
| 1 | 7.54899 | 1.5 | 1.743997 | 44.79 |
| 2* | −10.5991 | d62 | 1.58 | 29.1 |
| 3 | r63 | d63 | | |
| 4 | 3.67506 | 0.8 | 1.487490 | 70.41 |
| 5 | 4.40199 | 0.8 | | |
| 6 | 38.83283 | 1.06 | 1.755201 | 27.58 |
| 7 | −3.44066 | 0.8 | 1.551243 | 49.21 |
| 8 | 5.58805 | 1.2 | | |
| 9 | Aperture stop | 0.8 | | |
| 10* | −2.67752 | 0.8 | 1.696146 | 31.66 |
| 11 | 12.31034 | 1.2 | 1.642457 | 56.31 |
| 12 | −2.22673 | d612 | | |
| 13 | r613 | d613 | 1.50570 | 34.9 |
| 14 | 2.89037 | 1.5 | 1.606736 | 61.05 |
| 15* | −11.1504 | 1.941048 | | |
| 16 | INFINITY | 0.105 | 1.51633 | 64.1 |
| 17 | INFINITY | 1.898967 | | |
| 18 (image surface) | INFINITY | | | |

TABLE 24 various data

| | Wide angle end | Intermediate focal length | Telephoto end |
|---|---|---|---|
| Focal length | 3.73 | 6.46 | 11.19 |
| F number | 3.20 | 3.85 | 5.30 |
| Angle of view [degrees] | 63.4 | 39.3 | 23.3 |
| Total length | | 17.2 (fixed) | |
| BF | | 3.84 (except cover glass thickness) | |
| d62 | 0.01681 | 0.89009 | 1.24825 |
| r63 | 3.0811 | 4.45693 | 6.37941 |
| d63 | 1.73319 | 0.85991 | 0.50175 |
| d612 | 0.52982 | 1.07571 | 1.83366 |
| r613 | 8.86056 | 53.97592 | −5.28355 |
| d613 | 1.32018 | 0.77429 | 0.01634 |

TABLE 25 aspheric surface coefficient

| Second surface (fixed) | $k = -1, A^4 = 0.167275 \times 10^{-2}, A^6 = -0.116120 \times 10^{-4},$ $A^8 = 0.155110 \times 10^{-5}, A^{10} = -0.545700 \times 10^{-7}$ |
|---|---|
| Tenth surface (fixed) | $k = -1, A^4 = -0.293694 \times 10^{-1}, A^6 = -0.184065 \times 10^{-1},$ $A^8 = 0.151149 \times 10^{-1}, A^{10} = -0.913910 \times 10^{-2}$ |
| 15th surface (fixed) | $k = -1, A^4 = -0.104447 \times 10^{-2}, A^6 = -0.725035 \times 10^{-4},$ $A^8 = 0.217394 \times 10^{-4}, A^{10} = 0.790550 \times 10^{-6}$ |

In the present design example 6, as seen in FIG. 59, the distance from the surface of the convex lens 631 on the object side to the aperture stop is represented by L1, and the distance from the aperture stop to the variation surface 3 of the first variable lens 632 on the object side is represented by L2. Similarly, the distance from the aperture stop to the deformation surface 18 is represented by L3, and the distance from the aperture stop to the deformation surface 13 of the second variable lens 638 on the image side is represented by L4.

In this instance,
L2/L1 (front side)=61% (telephoto end)
79% (wide angle end)
L4/L3 (rear side)=46% (telephoto end)
33% (wide angle end)
are satisfied. In particular, $$L2/L1 \geq 0.55$$

$$L4/L3 \geq 0.3$$

are satisfied.

Figure 60:
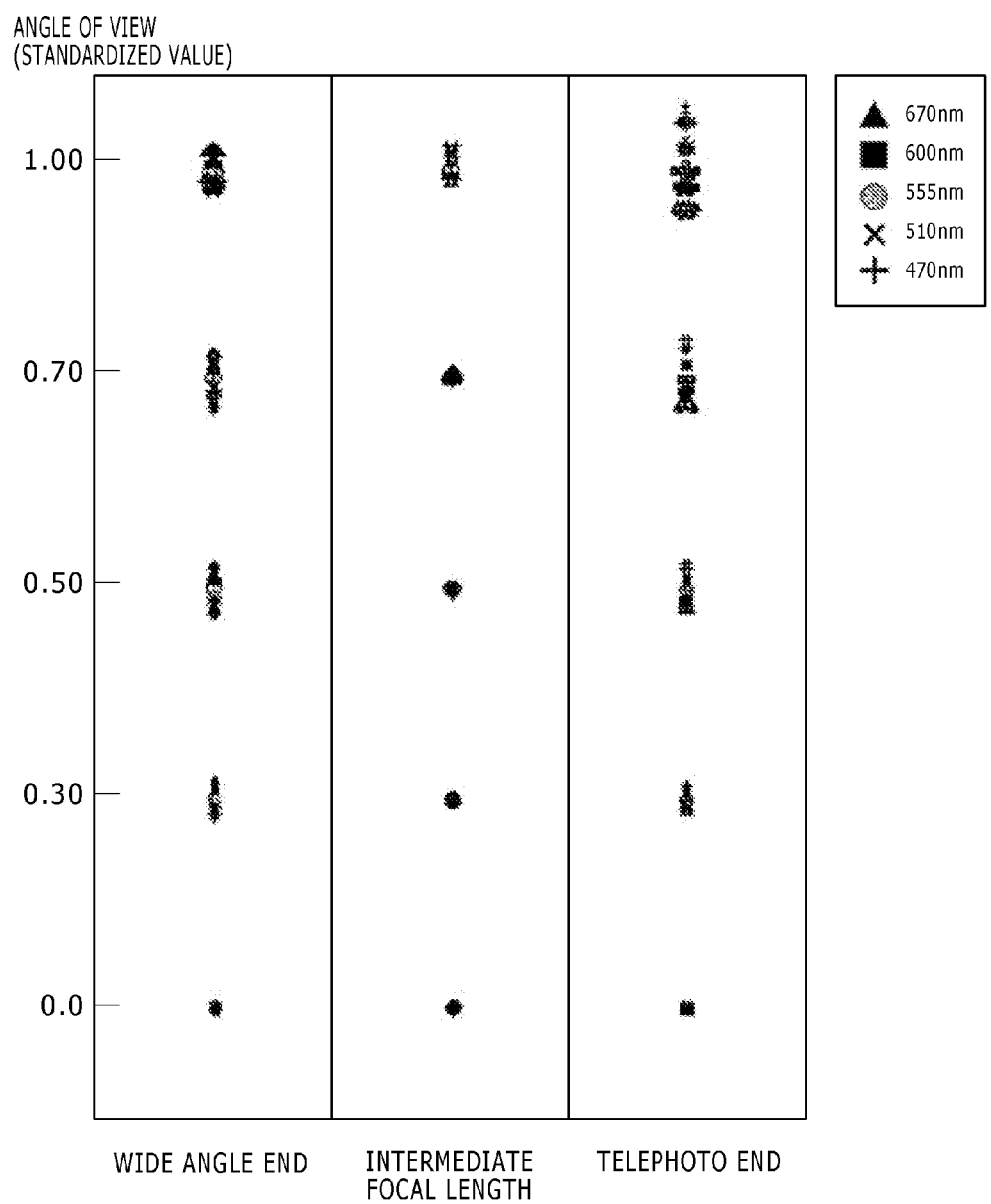
FIG. 60 is a diagrammatic view illustrating magnification chromatic aberration of the zoom lens shown in FIG. 59 in a wide angle end state, an intermediate focal length state and a telephoto end state.

The magnification chromatic aberration in this instance is illustrated in FIG. 60. Similarly to FIGS. 41 to 43, FIG. 60 illustrates the magnification chromatic aberration in a wide angle end state, an intermediate focal length state and a telephoto end state, and similar symbols are applied to the respective wavelengths. From results of FIG. 60, it can be recognized that the magnification chromatic aberration is suppressed favorably, and also the astigmatism and the comatic aberration are suppressed favorably.

4-2. Comparative Example 2

Example wherein the Object Side Variable Lens is Positioned Nearer to the Aperture Stop on the Basis of the Design Example 6

Figure 61:
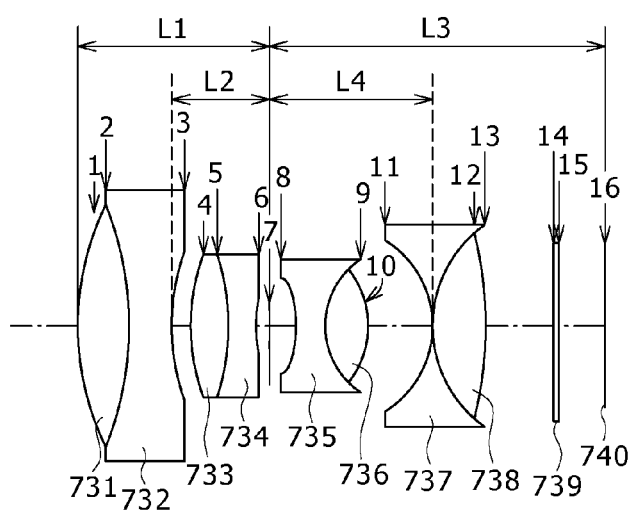
FIG. 61 is a schematic view showing a sectional configuration of a zoom lens according to a comparative example 2 wherein a variable lens in a lens group on the object side is positioned nearer to an aperture stop based on a basic configuration provided by the zoom lens shown in FIG. 59 where the zoom lens is in an intermediate focal length state.

In the present example, the zoom lens is designed such that the lens group on the object side which forms the variator is displaced toward the aperture stop side on the basis of the lens configuration according to the design example 6. FIG. 61 shows a general lens configuration in an intermediate focal length state. Referring to FIG. 61, the zoom lens includes an object side lens group including a first variable lens 732, a lens group having a Gauss type configuration including an aperture stop sandwiched therein, and an image side lens group including a second variable lens 737. The object side lens group includes a convex lens 731 having a negative refracting power and a first variable lens 732, disposed in order from the object side. Meanwhile, the Gauss type lens group includes a pasted lens including a lens 733 having a positive refracting power and a concave lens 734 having a negative refracting power, and a concave lens 735 having a negative refracting power and a convex lens 736 sandwiching an aperture stop 7. The image side lens group includes a second variable lens 737 and a convex lens 738 having a positive refracting power. The lenses 731, 732 and 737, 738 are individually formed integrally with each other. Lens surface data in the comparative example 2 are indicated in Table 26 given below, and various data and surface distances are indicated in Table 27 given below. Further, aspheric surface data are indicated in Table 28 given below. Also in the present comparative example 2, liquid having a refractive index nd of a d line of nd=1.58 and an Abbe number vd of vd=29.1 is used as the medium of the refracting surface deformation type liquid lens for use with the variable lenses. Further, in the present example, the second, tenth and 13th surfaces are aspheric surfaces.

TABLE 26 surface data (unit:mm)

| Surface number | Radius of curvature | Surface distance | Refractive index (nd) | Abbe number (vd) |
|---|---|---|---|---|
| 1 | 7.54899 | 1.5 | 1.743997 | 44.79 |
| 2* | −5.40283 | d72 | 1.58 | 29.1 |
| 3 | r73 | d73 | | |
| 4 | 3.9399 | 0.8 | 1.710891 | 29.62 |
| 5 | −14.5342 | 0.8 | | |
| 6 | 2.73163 | 1.06 | 1.530092 | 66.25 |
| 7 | Aperture stop | 0.8 | | |
| 8* | −3.92707 | 1.2 | 1.641483 | 34.32 |
| 9 | 1.95998 | 0.8 | 1.642896 | 56.24 |
| 10 | −2.80214 | d710 | 1.696146 | |
| 11 | r711 | d711 | 1.505700 | 34.9 |
| 12 | 3.34364 | 1.5 | 1.744023 | 44.72 |
| 13* | −13.9427 | 1.941048 | | |
| 14 | INFINITY | 0.105 | 1.51633 | 64.1 |
| 15 | INFINITY | 1.23868 | | |
| 16 (image surface) | INFINITY | | | |

TABLE 27 various data

| | Wide angle end | Intermediate focal length | Telephoto end |
|---|---|---|---|
| Focal length | 3.74 | 6.46 | 11.18 |
| F number | 3.20 | 3.85 | 5.30 |
| Angle of view [degrees] | 63.4 | 39.3 | 23.3 |
| Total length | | 15.0 (fixed) | |
| BF | | 3.18 (except cover glass thickness) | |
| d72 | 0.01681 | 0.89009 | 1.24825 |
| r73 | 2.96505 | 4.41689 | 6.41903 |
| d73 | 1.73319 | 0.85991 | 0.50175 |
| d710 | 0.52982 | 1.07571 | 1.83366 |
| r711 | 9.15216 | −32.321 | −3.02571 |
| d711 | 1.32018 | 0.77429 | 0.01634 |

TABLE 28 aspheric surface coefficient

| | |
|---|---|
| Second surface (fixed) | $k = -1, A^4 = 0.417449 \times 10^{-2}, A^6 = -0.210209 \times 10^{-3},$ $A^8 = 0.754389 \times 10^{-5}, A^{10} = -0.108528 \times 10^{-6}$ |
| Eighth surface (fixed) | $k = -1, A^4 = -0.458388 \times 10^{-2}, A^6 = -0.212586 \times 10^{-1},$ $A^8 = 0.326344 \times 10^{-1}, A^{10} = -0.178517 \times 10^{-1}$ |
| 13th surface (fixed) | $k = -1, A^4 = -0.898835 \times 10^{-4}, A^6 = -0.128858 \times 10^{-4},$ $A^8 = 0.203481 \times 10^{-4}, A^{10} = -0.962441 \times 10^{-6}$ |

In the present comparative example 2, as seen in FIG. 61, the distance from the surface of the convex lens 731 on the object side to the aperture stop is represented by L1, and the distance from the deformation surface 3 of the first variable lens 732 to the aperture stop is represented by L2. Similarly, the distance from the aperture stop to the image surface 16 is represented by L3, and the distance from the aperture stop to the deformation surface 11 of the second variable lens 737 on the image side is represented by L4.

In this instance,

L2/L1 (front side)=50% (telephoto end)

73% (wide angle end)

are satisfied. In particular, it can be recognized that, in a wide angle end state, $L2/L1 \geq 0.55$ is not satisfied.

Figure 62:
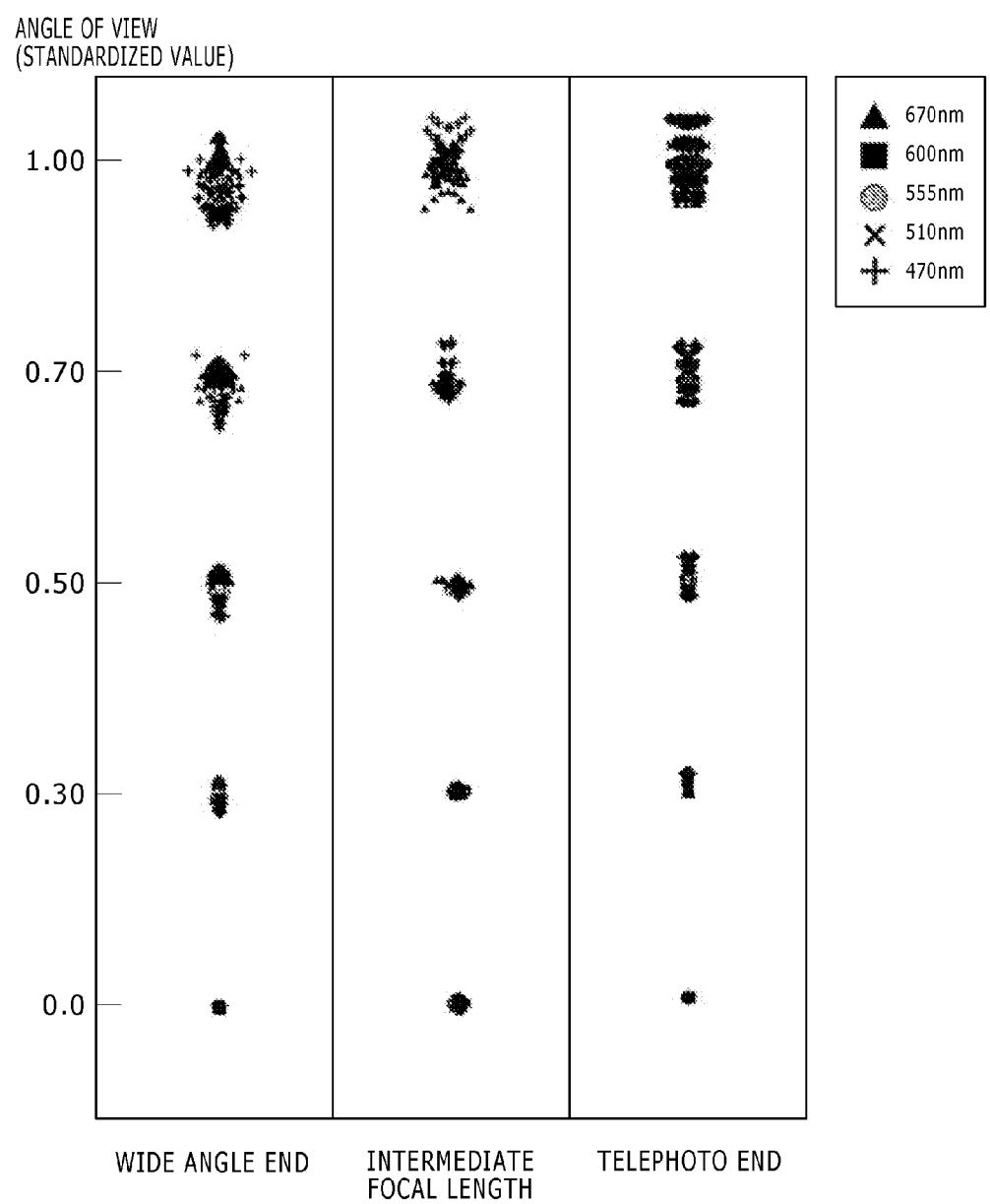
FIG. 62 is a diagrammatic view illustrating magnification chromatic aberration of the zoom lens shown in FIG. 59 in a wide angle end state, an intermediate focal length state and a telephoto end state.

The magnification chromatic aberration in this instance is illustrated in FIG. 62. Similarly to FIGS. 41 to 43, FIG. 62 illustrates the magnification chromatic aberrations in a wide angle end state, an intermediate focal length state and a telephoto end state, and similar symbols are applied to the respective wavelengths. From the results of FIG. 62, it can be recognized that a spot of each wavelength has an elliptic shape also in a telephoto end state, and the astigmatism remains. Further, in an intermediate focal length state and a wide angle end state, distortion is observed, and it is recognized that comatic aberration appears.

From the foregoing results, where the deformation surface of the variable lens provided in the lens group disposed on the object side is positioned nearer to the aperture stop, the aberrations become great in comparison with the design example 6, and this is not preferable. This is because, since the distance between the aperture stop and the variable lens on the object side which takes charge of a function of the variator is short, a zoom magnification may not be assured readily. Further, it is considered that this is because, since separation of light fluxes of individual image heights by the variable lens is not sufficient, aberration correction may not be carried out favorably. Furthermore, by increasing the distance L2, a lens can be added, and also this provides a result favorable for aberration correction. Therefore, it can be recognized that it is preferable to set the distance L2 of the deformation surface of the variable lens provided in the object side lens group from the aperture stop so as to satisfy $L2/L1 \geq 0.55$ with respect to the distance L1 between the lens surface on the most object side and the aperture stop.

4-3. Comparative Example 3

Example wherein the Image Side Variable Lens is Positioned Nearer to the Aperture Stop is on the Basis of the Design Example 6

Figure 63:
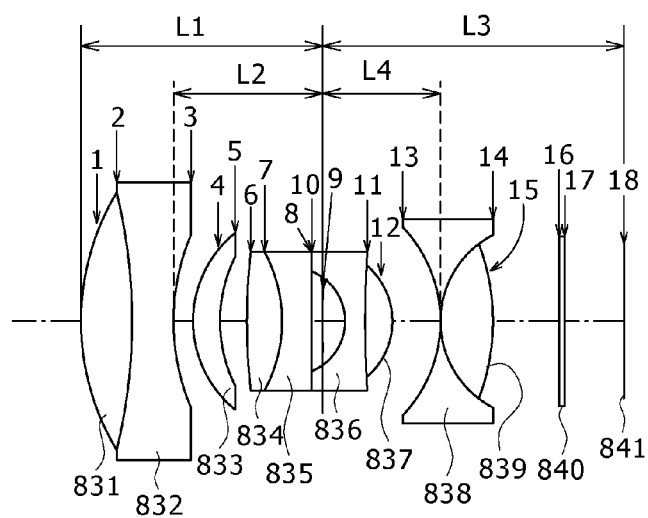
FIG. 63 is a schematic view showing a sectional configuration of a zoom lens according to a comparative example 3 wherein a variable lens in a lens group on the image side is positioned nearer to the aperture stop based on the basic configuration provided by the zoom lens shown in FIG. 59 where the zoom lens is in an intermediate focal length state.

In the present example, the zoom lens is designed such that the lens group on the image side which forms the compensator is displaced toward the aperture stop side on the basis of the lens configuration according to the design example 6. FIG. 63 shows a general lens configuration in an intermediate focal length state. Referring to FIG. 63, the zoom lens includes an object side lens group including a first variable lens 832, a lens group having a Gauss type configuration including an aperture stop sandwiched therein, and an image side lens group including a second variable lens 838. The object side lens group includes a convex lens 831 having a negative refracting power and a first variable lens 832, disposed in order from the object side. Meanwhile, the Gauss type lens group includes a meniscus lens 833 having a positive refracting power, a pasted lens including a lens 834 having a positive refracting power and a concave lens 835 having a negative refracting power, and a concave lens 836 having a negative refracting power and a convex lens 837 sandwiching an aperture stop 9. The image side lens group includes a second variable lens 838 and a convex lens 839 having a positive refracting power. The lenses 831, 832 and 838, 839 are individually formed integrally with each other. Lens surface data in the comparative example 3 are indicated in Table 29 given below, and various data and surface distances are indicated in Table 30 given below. Further, aspheric surface data are indicated in Table 31 given below. In the present comparative example 3, liquid having a refractive index nd of a d line of nd=1.58 and an Abbe number vd of vd=29.1 is used as the medium of the refracting surface deformation type liquid lens for use with the variable lenses. Further, in the present example, the second, tenth and 15th surfaces are aspheric surfaces.

TABLE 29 surface data (unit:mm)

| Surface number | Radius of curvature | Surface distance | Refractive index (nd) | Abbe number (vd) |
|---|---|---|---|---|
| 1 | 7.54899 | 1.5 | 1.743997 | 44.79 |
| 2* | −10.0619 | d82 | 1.58 | 29.1 |
| 3 | r83 | d83 | | |
| 4 | 3.02026 | 0.8 | 1.495893 | 69.49 |
| 5 | 3.50892 | 0.8 | | |
| 6 | 18.18931 | 1.06 | 1.743914 | 28.05 |
| 7 | −3.58454 | 0.8 | 1.565822 | 44.01 |
| 8 | 5.48381 | 0.4 | | |
| 9 | Aperture stop | 0.6 | | |
| 10* | −2.07059 | 0.6 | 1.679758 | 39.42 |
| 11 | 18.9801 | 0.8 | 1.622701 | 59.87 |
| 12 | −1.84544 | d812 | | |
| 13 | r813 | d813 | 1.50570 | 34.9 |
| 14 | 2.61414 | 1.5 | 1.599339 | 61.46 |
| 15* | −6.81503 | 1.941048 | | |
| 16 | INFINITY | 0.105 | 1.51633 | 64.1 |
| 17 | INFINITY | 1.769436 | | |
| 18 (image surface) | INFINITY | | | |

TABLE 30 various data

| | Wide angle end | Intermediate focal length | Telephoto end |
|---|---|---|---|
| Focal length | 3.73 | 6.46 | 11.19 |
| F number | 3.20 | 3.85 | 5.30 |
| Angle of view [degrees] | 63.4 | 39.3 | 23.3 |
| Total length | | 16.1 (fixed) | |
| BF | | 3.7 (except cover glass thickness) | |
| d82 | 0.01681 | 0.89009 | 1.24825 |
| r83 | 3.02812 | 4.37464 | 6.40603 |
| d83 | 1.73319 | 0.85991 | 0.50175 |

TABLE 30-continued various data

| | Wide angle end | Intermediate focal length | Telephoto end |
|---|---|---|---|
| d812 | 0.53000 | 0.90000 | 1.40000 |
| r813 | 10.02573 | −59.79449 | −3.83702 |
| d813 | 0.90000 | 0.53000 | 0.03000 |

TABLE 31 aspheric surface coefficient

| Second surface (fixed) | $k = -1, A^4 = 0.162611 \times 10^{-2}, A^6 = -0.230613 \times 10^{-4},$ $A^8 = 0.179689 \times 10^{-5}, A^{10} = -0.678152 \times 10^{-7}$ |
|---|---|
| Tenth surface (fixed) | $k = -1, A^4 = -0.428330 \times 10^{-1}, A^6 = -0.404108 \times 10^{-1},$ $A^8 = 0.477848 \times 10^{-1}, A^{10} = -0.341922 \times 10^{-1}$ |
| 15th surface (fixed) | $k = -1, A^4 = -0.201010 \times 10^{-2}, A^6 = -0.202190 \times 10^{-4},$ $A^8 = 0.365219 \times 10^{-4}, A^{10} = 0.563284 \times 10^{-5}$ |

In the present comparative example 3, as seen in FIG. 63, the distance from the surface of the convex lens 831 on the object side to the aperture stop is represented by L1, and the distance from the deformation surface 3 of the first variable lens 832 to the aperture stop is represented by L2. Similarly, the distance from the aperture stop to the deformation surface 18 is represented by L3, and the distance from the aperture stop to the deformation surface 13 of the second variable lens 838 on the image side is represented by L4.

In this instance,

L2/L1 (front side)=61% (telephoto end)

79% (wide angle end)

L4/L3 (rear side)=39% (telephoto end)

29% (wide angle end)

are satisfied. In particular, although $$L2/L1 \geq 0.55$$

is satisfied in both of a telephoto end state and a wide angle end state, $$L4/L3 < 0.3$$

is satisfied in the wide angle end state.

Figure 64:
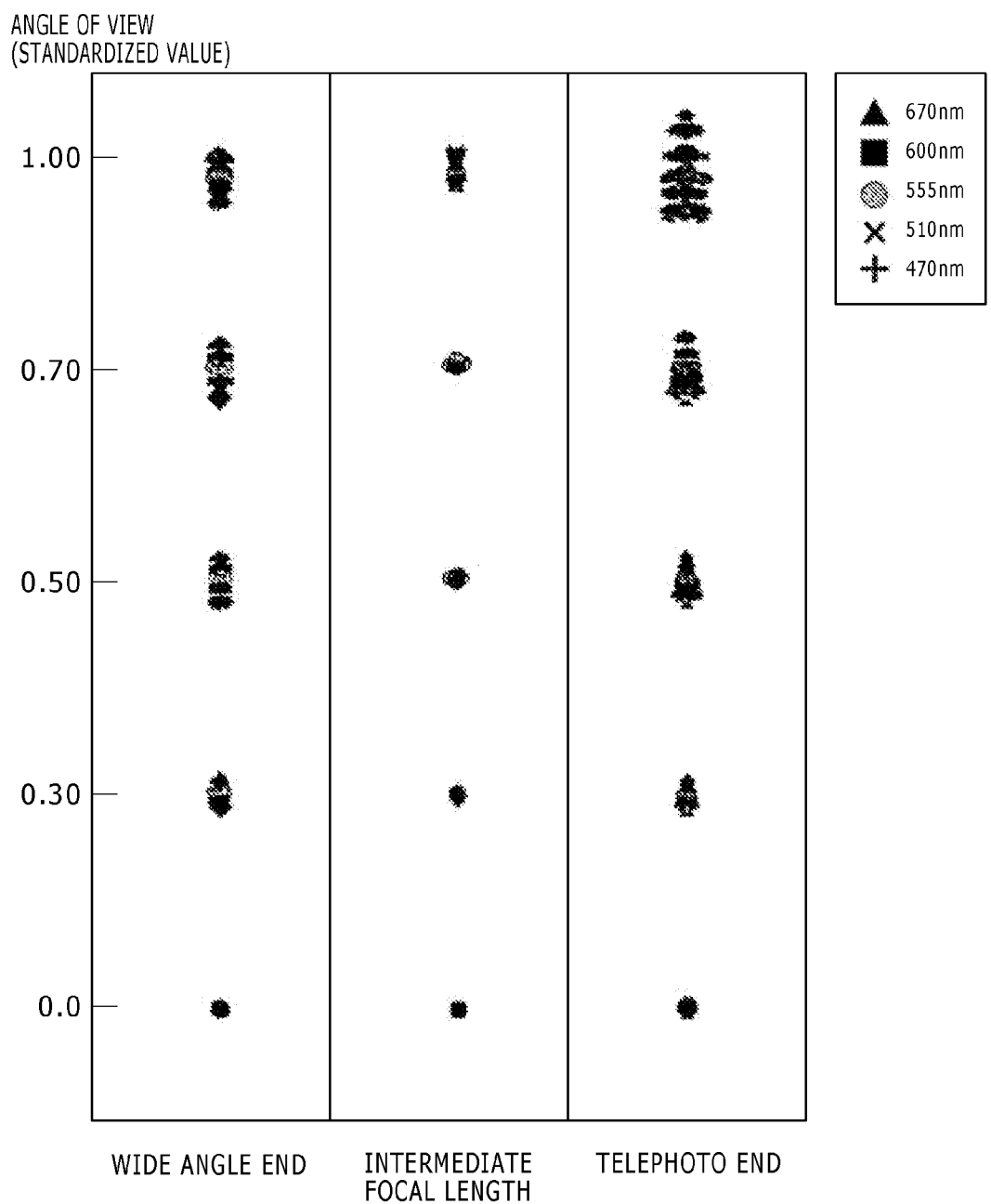
FIG. 64 is a diagrammatic view illustrating magnification chromatic aberration of the zoom lens shown in FIG. 59 in a wide angle end state, an intermediate focal length state and a telephoto end state.

The magnification chromatic aberration in this instance is illustrated in FIG. 64. Similarly to FIGS. 41 to 43, FIG. 64 illustrates the magnification chromatic aberration in a wide angle end state, an intermediate focal length state and a telephoto end state, and similar symbols are applied to the respective wavelengths. From the results of FIG. 64, it can be recognized that particularly the astigmatism indicates deterioration in a telephoto end state, and this is not favorable. In short, it can be recognized that, where L4<L3<0.3 is satisfied, light fluxes at different heights are not separated from each other on the second variable lens, aberration correction is not carried out favorably.

From the foregoing results, the zoom lens of the present invention preferably satisfies:

$$L2/L1 \geq 0.55$$

$$L4/L3 \geq 0.3$$

5. Study Regarding the Effective Diameter

Now, results of the study of the ratio of the lens effective diameter to the lens frame inner diameter regarding the zoom lens according to the second embodiment described hereinabove are described.

Generally, when the lens effective diameter is fixed, even if the frame diameter increases, the spherical surface deviation amount of the deformation surface of a refracting surface deformation type lens from an ideal spherical surface described hereinabove with reference to FIG. 23 little varies. In other words, if the lens effective diameter and the radius of curvature to be used of the lens are decided, then the spherical surface deviation amount is decided.

Figure 65:
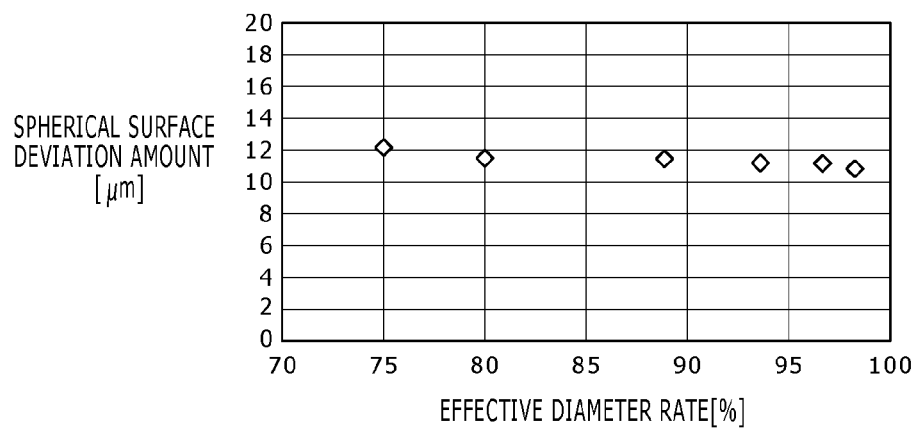
FIG. 65 is a diagrammatic view illustrating a spherical surface deviation amount with respect to an effective diameter rate of a refracting surface deformation type lens.

This manner is illustrated in FIG. 65. Referring to FIG. 65, the axis of abscissa indicates the effective diameter rate=effective diameter/frame inner diameter (unit: %), and the axis of ordinate indicates the spherical surface deviation amount from an ideal spherical surface. The spherical surface deviation amount in this instance is calculated in regard to a radius of curvature of the deformation surface of the first variable lens which is a wide angle end variator, and the unit thereof is μm. It is to be noted that, in the present example, an elastic film of a popular silicone resin or the like is used. From FIG. 65, it can be recognized that the spherical surface deviation amount exhibits little variation with respect to the effective diameter rate.

Figure 66:
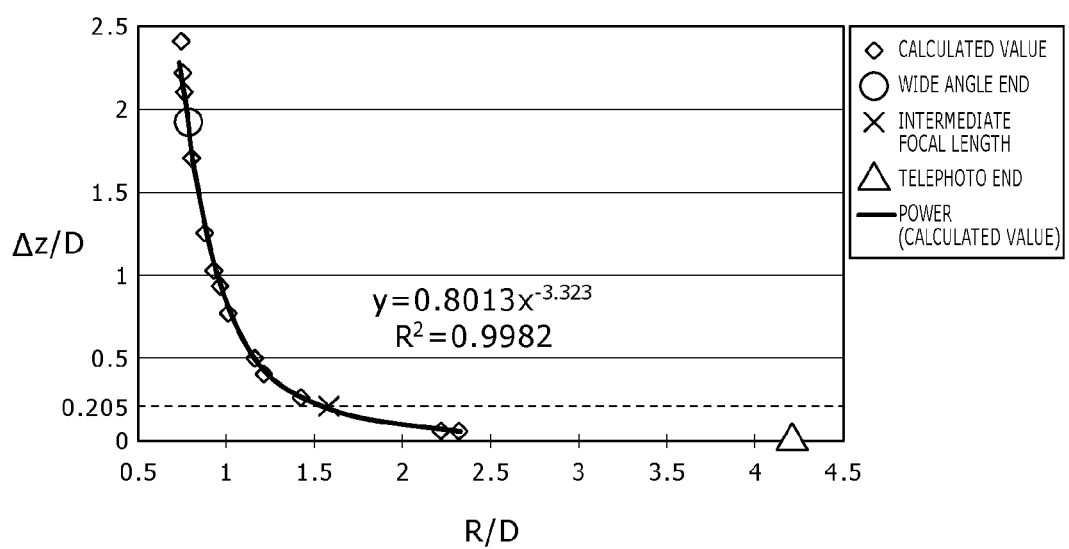
FIG. 66 is a diagrammatic view illustrating a relationship between a dimensionless number obtained by dividing the spherical surface deviation amount of a refracting surface deformation type lens by the effective diameter and another dimensionless number obtained by dividing the radius of curvature of the lens by the effective diameter.

Here, since the spherical surface deviation amount Δz does not rely upon the frame inner diameter D, the dimensionless number R/D when the used radius of curvature is divided by the effective diameter and the dimensionless number Δz/D when the spherical surface deviation amount is divided by the effective diameter are plotted on the graph. Then, an approximate curve ($y=0.8013x^{-3.323}$) is drawn, and a result of this is shown in FIG. 66. Since the spherical surface deviation amount depends upon the dimensionless number R/D, the curve shown in FIG. 66 indicates the spherical surface deviation amount with respect to the value of the dimensionless number R/D. Thus, a point of a designed value is placed on the curve.

From FIG. 42 which indicates the magnification chromatic aberration where the surface shape of the variable lenses in the zoom lens shown in FIG. 1 is reflected, the optical characteristic in a wide angle end state is deteriorated, and that in an intermediate focal length state lies on a border line while that in a telephoto end state little varies. Accordingly, it can be made a boundary condition whether the surface shape of the variable lens should be designed as a spherical shape or an aspheric shape across the intermediate focal length position. After all, where the variable lens of the refracting surface deformation type is designed in a region of the graph of FIG. 66 above a broken line, it becomes necessary to design the variable lens as an aspheric surface lens. Furthermore, the curve varies depending on a deformation film material, initial tension, and frame diameter.

Accordingly, a lens whose deformation surface is formed as an aspheric surface as in the zoom lens according to the second embodiment described above is preferably applied to the following case. In particular, the deformation surface is preferably formed as an aspheric surface if the variable lens is used so as to satisfy $$\Delta z/D > 0.205$$

in the used range where Δz is the spherical surface deviation amount of one of the variable lenses provided in the zoom lens and D is the effective diameter in this instance.

By designing a variable lens so as to satisfy such a condition as described above, the aberrations can be suppressed favorably as in the design examples 3 and 4 described hereinabove.

6. Fourth Embodiment

Camera Module

The fourth embodiment of the present invention relates to an example of an electronic apparatus including the zoom lens of the present invention. It is to be noted here that, in the example described, the zoom lens of the present invention is applied to an image pickup apparatus such as, for example, a camera.

Figure 67:
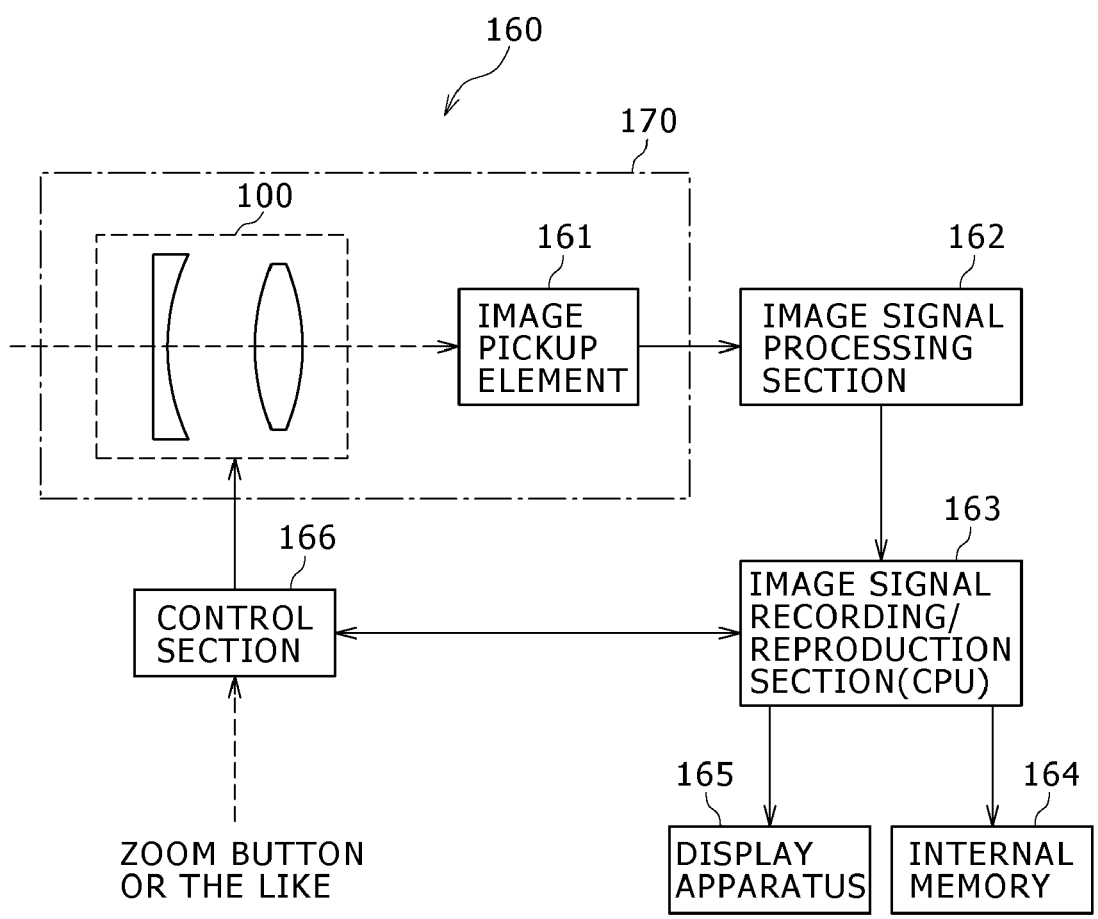
FIG. 67 is a schematic block diagram of an example of an image pickup apparatus according to a fourth embodiment.

FIG. 67 is a schematic block diagram showing a configuration of the image pickup apparatus of the present embodiment. The image pickup apparatus 160 of the present embodiment includes a camera module 170 including a zoom lens 100 and an image pickup element 161, an image signal processing section 162, an image signal recording and reproduction section 163, an internal memory 164, a display apparatus 165 and a control section 166. The configuration and functions of the components are described below.

The zoom lens 100 fetches image pickup object light and forms an image on an image pickup surface (not shown) of the image pickup element 161. As the zoom lens 100, any one of the zoom lenses 101 to 106 described hereinabove as the first to third embodiments can be used.

The image pickup element 161 photoelectrically converts light of an image pickup object formed as an image by the zoom lens 100 to produce an image signal. The image pickup element 161 is connected at an output terminal thereof to an input terminal of the image signal processing section 162 and outputs the produced image signal to the image signal processing section 162. It is to be noted that, to the image pickup element 161 various types of image sensors such as, for example, a CCD type and a CMOS type can be applied.

The image signal processing section 162 carries out predetermined image processing such as, for example, a correction process and a noise removing process for the image signal inputted thereto from the image pickup element 161. The image signal processing section 162 is connected at an output terminal thereof to an input terminal of the image signal recording and reproduction section 163 and outputs a signal after the image processing to the image signal recording and reproduction section 163.

The image signal recording and reproduction section 163 is formed from a mathematical operation circuit or the like formed, for example, from a microcomputer (CPU: Central Processing Unit) and controls a recording process and/or a reproduction process of the image signal inputted from the image signal processing section 162. In particular, the image signal recording and reproduction section 163 is connected to the internal memory 164 and outputs, where the image signal inputted from the image signal processing section 162 is to be recorded, the image signal to the internal memory 164. The image signal recording and reproduction section 163 is connected further to the display apparatus 165 and outputs, where displaying reproduction of the image signal inputted from the image signal processing section 162 is to be carried out, the image signal to the display apparatus 165.

The internal memory 164 can be formed, for example, from a hard disk drive (HDD), a semiconductor memory or an optical disk. The internal memory 164 stores the image signal inputted thereto from the image signal recording and reproduction section 163.

The display apparatus 165 converts the image signal supplied thereto from the image signal recording and reproduction section 163 into a signal of a format in which it can be displayed on a display monitor, and displays the converted signal on the display monitor. It is to be noted that the display apparatus 165 includes not only the display monitor but also a monitor driving section for driving the display monitor. Further, the display monitor can be formed, for example, from a liquid crystal display (LCD) panel or an electroluminescence (EL) panel.

The control section 166 controls operation of the components of the image pickup apparatus 160. Further, the control section 166 controls operation of the zoom lens 100, particularly, the curvature of the lens groups on the object side and the lens groups on the image side in the zoom lens 100 based on an operation signal, which corresponds to a focal length, generated by operation of, for example, a zoom button.

Since the image pickup apparatus 160 of the present embodiment includes the zoom lens 100 of the present invention described in connection with the first to third embodiments as described above, the image pickup apparatus 160 of a small size having good aberration characteristics and including the zoom function can be provided.

7. Fifth Embodiment

Electronic Apparatus

While, in the fourth embodiment described above, the zoom lens of the present invention is applied to an image pickup apparatus as an electronic apparatus, the present invention is not limited to this. The zoom lens of the present invention can be applied also to an information terminal apparatus having an image pickup mechanism section or camera module such as, for example, a portable communication terminal apparatus, a personal computer or a personal digital assistant (PDA).

In the fifth embodiment of the present invention, the zoom lens of the present invention is applied to a portable communication terminal apparatus having a camera module. It is to be noted that the portable communication terminal apparatus here is normally called mobile phone and is a terminal apparatus for carrying out radio communication with a base station for a radio telephone system.

[Configuration of the Portable Communication Terminal Apparatus]

Figure 68:
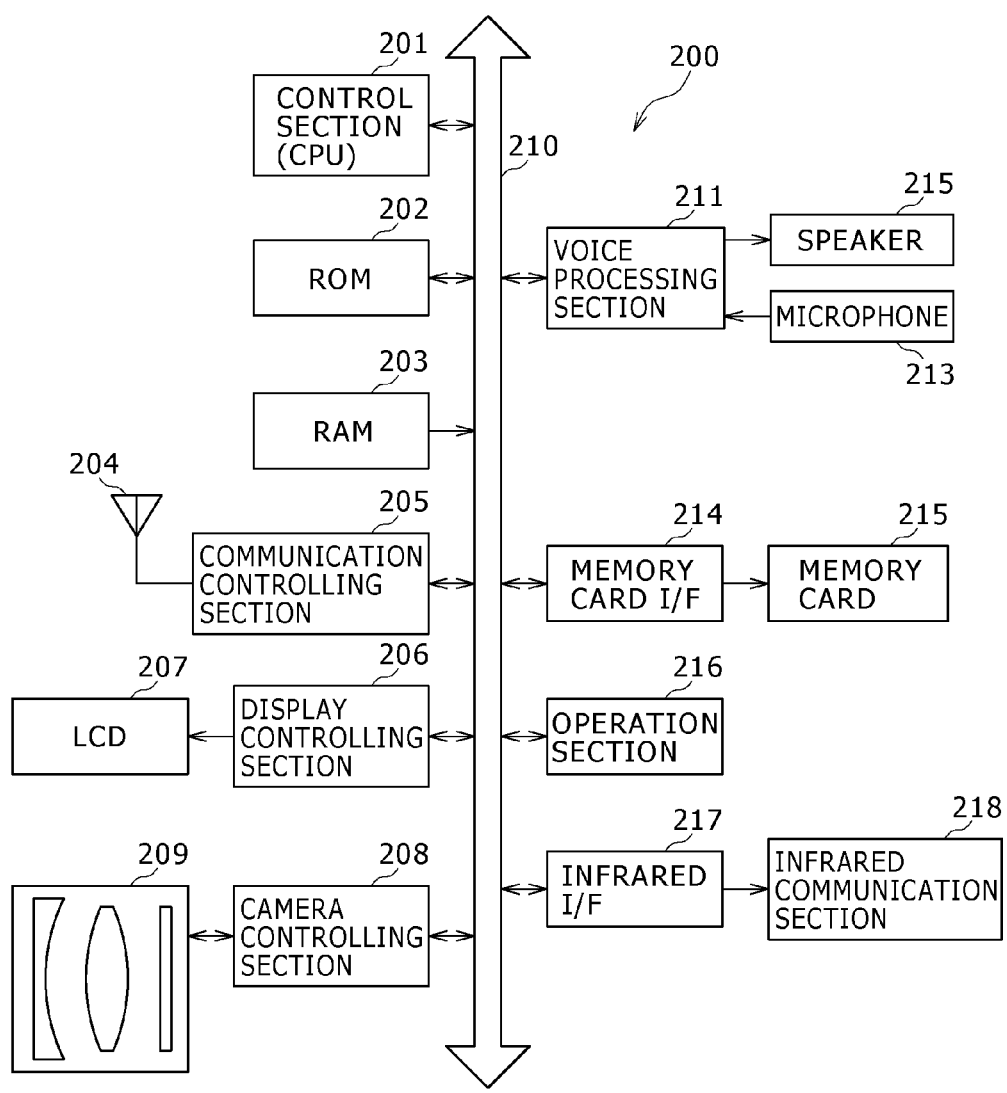
FIG. 68 is a schematic block diagram of an example of an electronic apparatus according to a fifth embodiment.
Figure 69:
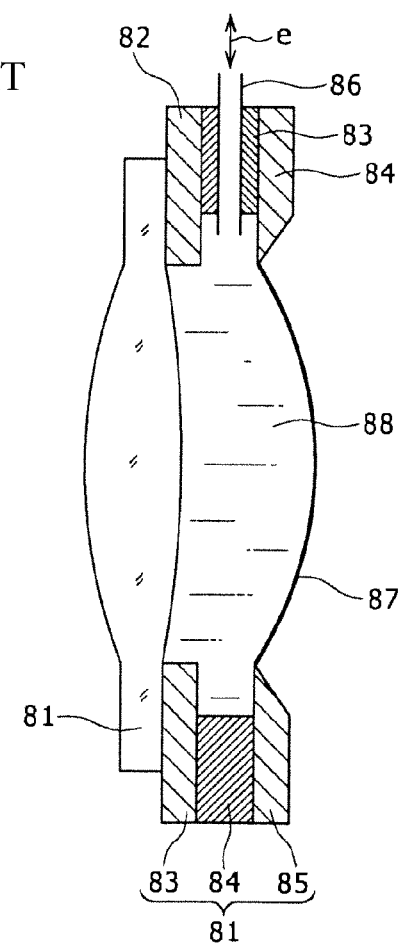
FIG. 69 is a schematic sectional view of an example of a variable lens of the refracting surface deformation type in the related art.

FIG. 68 shows the portable communication terminal apparatus of the present embodiment. Referring to FIG. 68, the portable communication terminal apparatus 200 includes a control section 201, a ROM (Read Only Memory) 202, a RAM (Random Access Memory) 203, an antenna 204, a communication controlling section 205, a display controlling section 206 and a display section 207. The portable communication terminal apparatus 200 further includes a camera module 209 and a camera controlling section 208.

The portable communication terminal apparatus 200 further includes a voice processing section 211 for carrying out digital to analog conversion of voice data upon talking, a speaker 212 for outputting voice upon talking and a microphone 213 for collecting voice upon talking. The portable communication terminal apparatus 200 further includes a memory card interface 214, a memory card 215, an operation section 216, an infrared interface 217 and an infrared communication section 218. The components described above are electrically connected directly or indirectly to each other through a signal bus 210, as shown in FIG. 68. The configuration and functions of the components are described below.

The control section 201 is formed from a mathematical operation controlling apparatus such as, for example, a CPU and controls operation of the entire portable communication terminal apparatus 200. In particular, the control section 201 develops a control program stored in the ROM 202 on the RAM 203 and controls operation of the entire portable communication terminal apparatus 200 through the signal bus 210.

The communication controlling section 205 carries out transmission of a transmission signal to and reception of a reception signal from a mobile phone base station not shown through the antenna 204. It is to be noted that the communication controlling section 205 carries out also modulation and demodulation of a radio wave exchanged with the mobile phone base station. In particular, in a voice talking mode, the communication controlling section 205 carries out predetermined processing for received voice information and outputs the signal after the processing to the speaker 212 through the voice processing section 211. Further, the communication controlling section 205 acquires voice collected by the microphone 213 through the voice processing section 211 and carries out predetermined processing for the acquired information and then transmits the signal after the processing through the antenna 204.

The display controlling section 206 converts the image signal supplied thereto through the signal bus 210 into a signal of a format in which it can be displayed on the display section 207, and outputs the converted signal to the display section 207. The display section 207 can be formed, for example, from an LCD panel or an organic EL panel and displays the signal thereto supplied from the display controlling section 206 as an image on the display screen thereof.

The camera module 209 fetches image pickup object light to form an image and then photoelectrically converts the image pickup object light of the formed image to produce an image signal. Then, the camera module 209 outputs the image signal to the camera controlling section 208. The camera module 209 includes a zoom lens 20 and an image pickup element.

The zoom lens fetches the image pickup object light to form an image on the image pickup surface not shown of the image pickup element. As the zoom lens, any one of the zoom lenses described hereinabove in connection with the first to third embodiments can be used. The image pickup element photoelectric converts the image pickup object light of the image formed by the zoom lens to produce an image signal. It is to be noted that, as the image pickup element, various types of image sensors such as, for example, a CCD type and a CMOS type can be applied.

The memory card 215 can be formed, for example, from a semiconductor memory or the like. The memory card 215 acquires and stores information of a static image, a dynamic image or the like picked up by the camera module 209, voice information upon talking and so forth through the memory card interface 214.

The operation section 216 is formed from a jog dial, a keypad or the like. To the operation section 216, input operation signals of inputting operation of a telephone number, a mail document or the like, setting operation of various modes and so forth can be inputted. Also image pickup operation and mode setting operation on the camera module 209 are carried out with the operation section 216.

Though not shown, the infrared communication section 218 includes an infrared emission element and an infrared reception element and can carry out transmission and reception of information to and from an external information equipment which can carry out infrared communication such as, for example, a mobile phone, a personal computer or a PDA. More particularly, the infrared communication section 218 acquires the image information, the voice information and so forth stored in the memory card 215 or the like through the infrared interface 217 and transmits the acquired information to an external information equipment. Further, the infrared communication section 218 receives information transmitted thereto from the external information equipment and outputs the reception signal to the memory card 215 or the like through the infrared interface 217.

It is to be noted that, though not shown in FIG. 68, the portable communication terminal apparatus 200 includes a power supply section such that power is supplied from the power supply section to the components.

[Recording and Reproduction Operation of Image Information]

Here, a recording and reproduction process of an image signal picked up by the camera module 209 in the portable communication terminal apparatus 200 of the present embodiment is described simply.

First, the camera controlling section 208 controls and drives the camera module 209 to carry out pickup of an image such as a static image, a dynamic image or the like. The camera controlling section 208 carries out processing such as a compression process and so forth utilizing a compression technique such as, for example, the JPEG method or the MPEG method for the acquired image information. Then, the camera controlling section 208 outputs the compressed information to the signal bus 210.

The RAM 203 acquires the image information through the signal bus 210 and temporarily stores the information therein. At this time, the RAM 203 may acquire voice information recorded through the microphone 213 at the same time with image pickup together with the image information and temporarily store the acquired information therein.

It is to be noted that, at this time, as occasion demands, the control section 201 may store the image information and/or the voice information into the memory card 215 through the memory card interface 214. Further, at this time, as occasion demands, the control section 201 may display the image information on the display section 207 through the display controlling section 206 and may output the voice information to the speaker 212 through the voice processing section 211.

Further, as occasion demands, the control section 201 may transmit the acquired image information and voice information to an external equipment which can carry out infrared communication through the infrared communication section 218.

It is to be noted that, when the image information stored in the RAM 202 or the memory card 215 is to be read out to display dynamic image or a static image on the display section 207, the camera controlling section 208 reads out the data stored in the RAM 202 or the memory card 215 once and then carry out decoding or decompression of the data. Then, the camera controlling section 208 supplies the processed image data to the display controlling section 206 through the communication bus 210.

As described above, the portable communication terminal apparatus 200 of the present embodiment includes the camera module 209 including any one of the zoom lenses 101 to 106 of the present invention described in connection with the first and second embodiments. Therefore, with the present embodiment, by using the variable lens, the portable communication terminal apparatus 200 which is small in size and has a zoom function having good aberration characteristics can be provided.

It is to be noted that, while an example wherein the camera module 209 and the camera controlling section 208 are provided separately from each other is described in the fifth embodiment, the present invention is not limited to this, and the camera module 209 may include the camera controlling section 208. Further, where the controlling process similar to that of the camera controlling section 208 described above is carried out by the control section 201, another configuration may be applied wherein the camera controlling section 208 is not provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A zoom lens, comprising:
an object side lens group disposed on the object side and including a first variable lens having a deformation surface formed from a deformable transparent material, said object side lens group having a focal length varied by deformation of said first variable lens;
an image side lens group disposed on the image side with respect to said object side lens group with an aperture stop sandwiched therebetween and including a second variable lens having a deformation surface formed from a deformable transparent material, said image side lens group having a focal length varied by deformation of said second variable lens; and
a lens group disposed between said object side lens group and said image side lens group and including said aperture stop;
the deformation of said first and second variable lenses provided in said object side lens group and said image side lens group being controlled to carry out power variation and carry out image surface movement compensation and focusing by the power variation.

2. The zoom lens according to claim 1, wherein, when the refracting power of said object side lens group is to be increased in a negative direction, the refracting power of said image side lens group is controlled so as to increase in a positive direction to carry out zooming of said zoom lens from the telephoto end side to the wide end side.

3. The zoom lens according to claim 1, wherein the deformation surface of said second variable lens of said image side lens group is disposed on the most object side of said image side lens group and has a concave shape on the object side in a telephoto end state but has a convex shape in a wide angle end state.

4. The zoom lens according to claim 1, wherein the curvature of the deformation surface of said second variable lens of said image side lens group varies in a positive direction upon zooming from the telephoto side to the wide angle side.

5. The zoom lens according to claim 1, wherein, where the distance from said aperture stop to a lens surface on the most object side on an optical axis is represented by L1, the distance from said aperture stop to a lens surface of said first variable lens on the optical axis by L2, the distance from said aperture stop to an image surface by L3 and the distance from said aperture stop to a lens surface of said second variable lens on the optical axis are represented by L4, $$L2 \geqq 0.55 \times L1$$

$$L4 \geqq 0.3 \times L3$$

are satisfied.

6. The zoom lens according to claim 1, wherein said lens group including said aperture stop includes a lens group having a function of correcting at least one of spherical aberration, odd-order aberration and chromatic aberration.

7. The zoom lens according to claim 1, wherein an aspheric lens is included.

8. The zoom lens according to claim 7, wherein said aspheric lens is included at least in one of said object side lens group and said image side lens group.

9. The zoom lens according to claim 7, wherein said aspheric lens is disposed on one or both of the object side with respect to said first variable lens and the image side with respect to said second variable lens.

10. The zoom lens according to claim 7, wherein said aspheric lens is disposed on the most image side of said image side lens group.

11. The zoom lens according to claim 7, wherein said aspheric lens is disposed on the most object side of said object side lens group.

12. The zoom lens according to claim 1, wherein a lens or a lens group having a function of correcting on-axis color aberration is disposed between said lens group disposed with said aperture stop sandwiched therein and said image side lens group including said second variable lens.

13. The zoom lens according to claim 1, wherein said first and second variable lenses are individually structured such that liquid or gel having optical transparency is filled between a solid material having optical transparency and an elastic film having optical transparency and the focal length is varied by deformation of the liquid or gel and the elastic film.

14. The zoom lens according to claim 1, wherein an optical path deflection element for deflecting an optical path is disposed between said object side lens group and said image side lens group.

15. The zoom lens according to claim 1, wherein, on the telephoto end side, lateral aberration varies in a used wavelength substantially in proportion to an angle of view.

16. The zoom lens according to claim 1, wherein, where the refractive index of the transparent material of the inside of each of said first and second variable lenses is represented by n and an incident angle or an emergent angle by i, $$n \times \sin(i) < 0.5$$

is satisfied.

17. The zoom lens according to claim 1, wherein the ratio of the overall thickness of the lenses to the distance from a lens surface on the most object side to a lens surface on the most image side is 40% or more.

18. The zoom lens according to claim 1, wherein the deformation surface of any of said first and second variable lenses is formed as an aspheric surface where the variable lens is used so that, where a spherical surface deviation amount is represented by $\Delta z$ and a lens effective diameter by D, $\Delta z/D$ satisfies $$\Delta z/D > 0.205$$

in the used range.

19. A camera module, comprising:
a zoom lens including an object side lens group disposed on the object side and including a first variable lens having a deformation surface formed from a deformable transparent material, said object side lens group having a focal length varied by deformation of said first variable lens, an image side lens group disposed on the image side with respect to said object side lens group with an aperture stop sandwiched therebetween and including a second variable lens having a deformation surface formed from a deformable transparent material, said image side lens group having a focal length varied by deformation of said second variable lens, and a lens group disposed between said object side lens group and said image side lens group and including said aperture stop, the deformation of said first and second variable lenses provided in said object side lens group and said image side lens group being controlled to carry out power variation and carry out image surface movement compensation and focusing by the power variation; and
an image pickup element adapted to pick up an image formed by said zoom lens.

20. An electronic apparatus, comprising:
a zoom lens including an object side lens group disposed on the object side and including a first variable lens having a deformation surface formed from a deformable transparent material, said object side lens group having a focal length varied by deformation of said first variable lens, an image side lens group disposed on the image side with respect to said object side lens group with an aperture stop sandwiched therebetween and including a second variable lens having a deformation surface formed from a deformable transparent material, said image side lens group having a focal length varied by deformation of said second variable lens, and a lens group disposed between said object side lens group and said image side lens group and including said aperture stop, the deformation of said first and second variable lenses provided in said object side lens group and said image side lens group being controlled to carry out power variation and carry out image surface movement compensation and focusing by the power variation;
an image pickup element adapted to pick up an image formed by said zoom lens; and
a control section adapted to control said first and second variable lenses of said zoom lens.

* * * * *